US012689459B2

(12) United States Patent
Mehrvar

(10) Patent No.: US 12,689,459 B2
(45) Date of Patent: Jul. 21, 2026

(54) HIGH-DEGREE RECONFIGURABLE ADD-DROP MULTIPLEXER

(71) Applicant: HUAWEI TECHNOLOGIES CO., LTD., Shenzhen (CN)

(72) Inventor: Hamid Mehrvar, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 18/676,738

(22) Filed: May 29, 2024

(65) Prior Publication Data

US 2025/0373355 A1 Dec. 4, 2025

(51) Int. Cl.
*H04J 14/02* (2006.01)

(52) U.S. Cl.
CPC ........ *H04J 14/022* (2013.01); *H04J 14/0212* (2013.01)

(58) Field of Classification Search
None
See application file for complete search history.

(56) References Cited

U.S. PATENT DOCUMENTS

2021/0273740 A1* 9/2021 Chen ................... H04J 14/0205

OTHER PUBLICATIONS

Joao Pedro et al., "ON Scaling Transport Networks for Very High Nodal Degree ROADM Nodes Using State-of-the-Art Optical Switch Technology", ICTON 2015.

Yongcheng Li et al., "Colorless, partially directionless, and contentionless architecture for high-degree ROADMs", Journal of Optical Communications and Networking, vol. 14, No. 6, Jun. 2022.
Diogo C. Morao et al., "Exploring future large-scale ROADM architectures", Telecoms Conference, 2021.
Rene Schmogrow, "Solving for Scalability From Multi-Band to Multi-Rail Core Networks", Journal of Lightwave Technology, vol. 40, No. 11, Jun. 1, 2022.
Ruizhi Yang et al., "A Programmable ROADM System for SDM/WDM Networks", 2021.
Takeshi Matsuo et al., "Design and Dynamic Control of Fiber-Granular Routing Networks with Next-Generation Optical Paths" Optica Publishing Group 2022.
Hamid Mehrvar et al., "Dimensioning Networks of ROADM Cluster Nodes", Journal of Optical Communications and Networking, vol. 15, No. 8, Aug. 2023.
China Telecom, Annual Report of China Telecom Corporation Limited, 2013.
Eric W. M. Wong et al., "On Generalizations of the Engset Model", IEEE Communications Letters, vol. 11, No. 4, Apr. 2007.

* cited by examiner

*Primary Examiner* — David W Lambert

(57) ABSTRACT

According to an aspect, a flexible node design for a high-degree ROADM is provided. In an embodiment, this design is implemented as a network node. The network node includes a plurality of optical input and a plurality of optical outputs. The network node further includes a MEMS (or other Optical Cross Connect, OXC) component and a WSS component, where each of the OXC and the WSS component has a set of inputs of the plurality of optical inputs and a set of outputs of the plurality of optical outputs. In some embodiments, the network node has a set of add inputs supported by one or both of the OXC and WSS components. In some embodiments, the network node has a set of drop outputs supported by one or both of the OXC and WSS components.

25 Claims, 48 Drawing Sheets

| Node connection | LOSS (dB) | LOSS (dB) |
|---|---|---|
| Passthrough | Via MEMS | 3dB |
| | Via WSS JxI | 18dB |
| ADD | Via MEMS only | 3dB+8.5dB+3dB= 14.5dB |
| | Via WSS JxI only | 3dB+8.5dB+18dB=29.5dB |
| | Via both WSS JxI and MEMS | 3dB+8.5dB+18dB+3=32.5dB |
| Drop | Via MEMS | 3dB+8.5dB+3dB= 14.5dB |
| | Via WSS JxI | 18dB+8.5dB+3dB=29.5dB |
| | Via both WSS JxI and MEMS | 3dB+8.5dB+18dB+3=32.5dB |

| Node # | Non-optimized degree |
|--------|---------------------|
| 201-1 | 36 |
| 201-2 | 27 |
| 201-3 | 36 |
| 201-4 | 54 |
| 201-5 | 54 |
| 201-6 | 36 |
| 201-7 | 54 |
| 201-8 | 18 |
| 201-9 | 27 |
| 201-10 | 72 |
| 201-11 | 36 |
| 201-12 | 63 |
| 201-13 | 63 |
| 201-14 | 27 |
| 201-15 | 18 |
| 201-16 | 27 |
| 201-17 | 63 |
| 201-18 | 36 |
| 201-19 | 45 |
| 201-20 | 27 |
| 201-21 | 36 |
| 201-22 | 63 |
| 201-23 | 27 |
| 201-24 | 27 |
| 201-25 | 36 |
| 201-26 | 18 |

| Source to destination | Nodes that connection traverses to its destination | | | | |
|---|---|---|---|---|---|
| 201-3 to 201-1 | 201-3 | 201-1 | | | |
| 201-3 to 201-2 | 201-3 | 201-1 | 201-2 | | |
| 201-3 to 201-4 | 201-3 | 201-4 | | | |
| 201-3 to 201-5 | 201-3 | 201-1 | 201-5 | | |
| 201-3 to 201-6 | 201-3 | 201-4 | 201-6 | | |
| 201-3 to 201-7 | 201-3 | 201-1 | 201-2 | 201-7 | |
| 201-3 to 201-8 | 201-3 | 201-1 | 201-2 | 201-7 | 201-8 |
| 201-3 to 201-9 | 201-3 | 201-9 | | | |
| 201-3 to 201-10 | 201-3 | 201-10 | | | |
| 201-3 to 201-11 | 201-3 | 201-4 | 201-11 | | |
| 201-3 to 201-12 | 201-3 | 201-4 | 201-6 | 201-12 | |
| 201-3 to 201-13 | 201-3 | 201-1 | 201-2 | 201-7 | 201-13 |
| 201-3 to 201-14 | 201-3 | 201-10 | 201-14 | | |
| 201-3 to 201-15 | 201-3 | 201-10 | 201-15 | | |
| 201-3 to 201-16 | 201-3 | 201-10 | 201-17 | 201-16 | |
| 201-3 to 201-17 | 201-3 | 201-10 | 201-17 | | |
| 201-3 to 201-18 | 201-3 | 201-10 | 201-17 | 201-18 | |
| 201-3 to 201-19 | 201-3 | 201-9 | 201-19 | | |
| 201-3 to 201-20 | 201-3 | 201-9 | 201-19 | 201-20 | |
| 201-3 to 201-21 | 201-3 | 201-10 | 201-17 | 201-21 | |
| 201-3 to 201-22 | 201-3 | 201-10 | 201-17 | 201-22 | |
| 201-3 to 201-23 | 201-3 | 201-9 | 201-19 | 201-20 | 201-23 |
| 201-3 to 201-24 | 201-3 | 201-10 | 201-17 | 201-22 | 201-24 |
| 201-3 to 201-25 | 201-3 | 201-10 | 201-17 | 201-22 | 201-25 |
| 201-3 to 201-26 | 201-3 | 201-1 | 201-2 | 201-7 | 201-13 | 201-26 |

| Source to destination | Nodes that connection traverses to its destination | | | | | | Labelled # of fibers between source/ destination |
|---|---|---|---|---|---|---|---|
| 201-3 to 201-1 | 201-3 | 201-1 | | | | | 2 |
| 201-3 to 201-2 | 201-3 | 201-1 | 201-2 | | | | 2 |
| 201-3 to 201-4 | 201-3 | 201-4 | | | | | 2 |
| 201-3 to 201-5 | 201-3 | 201-1 | 201-5 | | | | 2 |
| 201-3 to 201-6 | 201-3 | 201-4 | 201-6 | | | | 2 |
| 201-3 to 201-7 | 201-3 | 201-1 | 201-2 | 201-7 | | | 2 |
| 201-3 to 201-8 | 201-3 | 201-1 | 201-2 | 201-7 | 201-8 | | 2 |
| 201-3 to 201-9 | 201-3 | 201-9 | | | | | 2 |
| 201-3 to 201-10 | 201-3 | 201-10 | | | | | 2 |
| 201-3 to 201-11 | 201-3 | 201-4 | 201-11 | | | | 2 |
| 201-3 to 201-12 | 201-3 | 201-4 | 201-6 | 201-12 | | | 2 |
| 201-3 to 201-13 | 201-3 | 201-1 | 201-2 | 201-7 | 201-13 | | 2 |
| 201-3 to 201-14 | 201-3 | 201-10 | 201-14 | | | | 2 |
| 201-3 to 201-15 | 201-3 | 201-10 | 201-15 | | | | 2 |
| 201-3 to 201-16 | 201-3 | 201-10 | 201-17 | 201-16 | | | 2 |
| 201-3 to 201-17 | 201-3 | 201-10 | 201-17 | | | | 2 |
| 201-3 to 201-18 | 201-3 | 201-10 | 201-17 | 201-18 | | | 2 |
| 201-3 to 201-19 | 201-3 | 201-9 | 201-19 | | | | 2 |
| 201-3 to 201-20 | 201-3 | 201-9 | 201-19 | 201-20 | | | 2 |
| 201-3 to 201-21 | 201-3 | 201-10 | 201-17 | 201-21 | | | 2 |
| 201-3 to 201-22 | 201-3 | 201-10 | 201-17 | 201-22 | | | 2 |
| 201-3 to 201-23 | 201-3 | 201-9 | 201-19 | 201-20 | 201-23 | | 2 |
| 201-3 to 201-24 | 201-3 | 201-10 | 201-17 | 201-22 | 201-24 | | 2 |
| 201-3 to 201-25 | 201-3 | 201-10 | 201-17 | 201-22 | 201-25 | | 2 |
| 201-3 to 201-26 | 201-3 | 201-1 | 201-2 | 201-7 | 201-13 | 201-26 | 2 |

| PERFORMANCE METRIC | | New Node Design Case (3a) | New Node Design Case (3b) |
|---|---|---|---|
| Node level Blocking | | 0 | 0 |
| Blocking @ Full load @ 33% add/drop, Using 2 fibers per path | | 0.0001 | 0.0001 |
| Loss (dB), end-to-end without amplification | 1-hop (min) | 41dB | 41dB |
| | 2-hop | 45dB | 33dB |
| | 3-hop | 48dB | 36dB |
| | 4-hop | 51dB | 39dB |
| | 5-hop (max) | 54dB | 42dB |
| | Avg. loss | 46.6dB | 36.5dB |
| Components for 384D, 33% add/drop | Use of WSS 1x32, MEMS and WSS 64x64 | Line: 1*(512x512)MEMS+ 1*WSS 64x64 Add/drop: 256 WSS1x32 + 16 (512x512)* | Line: 1*(512x512)MEMS+ 1*WSS 64x64 Add/drop: 256 WSS1x32 + 16 (512x512)* |
| Components for 192D, 33% add/drop | Use of WSS 1x32, MEMS and WSS 32x32 | Line: 1*(256x256)MEMS+ 1*WSS32x32 Add/drop: 128 WSS1x32 + 64 (512x512) | Line:** 1*(256x256)MEMS+1*WSS32x32 Add/drop: 128 WSS1x32 + 8 (512x512)** |

* 16(512x512) can be replaced by 64(128x128)
** 8(512x512) can be replaced by 64(64x64)

| Equipment Required | D-Degree | 192D | 384D |
|---|---|---|---|
| Line | 2D* WSS 1x[D+1] | 384 WSS 1x193 | 768 WSS 1x385 |
| Add | D* WSS 1xK + K* DxD MEMS | 192 WSS 1x32+32 *192x192 MEMS OR 192 WSS 1x32+12 *512x512 MEMS | 384* WSS 1x32+32 *384x384 MEMS OR 384*WSS 1x32+24 *512x512 MEMS |
| Drop | D* WSS 1xK + K* DxD MEMS | 192 WSS 1x32+32 *192x192 MEMS OR 192 WSS 1x32+12 *512x512 MEMS | 384* WSS 1x32+32 *384x384 MEMS OR 384*WSS 1x32+24 *512x512 MEMS |

| LOSS | Loss | LOSS (dB) 192D | LOSS(dB) 384D | Loss(dB) average |
|---|---|---|---|---|
| Passthrough | $WSS_{Loss} + WSS_{Loss}$ | 22 | 24 | 23 |
| ADD | $MEMS_{Loss} + WSS1x32 + WSS_{Loss}$ | 22.5 | 23.5 | 23 |
| Drop | $WSS_{Loss} + MEMSLOSS + WSS1x32$ | 22.5 | 23.5 | 23 |

| Blocking WSS 1xN Services: 80 x 150G or 60x200G | Blocking $(L_{Max}=80)$ |
|---|---|
| N=64 , *60x200GHz only* | 0 |
| N=64 , *60x200GHz, 80x160 GHz* | $1 - \dfrac{64}{L_{Max}}$ (worst case: 0.2) |
| N ≥ 80, *60x200GHz, 80x150 GHz* | 0 |

3100

| WSS 1xN | $D=M/(1+\beta)$ $P=M-D$ | $N=64, M=256 \rightarrow$ $D=192, P=64$ | $N=64, M=512 \rightarrow$ $D=384, P=128$ |
|---|---|---|---|
| Degree | $D(1+\beta) \times D(1+\beta)$ | 192 | 384 |
| Line WSS required | $2*D$ | 384 WSS1x64 | 768 WS1x64 |
| Add/drop | $\beta = (P*N/D*N)$ | $(64x64)/192x64) =$ 33% | $(128x64)/(384x64) =$ 33% |
| MEMS size (passthru) | MxM | 256 | 512 |
| Cost: # of MEMS Pass-thru | N (MxM) | 64 *(256x256) | 64*(512x512) |
| MEMS size (add/drop) | PxP | 64x64 | 64x64 |
| Cost: # of MEMS add/drop | 4P*(NxN) | 256*(64x64) | 512*(64x64) |

| Node LOSS (8.5dB for WSS, 2.5-3dB for MEMS | LOSS (dB) |
|---|---|
| ADD | 2x2.5+3+8.5= 16.5 |
| Drop | 2x2.5+3+8.5= 16.5 |
| Passthrough | 2x8.5+ 3 = 20 |

32x192 /(192x80)=40%
* Instead of 32 times 192x192, one can use 12 times 512x512

32x384 /(384x80)=40%
** Instead of 32 times 384x384, one can use 24 times 512x512

3800

| Node  LOSS (8.5dB for WSS, 6dB for WSS HxH) | LOSS (dB) |
|---|---|
| Passthrough | 2*8.5+6dB= 23dB |
| ADD | 3+8.5+8.5= 20dB |
| Drop | 3+8.5dB+8.5dB = 20dB |

FIG. 38

| Cost/Complexity | 192-degree | 384-degree |
|---|---|---|
| Line | 192*2*WSS 1x64 + 3024 WSS 4x4 | 384*2*WSS 1x64 + 3024 WSS 8x8 |
| Add | 192*WSS 1x32 + 32*(192x192 MEMS)~ | 384*WSS 1x32 + 32*(384x384 MEMS)~~ |
| Drop | 192*2*WSS 1x32 + 32*(192x192 MEMS)~ | 384*WSS 1x32 + 32*(384x384 MEMS)~~ |

~ Could be 12*(512x512 MEMS)
~~ Could be 24* (512x512 MEMS)

| PERFORMANCE METRIC | | Architecture 0 Large WSS | Architecture 1b WSS-MEMS-WSS | |
|---|---|---|---|---|
| Node level Blocking | | 0 | 0 to 0.2 | |
| Blocking @ Full load @ 33% add/drop, Using 2 fiber per path | | 0.035 | WSS1x32 | 0.55* to 0.6** |
| | | | WSS1x64 | 0.06* to 0.1** |
| | | | WSS1x80+ | 0.035** |
| Loss (dB), end-to-end without amplification | 1-hop (min) | 46dB | 33dB | |
| | 2-hop | 69dB | 53dB | |
| | 3-hop | 92dB | 73dB | |
| | 4-hop | 115dB | 93dB | |
| | 5-hop (max) | 138dB | 113dB | |
| | Avg. loss | 75.2dB dB | 63.6 dB | |
| Components for 384D, 33% add/drop | Use of WSS 1x32 (or 1x64 or 1x80), MEMS and WSS 64x64 | Line: 768*WSS1x385 Add & Drop: 768*WSS 1x32 + 48*(512x512) MEMS | Line: 768*WSS1x64 + 64*(512x512) MEMS Add/Drop: 512*(64x64), Assuming WSS1x64<br>Line: 768*WSS1x80 + 80*(512x512) MEMS Add/Drop: 512*(80x80), Assuming WSS1x80 | |
| Components for 192D, 33% add/drop | Use of WSS 1x32, MEMS and WSS 32x32 | Line: 384*WSS1x193 Add & Drop: 384*WSS 1x32 + 24*(512x512) MEMS | Line: 384*WSS1x64 + 64*(256x256) MEMS Add/Drop: 256*(64x64) Assuming WSS1x64<br>Line: 384*WSS1x80 + 80*(256x256) MEMS Add/Drop: 256*(80x80) Assuming WSS1x80 | |

* Best case maximum Blocking is for 200GHz due to least # of channels per fiber

** Worst-case maximum blocking is for 150GHz due to most channels per fiber

| PERFORMANCE METRIC | | Architecture 2 WSS-WSS-WSS | Architecture 3 (case 3b) Stacked MEMS/WSS (3b) |
|---|---|---|---|
| Node level Blocking | | 0 | 0 |
| Blocking @ Full load @ 33% add/drop, Using 2 fiber per path | | 0.035 | 0.0001 |
| Loss (dB), end-to-end without amplification | 1-hop (min) | 40dB | 41dB |
| | 2-hop | 63dB | 33dB |
| | 3-hop | 86dB | 36dB |
| | 4-hop | 109dB | 39dB |
| | 5-hop (max) | 132dB | 42dB |
| | Avg. loss | 75.2dB dB | 36.5dB |
| Components for 384D, 33% add/drop | Use of WSS 1x32 (or 1x64 or 1x80), MEMS and WSS 64x64 | Line: 768*WSS1x64 + 3024*WSS 8x8 Add/drop: 768*WSS 1x32 + 48*(512x512) MEMS *Note: 3024*WSS8x8 can be replaced by 756*WSS32x32* | Line: 1*(512x512)MEMS+ 1*WSS 64x64 Add/drop: 256 WSS1x32 + 16 (512x512) *Note: 16(512x512) can be replaced by 64(128x128)* |
| Components for 192D, 33% add/drop | Use of WSS 1x32, MEMS and WSS 32x32 | Line: 384*WSS1x64 + 3024*WSS 4x4 Add/drop: 384*WSS 1x32 + 24*(512x512) MEMS *Note: 3024*WSS4x4 can be replaced by 378*WSS32x32* | Line: 1*(256x256)MEMS+1*WSS32x32 Add/drop: 128 WSS1x32 + 8 (512x512) *Note: 8(512x512) can be replaced by 64(64x64)* |

FIG. 42B

HIGH-DEGREE RECONFIGURABLE
ADD-DROP MULTIPLEXER

CROSS-REFERENCE TO RELATED
APPLICATIONS

This is the first application filed for the present invention.

FIELD OF THE INVENTION

The present invention pertains to the field of optical networking, and in particular to a flexible node design for a high-degree reconfigurable add-drop multiplexer (ROADM).

BACKGROUND

The exponential growth of traffic in optical networks necessitates continuous upgrades to accommodate the increasing demand for bandwidth and connectivity. In particular, metropolitan environments experience significant traffic surges, requiring scalable solutions to enhance network capacity and performance. Traditional approaches to capacity scaling and fiber addition often face several challenges, including limitations in scalability, flexibility, and performance degradation.

The reconfigurable add-drop multiplexer (ROADM) plays a role in dynamic routing and wavelength management of optical networks. However, existing ROADM solutions face constraints that hinder optimal network expansion. For instance, some solutions compromise the directionless feature, leading to degraded switching performance in scaled nodes and complexities in intra-node insertion loss diversity. Moreover, current ROADM designs often require extensive cross-connect configurations and multiple switches to facilitate connectivity, leading to inefficiencies and underutilization of network capacity. These inefficiencies may result in performance degradation, particularly concerning the number of connections supported while maintaining a target node blocking performance.

Therefore, there is a need for a flexible node design for a high-degree ROADM that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

According to an aspect, a flexible node design for a high-degree ROADM is provided. In an embodiment, this design is implemented as a network node. The network node includes a plurality of optical input ports (OIPs) including a first set (1S) of OIPs and a second set (2S) of OIPs. The network node further includes a plurality of optical output ports (OOPs) including a 1S of OOPs and a 2S of OOPs. The network node further includes a reconfigurable optical add-drop multiplexer (ROADM). The ROADM includes an optical cross-connect (OXC) (or an optical circuit switch (OCS)). The OXC includes a plurality of OXC inputs coupled to the 1S of OIPs. The OXC further includes a plurality of OXC outputs coupled to the 1S of OOPs. In some embodiments, the OXC further includes one or more ancillary OXC optical inputs. In some embodiments, the OXC further includes one or more ancillary OXC optical outputs. The ROADM further includes a wavelength-selective switch (WSS). The WSS includes a plurality of WSS inputs coupled directly to the 2S of OIPS. The WSS further includes a plurality of WSS outputs coupled directly to the 2S of OOPS. In some embodiments, the WSS further includes one or more ancillary WSS optical inputs configured to couple or operationally connect to the one or more ancillary OXC optical outputs. In some embodiments, the WSS further includes one or more ancillary WSS optical outputs configured to couple or operationally connect to the one or more ancillary OXC optical inputs. The ROADM further includes one or more optical add inputs located on the OXC, on the WSS, or on both the OXC and the WSS. Each optical add input of the one or more optical add inputs is configured to receive one optical add signal or multiple optical add signals. The ROADM further includes one or more optical drop outputs located on the OXC, on the WSS, or on both the OXC and the WSS. Each optical drop output of the one or more optical drop outputs is configured to output one optical drop signal or multiple optical drop signals.

In some embodiments, the OXC is a micro electromechanical system (MEMS) cross-connect, a liquid crystal optical switch, a solid-state optical switch or any other suitable type of optical switch. Examples of solid-state optical switches may include optical switches bases on phase-change material, electro-optical switches, etc. In some embodiments, the WSS is a J×J WSS, where J is a positive integer. In some embodiments, the WSS is a further ROADM configured for wavelength switching. In some embodiments, each of the one or more optical add inputs is one of: a colorless and directionless (CD) optical add input, or a colorless, directionless and contentionless (CDC) optical add input. In some embodiments, each of the one or more optical drop outputs is one of: a colorless and directionless (CD) optical drop output, or a colorless, directionless and contentionless (CDC) drop-WSS optical output.

In some embodiments, the WSS is configured to aggregate multiple wavelengths received at multiple inputs of the WSS to an output of the WSS. In some embodiments, the multiple inputs include one or more of: a WSS input of the plurality of WSS inputs, an optical add input of the one or more optical add inputs located on the WSS, and an ancillary WSS optical input of the one or more ancillary WSS optical inputs. In some embodiments, the output of the WSS is one of: a WSS output of the plurality of WSS outputs, an optical drop output of the one or more optical drop outputs located on the WSS, and an ancillary WSS optical output of the one or more ancillary WSS optical outputs.

In some embodiments, the WSS is configured to disaggregate multiple wavelengths received at an input of the WSS to multiple output of the WSS. In some embodiments, the input of the WSS is one of: a WSS input of the plurality of WSS inputs, an optical add input of the one or more optical add inputs located on the WSS, and an ancillary WSS optical input of the one or more ancillary WSS optical inputs. In some embodiments, the multiple outputs of the WSS include one or more of: a WSS output of the plurality of WSS outputs, an optical drop output of the one or more optical drop outputs located on the WSS, and an ancillary WSS optical output of the one or more ancillary WSS optical outputs. In some embodiments, the plurality of WSS inputs is less than, more than or equal to the plurality of WSS outputs coupled.

In some embodiments, the OXC is configured to route an optical signal received at any one of the plurality of OXC inputs to any one of the plurality of OXC outputs. In some embodiments, the WSS is configured to route one or more optical signals received at one or more inputs of the WSS to one or more output of the WSS. In some embodiments, the one or more inputs of the WSS includes one or more of: a WSS input of the plurality of WSS inputs, an optical add input of the one or more optical add inputs located on the WSS, and an ancillary WSS optical input of the one or more ancillary WSS optical inputs. In some embodiments, the one or more outputs of the WSS includes one or more of: a WSS output of the plurality of WSS outputs, an optical drop output of the one or more optical drop outputs located on the WSS, and an ancillary WSS optical output of the one or more ancillary WSS optical outputs.

In some embodiments, each of the one or more optical add inputs or each of the one or more optical drop outputs is connected to a 1×N WSS, which is connected to an array of N OXCs. In some embodiments, each OXC of the array of N OXCs is sized M×M. In some embodiments, each OXC of the array of N OXCs is a micro electromechanical systems (MEMS) cross connect, a liquid crystal optical switch, a solid-state optical switch or any other suitable type of optical switch.

According to an aspect, an apparatus is provided for adding or dropping one or more optical signals at a network node. The apparatus includes a first array of M wavelength-selective switches (WSSs). Each WSS of the first array of M WSSs is sized 1×N and connected to an optical add input of M optical add inputs of the network node. The apparatus further includes a first array of N optical cross-connects (OXCs). Each OXC of the first array of N OXCs is sized M×M, connected to each WSS of the first array of M WSSs. Each OXC of the first array of N OXCs is further connected to a first set of transponders from which an optical signal is received for adding. Each OXC of the first array of N OXCs is sized M×M is a MEMS cross-connect, a liquid crystal optical switch (LCOS), or a solid-state optical switch.

In some embodiments, the apparatus may further include a second array of B WSSs. In some embodiments, each WSS of the second array of B WSSs is sized 1×Y and connected to an optical drop input of B optical drop inputs of the network node. In some embodiments, B is equal to or different from M and Y is equal to or different from N. In some embodiments, the apparatus further includes a second array of Y OXCs. In some embodiments, each OXC of the second array of Y OXCs is sized B×B and connected to each WSS of the second array of B WSSs. In some embodiments, each OXC of the second array of Y OXCs is further connected to a second set of transponders at which a second optical signal is dropped. In some embodiments, each OXC of the second array of Y OXCs is a MEMS cross-connect, an LCOS, or a solid-state optical switch.

In some embodiments, the M optical add inputs correspond to a primary OXC of the network node used for managing traffic flow at the network node. In some embodiments, the primary OXC is a MEMS cross-connect, an LCOS, or a solid-state switch. In some embodiments, the M optical add inputs correspond to a primary WSS of the network node used for managing traffic flow at the network node.

In some embodiments, the M optical add inputs correspond to a primary OXC of the network node and a primary WSS of the network node. In some embodiments, the primary OXC and the primary WSS manage traffic flow at the network node. In some embodiments, the primary OXC is a MEMS cross-connect, an LCOS, or a solid-state switch. In some embodiments, the M optical add inputs include $M_1$ optical add inputs and $M_2$ optical add inputs. The $M_1$ optical add inputs may correspond to the primary OXC and the $M_2$ optical add inputs may correspond to the primary WSS.

In some embodiments, the B optical drop inputs correspond to a primary OXC of the network node used for managing traffic flow at the network node. In some embodiments, the primary OXC is a MEMS cross-connect, an LCOS, or a solid-state switch. In some embodiments, the B optical drop inputs correspond to a primary WSS of the network node used for managing traffic flow at the network node. In some embodiments, the B optical drop inputs correspond to a primary OXC of the network node and a primary WSS of the network node. In some embodiments both of the primary OXC and the primary WSS are used for managing or manage traffic flow at the network node. In some embodiments, where both the primary OXC and the primary WSS manage the traffic load at the network node, the primary OXC is a MEMS cross-connect, an LCOS, or a solid-state switch.

In some embodiments, the B optical drop inputs include $B_1$ optical drop inputs and $B_2$ optical drop inputs, where the $B_1$ optical drop inputs correspond to the primary OXC and the $B_2$ optical drop inputs correspond to the primary WSS.

According to an aspect, an apparatus for dropping an optical signal received at a network node is provided. The apparatus includes a first array of B wavelength-selective switches (WSSs), where each WSS of the first array of B WSSs is sized 1×Y and connected to an optical drop input of B optical drop inputs of the network node. The apparatus further includes a first array of Y optical cross-connects (OXCs). Each OXC of the first array of Y OXCs is sized B×B and connected to each WSS of the first array of B WSSs. Each OXC of the first array of Y OXCs is further connected to a first set of transponders at which the optical signal is dropped. Each OXC of the first array of Y OXCs is a micro electromechanical system (MEMS) cross-connect, a liquid crystal optical switch (LCOS), or a solid-state optical switch.

According to an aspect, an apparatus is provided for adding or dropping one or more optical signals at a network node. The apparatus includes a first array of P optical cross-connects (OXCs). Each OXC of the first array is sized N×N and connected to a second array of N OXCs of the network node via P optical add inputs of each OXC of the second array. Each OXC of the first array further supports N super-channels, where each super-channel corresponds to a respective OXC of the second array. Each OXC of the first array is a MEMS cross connect, an LCOS or a solid-state optical switch. The apparatus further includes a third array of P OXCs. Each OXC of the third array is sized N×N connected to each OXC of the first array. Each OXC of the third array is further connected to a first set of transponders from which an optical signal is received for adding. Each OXC of the third array is a MEMS cross-connect, an LCOS or a solid-state optical switch.

In some embodiments, the apparatus further includes a fourth array of P OXCs. In some embodiments, each OXC of the fourth array is sized N×N and connected to the second array of N OXCs via P optical drop inputs of each OXC of the second array. In some embodiments, each OXC of the fourth array further supports the N super-channels. In some embodiments, each OXC of the fourth array is a MEMS cross-connect, an LCOS, or a solid-state optical switch.

In some embodiments, the apparatus further includes a fifth array of P OXCs. In some embodiments, each OXC of the fifth array is sized N×N and connected to each OXC of the fourth array. In some embodiments, each OXC of the fifth array is connected to a second set of transponders at which a second optical signal is dropped. In some embodiments, each OXC of the fifth array is a MEMS cross-connect, an LCOS, or a solid-state switch.

According to another aspect, an apparatus may be provided. The apparatus includes modules or electronics configured to perform one or more of the methods and systems described herein.

According to one aspect, an apparatus may be provided, where the apparatus includes: a memory, configured to store a program; a processor, configured to execute the program stored in the memory, and when the program stored in the memory is executed, the processor is configured to perform one or more of the methods and systems described herein.

According to another aspect, a computer readable medium may be provided, where the computer readable medium stores program code executed by a device and the program code is used to perform one or more of the methods and systems described herein.

According to one aspect, a chip may be provided, where the chip includes a processor and a data interface, and the processor reads, by using the data interface, an instruction stored in a memory, to perform one or more of the methods and systems described herein. Aspects may further include the memory.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods and systems described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 8 shows a table of connection losses through various components of a network node, according to an embodiment.

FIG. 9 shows a table indicating a non-optimized degrees of nodes of the network of FIG. 2A.

FIG. 10A shows a table indicating hop counts from a source node to other nodes in the reference network, according to an embodiment.

FIG. 15 shows a table of fiber allocation, according to an embodiment.

FIG. 23 shows a table indicating the performance results for the first mode and the second mode of FIG. 19, according to an embodiment.

FIG. 26A shows a table of required components of the node architecture of FIG. 25A and FIG. 25B, according to an embodiment.

FIG. 26B shows a table of connection loss (dB) through the node architecture of FIG. 25A and FIG. 25B, according to an embodiment.

FIG. 31 shows a table of design parameters and components for the high-degree ROADM of FIG. 27B and associated cost of equipment, according to an embodiment.

FIG. 32 shows a table indicating insertion loss for the high-degree ROADM of FIG. 27B, according to an embodiment.

FIG. 38 shows a table indicating connection loss based on a second architecture using a 3-stage WSS-WSS-WSS solution, according to an embodiment.

FIG. 39 illustrates a table indicating component cost and complexity for based on the second architecture using a 3-stage WSS-WSS-WSS solution, according to an embodiment.

FIG. 42A and FIG. 42B shows a table summarizing the performance of various architectures, according to an embodiment.

It will be noted that throughout the appended drawings, like features are identified by like reference numerals.

DETAILED DESCRIPTION

Figure 1:
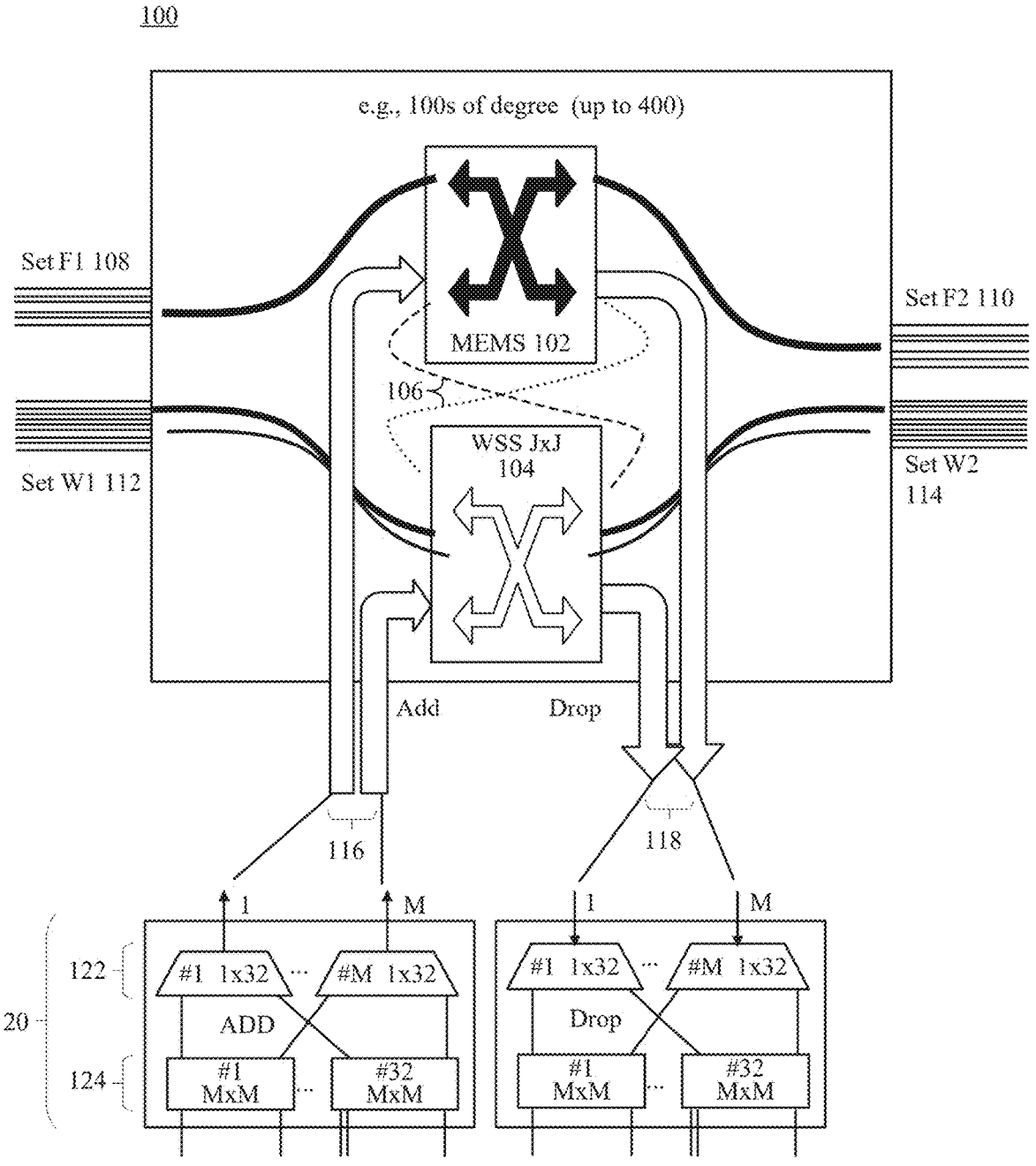
FIG. 1 illustrates a network node, according to an embodiment.

According to an aspect, a flexible node design for a high-degree ROADM is provided. In an embodiment, this design is implemented as a network node. The network node includes a plurality of optical inputs and a plurality of optical outputs. The network node further includes an OXC or an OCS component and a WSS component, where each of the OXC (or OCS) and the WSS component has a set of inputs including one or more of the plurality of optical inputs and a set of outputs including one or more of the plurality of optical outputs. In some embodiments, the OXC/OCS component is a MEMS cross-connect, an LCOS, a solid-state optical switch or any other suitable type of optical switch. In some embodiments, the OCS/OCS (e.g., MEMS) and the WSS are interconnected such that one or more outputs of the OCS/OCS (e.g., MEMS) are connected to one or more inputs of the WSS component or vice versa. In some embodiments, the OCS/OCS (e.g., MEMS) and the WSS are further interconnected where one or more outputs of the WSS are connected to one or more inputs of the OCS/OCS (e.g., MEMS) component. In some embodiments, the network node has a set of add inputs and a set of drop outputs. In some embodiments, one or both of the OCS/OCS (e.g., MEMS) component and the WSS components have one or more add inputs of the set of add inputs. In some embodiments, one or both of the OCS/OCS (e.g., MEMS) component and the WSS component have one or more drop outputs of the set of drop outputs.

Accommodating sustained exponential traffic growth in optical networks may require capacity scaling and adding multiple pairs of bi-directional fibers on the links of the optical networks. To enable scaling and adding capacity per demand, one or more network nodes and the capability of optical networks may need to be enhanced, potentially more likely for the metro environment due to greater traffic increase. This means that one or more optical switches, e.g., reconfigurable add-drop multiplexers (ROADMs), may need to increase the number of their bi-directional fibers connected to one or more other nodes of the corresponding optical network. To distinguish the nodal degree of a node from the conventional geographic degree, in an embodiment, a degree of a node (e.g., a ROADM node), as used herein, may refer to the total number of fiber link pairs connected to the node.

In a given a limited fiber capacity, as traffic increases, the network operators may add multiple single-mode fibers (SMFs) or multi-core fibers (MCFs) to their network. With the deployment of each new fiber, the degree of the ROADM nodes changes due to the creation of a new optical multiplex section (OMS) between the head and tail ROADM nodes. The addition of new OMSs creates scaling challenges for the operators as the size of a key component in the design of a ROADM node, i.e., wavelength select switch (WSS), is limited today to a maximum of 1×32. Hence, the number of degrees that a ROADM can offer will be bounded. Expanding a WSS size is challenging and expensive because of the limited steering angle of liquid crystal on silicon (LCOS) technology. Even if the next generation WSS is expanded to 1×64, the degrees of ROADM node size is still bounded by the size of the WSS. As a result, a common strategy has been to use small-size WSSs to build a high-degree ROADM.

A high-degree optical ROADM node may be understood to have one or more of the following requirements: scalability from tens to hundreds of degrees using existing WSSs, flexibility in adding or dropping wavelength channels up to 100% of node capacity, allowance for minimizing of scaling cost, and improved rate of return for network operators. In some embodiments, a wavelength channel or a channel may refer to a single wavelength (e.g., 50 GHz) within an optical spectrum. In some embodiments, a super-channel may refer to a spectral range that may allow for higher data rates, for a non-limiting example, a super-channel may encompass a broad spectral range, e.g., 150 GHz or 200 GHz of bandwidth.

In an embodiment, a ROADM is an optical node that performs one or more functions including adding, blocking, passing and redirecting of light beams of various wavelengths in a fiber optic network. ROADMs are used in systems that employ wavelength division multiplexing allowing data traffic modulated on a wavelength light to be added at a source node and then passed through one or many network nodes (e.g., ROADM nodes) before it is dropped at a destination node that de-modulates the light and decodes the data to electronic bits. ROADMs are involved in switching and transporting a high volume of data. Switching and transporting data in an optical network may be characterized by two parameters: one is the number of directions (or the number of fibers) and the other is the number of wavelengths that can be added or dropped at a given node. Each fiber can carry a predetermined number of channels (e.g., 80 channels for International Telecommunication Union (ITU) 50 GHz fixed grid for 4 THz of fiber bandwidth or 80 super channels of 150 GHz for 12 THz of fiber bandwidth). In the absence of wavelength conversion at a ROADM node, wavelength channel n of a fiber on direction i may be dropped or switched to wavelength channel n of direction j. In some embodiments, a fiber using the conventional C-band can support 80 channels, each channel with a 50 GHz bandwidth. In some embodiments, by using Super-C and Super L bands, the bandwidth capacity of a fiber can be extended to 12 THZ. This increased capacity may allow for accommodating 240 single channels with 50 GHz bandwidth each, or 80 super-channels with 150 GHz bandwidth each. In some embodiments, a 12 THz bandwidth can be allocated or used for 60 super-channel, each utilizing a 200 GHz bandwidth.

A single ROADM node chassis may be a 16-slot chassis or a 32-slot chassis. For instance, a 32-slot chassis that inter-connects all the slots by an optical backplane can be configured as a 16-degree ROADM with 16 single-slot line cards with twin WSS 1×32 and 8 double-width add/drop cards that occupy the other 16 slots. The add/drop rate may depend on the design of the add/drop card and the number of port(s) on the add/drop cards. For instance, for a ROADM node with 16 degrees and 24 ports per add/drop card, the add/drop rate is (8 card×24 ports per card)/(16 directions×80 channels per direction)=15%, based on 80 channels on each fiber.

Because of the challenges and costs associated with expanding the size of WSSs, some research efforts have focused on scaling ROADMS using the same WSS size. These work are based on building a large ROADM node by exploiting nodal degree bundling to selectively reduce degree connectivity to allow the same WSS size to be used for larger ROADM nodes. In another work, the size of M×N WSSs on the add-drop side has been reduced by partially connecting fiber link degrees to the add-drop modules making the design partially directionless. While both of these approaches could increase the number of directions of a ROADM, they sacrifice the directionless feature of a ROADM, hence, degrading the switching performance of the scaled node.

A third approach is based on constructing a larger ROADM node using smaller sub-system nodes that are daisy-chained using intra-node fibers. Similar to the other two approaches, this third approach also reduces the flexibility of a scaled node in terms of any-to-any connectivity, diversity in intra-node insertion loss, and may require network-level work-around. In another approach, to enhance the added number of degrees of a ROADM to a Colorless-Directionless Contention-less (CDC) ROADM, an additional switching layer (inner or outer fiber/band switch) has been introduced to WSS switches of the ROADM to create a hybrid wavelength and fiber/band switched ROADM node. This approach changes the design of the ROADM chassis and may require a large cross-connect and/or a plurality of space/band switches for connectivity of the WSSs. In another approach, a programmable ROADM system for MCF-based spatial division multiplexing/wavelength division multiplexing (SDM/WDM) network has been proposed that employs both bypass connections through fiber switching and route-and-select by wavelength switching. While this approach shows a potential path for scaling an optical node, it underutilizes the network capacity and results in poor performance in terms of the number of connections that can be supported, given a target node's blocking performance.

In yet another approach, a cluster architecture has been proposed based on a 3-stage under-dimensioned Clos fabric using a ROADM chassis. In this approach, the functions of a ROADM node based on the cluster architecture (a cluster node) are a line function, an add/drop function and an interconnectivity function between the line function and the add/drop function. In a cluster node, these functions are separated into different chassis: a line chassis equipped with line cards plus some interconnect card, an add/drop chassis equipped with add/drop cards and interconnect cards, and an interconnect chassis for providing interconnectivity between the line chassis and the add/drop chassis.

While the cluster architecture may allow for scaling ROADM nodes with flexible add/drop functionality, the amount of polarization-dependent loss (PDL) is a limitation. This loss is due to each of the three stages having two WSSs, hence, a connection will go through six WSSs. As the amount of PDL per WSS is about 0.4 decibels (dB), the total PDL for the cluster node will amount to 2.4 dB. This amount of loss may be impractical by today's standard, and as a result, another approach with improved loss is desirable. Such an approach may be based on a smaller number of stages or a smaller number of WSSs in a connection path.

One consideration for scaling a ROADM chassis may be using existing WSS components to keep the cost low. Another consideration may be forward and backward compatibility of the components used to maintain the component eco-system. These considerations are relevant as customers not only need to retain their investments in the equipment they purchase, but be able to maintain forward and backward compatibility, at least for one generation.

Another consideration for scaling a ROADM chassis may be to limit trade-offs in node performance, i.e., maintaining color-less ability, direction-less and contention-less of the ROADM node. Another consideration may be minimizing the number of WSSs in a path connection to reduce PDL. Maintaining performance when scaling a network is relevant, as expansion should not compromise performance.

According to an aspect, an improved network node is provided. According to an embodiment, degrees of a network node (e.g., a ROADM node) may be scaled using one or more optical switches. The one or more optical switches may include one or more of: an OXC, an optical circuit switch (OCS), a liquid crystal optical switch (LCOS) a solid-state optical switch, a MEMS, a WSS, or other optical switch technology. In some embodiments the network node 100 may include a first optical switch 102 and a second optical switch 104. The first optical switch may be an OXC or an OCS, and the second optical switch may be a WSS. The OXC or OCS may include any one of MEMS, LCOS, solid-state optical switch or any other suitable optical switch. In an embodiment, for the WSS portion 104 of the network node, a single WSS or a plurality of WSS may be arranged in a 2-stage full connectivity that form a multi-input to multi-output WSS (as in today's ROADM for example). As may be appreciated, in some embodiments described herein, reference to MEMS may refer to an OXC or an OCS, which may include any one of MEMS, LCOS, solid-state optical switch or other suitable optical switch. For example, MEMS is referred to an optical switch which connects to line fibers (e.g., MEMS 102 or MEMS in other embodiments described herein) or is part of an add/drop design (e.g., in array 124 in add/drop 120 or other embodiments of add/drop designs described herein), and these references of MEMS may refer to an OXC or an OCS, which may include any one of MEMS, LCOS, solid-state optical switch or any other suitable optical switch.

In an embodiment, a stacked configuration of the first switch (e.g., a MEMS) and the second switch (e.g., a WSS) may be used to scale the degrees of a network node. In an embodiment, a network node may include one or more chips that stack one or more of a MEMS and a WSS. The network node may have at least two sets of fibers in and out as described herein.

An aspect of the disclosure may provide a node architecture that allows scaling to higher degree ROADMs. This node architecture may offer an improved design in terms of cost and the number of components required. The node architecture, according to an embodiment, may further allow for improved performance in terms of blocking rate and insertion loss both at node level and at network level.

According to an embodiment, a high-degree network node (high-degree ROADM) is provided and uses a stack of a first optical switch such as a MEMS (e.g., a large MEMS) and a second optical switch e.g., a WSS J×K that are interconnected, where J is equal to, greater than, or less than K. Embodiments described herein may refer to WSS J×J, however, it may be appreciated that, where appropriate, the WSS J×J may be a WSS J×K. In some embodiments, the WSS J×K is implemented based on a single device or a plurality of WSS arranged together to form the WSS J×K. Each of the MEMS and the WSS may independently send and receive optical signals across one or more connectivity paths provided by the ROADM node. Each of the MEMS and the WSS may further independently add wavelengths from transponders to line fibers via add fibers or drop wavelengths from line fibers to the transponders via drop fibers. In some embodiments, line fibers may refer to the transmission channels in optical networks, responsible for carrying traffic between network nodes, such as switches, routers, and transponders. In some embodiments, add fibers refer to fibers that add new wavelengths (or channels) of data or signals into the network. In some embodiments, drop fibers refer to fibers that selectively remove (or drop) specific wavelengths or channels of data or signal from the network.

FIG. 1 illustrates a network node, according to an embodiment. In some embodiments, the network node 100 includes a first optical switch 102 (e.g., a MEMS) and a second optical switch 104 (e.g., WSS 104 (e.g., WSS J×J). As described herein, the first optical switch 102 may be an OXC or an OCS, and the second optical switch may be a WSS. The first switch, referring to the OXC or OCS, may include any one of MEMS, LCOS, solid-state optical switch or any other suitable optical switch. As may be appreciated, where appropriate, in some embodiments described herein, reference to a MEMS may refer to an OXC or an OCS, which may include any one of MEMS, LCOS, solid-state optical switch or any other suitable optical switch. In some embodiments, the architecture of the network node 100 may be referred to as a stacked architecture. In some embodiments, the WSS component 104 is a 2-stage WSS with a set of WSS 1×K at the first stage and a set of WSS K×1 at the second stage (similar to FIGS. 25A and 25B). In some embodiments, the WSS J×J component 104 is constructed using ROADM of 16 to 32 degrees based on WSS 1×32, where J<=32. In some embodiments, the MEMS 102 and the WSS 104 are not interconnected. In some embodiments, the MEMS 102 and the WSS 104 are interconnected by a connection 106, and thus, the interconnectivity of the MEMS and the WSS is an optional feature of the network node.

To interconnect the MEMS 102 with the WSS 104, in some embodiments, the MEMS includes one or more ancillary optical inputs and one or more ancillary optical outputs. Similarly, the WSS may include one or more ancillary optical inputs and one or more ancillary optical outputs. In an embodiment, the one or more ancillary optical outputs of the MEMS are configured to couple or operationally connect to one or more ancillary optical inputs of the WSS. Similarly, in some embodiments, the one or more ancillary optical outputs of the WSS configured to couple or operationally connect to one or more ancillary optical inputs of the MEMS. In the context of the present disclosure, ancillary optical inputs or outputs are optical inputs or outputs of the MEMS or WSS that are not directly connected to fibers extending away from the network node 100.

In the present disclosure, an input of a first device (e.g., MEMS 102 or WSS 104) and an output of a second device (e.g., MEMS 102 or WSS 104) can be said to be operationally connected (or the input of the first device is configured to couple with the output of the second device) when, for example, a signal at the output of the second device can be provided (e.g., directly) to the input of the first device or through a controllable switch. Further, elements in a network can be said to be operationally connected when an action in, or a state of, one element can be controlled by, or related to, an action in, or a state of, another element.

In an embodiment, each of MEMS 102 and WSS 104 has its own set of fibers to and from line fibers. For example, the MEMS 102 may have (or be connected, e.g., directly, to) a set of incoming fibers 108 that carry optical signals into the MEMS 102 from various parts of the network. The MEMS 102 may further have a set of outgoing fibers 110 that carry optical signals away from the MEMS 102 to other parts of the network. The set of incoming fibers 108 and outgoing fibers 110 form part of the total degrees of the network node 100. Similarly, the WSS 104 may have a set of incoming fibers 112 that carry optical signals into the WSS 104 from various parts of the network. The WSS 104 may further have a set of outgoing fibers 114 that carry optical signals away from the WSS 104 to other parts of the network. The set of incoming fibers 112 and outgoing fibers 114 form a second part of the total degrees of the network node 110.

In an embodiment, each of the MEMS 102 and the WSS 104 can independently add optical signals to its outgoing fibers and independently drop optical signals from its incoming fibers using, for example, an add/drop module 120. In some embodiments, the add/drop module 120 is based on a classical CDC design that is deployed for today's ROADM or Colorless-Directionless (CD) design.

In some embodiments, the add/drop functionality of the network node 100 may be performed by one or both of the MEMS 102 and the WSS 104 components. Each of the MEMS and the WSS may support add/drop functionality independently.

According to an aspect, an add/drop module 120 is provided. In some embodiments, the add/drop module 120 is based on a CDC design that uses one or more an OXC, an optical circuit switch (OCS), a liquid crystal optical switch (LCOS) a solid-state optical switch, a MEMS, a WSS, or other suitable optical switch. In some embodiments, the add/drop module 120 includes an array of OXC 124 (or an array of OCS). Each of the OXC or OCS in the array 124 may include any one of MEMS, LCOS, solid-state optical switch or any other suitable optical switch. As described herein, where appropriate, in some embodiments, reference to MEMS (e.g., as used as an optical switch to connect to line fibers or as part of the add/drop design) may refer to an OXC or an OCS, which may include any one of MEMS, LCOS, solid-state optical switch or any other suitable optical switch. In an embodiment, the add/drop module 120 uses an array of M WSS 1×N 122 (e.g., WSS 1×32) that are inter-connected to an array of N MEMS (e.g., MEMS M×M) 124 as illustrated. The add/drop module 120 may provide full add/drop connectivity between the add/drop fibers and add/drop ports based on the interconnected array of M WSSs with each WSS being a 1×N WSS 122 and the array of N MEMS 124 (N may be equal to 32 or to any other suitable number). For example, each add port is connected to each add fiber of the set of add fibers 116 of the network node via the interconnected array of M WSSs 122 and the array of N MEMS 124. Similarly, each drop fiber of the set of drop fibers 118 of the network node is connected to each drop port via the interconnected array of M WSS 122 and the array of N MEMS 124.

In an embodiment, the number of add/drop ports, n, may be given as:

$$n = N \times M$$

where N is the size of the WSS and M is the size of MEMS. In some embodiments, 2 or more M×M MEMS are combined into one to form a larger size MEMS. The add/drop rate of add/drop module 120 may be given by:

$$rate = N \cdot M / (M \cdot L)$$

where L is the number of super-channels on a fiber, and N and M are WSS and MEMS sizes, respectively. In an embodiment, considering N=32 and L=80, the add/drop rate is 40% for this design. The value of M may depend on the node degree, D. Assuming a maximum node degree of 384 (D=384) and assuming a MEMS size of 512×512, then M may be given as:

$$M = M_1 + M_2$$

where $M_1$ is the number of add/drop fibers from the MEMS component 102 and $M_2$ is the number of add/drop fibers from the WSS component 104. As an example, for D=384, using a MEMS with a size 512× 512, $M_1$=512−D, which is $M_1$=112. Assuming a size of a WSS, J, e.g., J=64, and there are 16 fibers dropped, then $M_2$=16. Hence, the value of M is $M_1$+$M_2$=128.

Each of the MEMS 102 and WSS 104 (along with their corresponding fibers) may be used for different services at network level. For example, the set of fibers (e.g., direct fibers) connected to WSS may be used for "one-hop" connections only. In this case, the number of fibers to and from the WSS may be limited, as the number of fibers may be determined by the geographical degree. For instance, if the geographical degree is S and a node uses 2 fibers for connection to single hop nodes, then J of the WSS J×J is determined as follows: J=2×S. As may be appreciated, geographical node degree may be different from the node degree. In some embodiments, the geographical degree is a single digit, e.g., a value from 1 to 8 indicating the number of geographical directions that a node supports (e.g., north, west, south, east, north-west, north-east, south-east or south-west). Node degree on the other hand may be in the hundreds, indicating that each of the geographical degrees may have many fibers. Geographical degree and node degree may further be understood from FIGS. 2A, B and C.

Figure 2A:
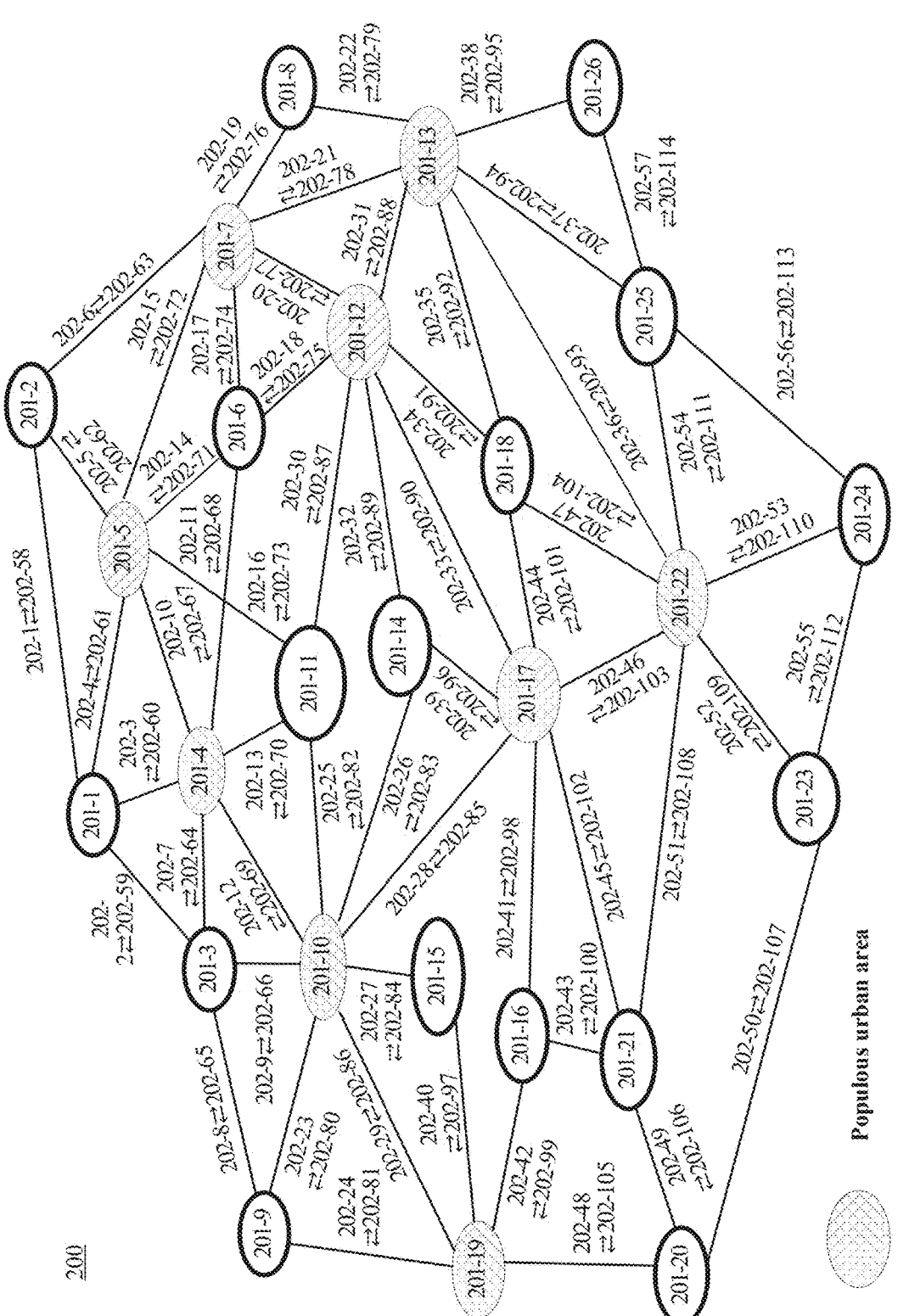
FIG. 2A illustrates a reference network according to an embodiment.

FIG. 2A illustrates a reference network 200 according to an embodiment. The reference network 200 includes 26 nodes 201-1 to 201-26 and 114 unidirectional links 202-1 to 202-114 (or 57 bidirectional links). Each link is labeled with two numbers indicating bidirectionality, where the lower label indicates fiber(s) from a lower indexed node to a higher indexed node, and the higher label indicates fiber(s) from a higher indexed node to a lower indexed node. For example, network node 201-1 and network node 202-2 are connected via link 202-1 and 202-58, where link 202-1 refers to fibers carrying optical signals from network node 201-1 to network node 201-2, and link 202-58 indicates fibers carrying optical signals from network node 201-2 to network node 201-1. The network 200 may represent a generic fiber network of a region which may be optimized according to one or more embodiments described herein.

Figures 2B, 2C:
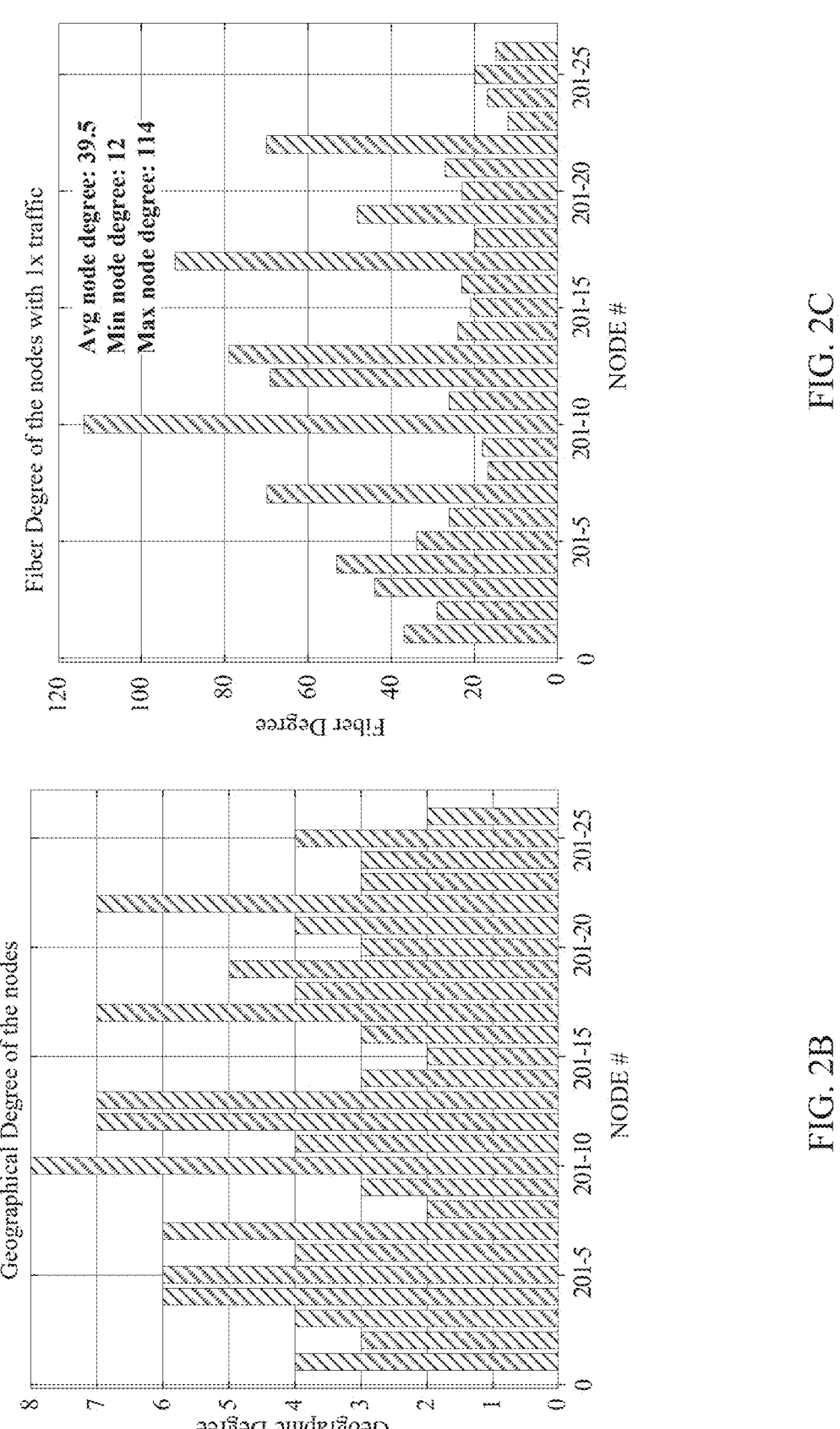
FIG. 2B illustrates geographical degrees of the nodes of the network of FIG. 2A, according to an embodiment.
FIG. 2C illustrates the degree of each node of the network of FIG. 2A, according to an embodiment.

FIG. 2B illustrates geographical degrees of the nodes of the network 200, according to an embodiment. As illustrated, the geographical degree of each network node of the network 200 is shown. FIG. 2C illustrates the degree of each node of the network, according to an embodiment. The degree of nodes shown in FIG. 2C indicates a number of fibers on each geographical degree of the node. For the representative network 200, the average node degree is 39.5, with the minimum node degree being 12 degrees, and the maximum node degree being 114.

The network node 100 may be configured differently depending on the application. In some embodiments, the configuration is based on rules that are set in using one or more of: a MEMS 102 and a WSS 104. In some embodiments, the interconnectivity 106 between MEMS 102 and WSS 104 is used.

In some embodiments, each of the MEMS 102 and WSS 104 are used independently in the network node 100 for both passthrough and add/drop. In such embodiments, the network node uses both the MEMS and the WSS for connectivity to the other nodes of the network. In some embodiments, connectivity among network nodes is based on some rules (e.g., a rule-based connectivity). For instance, one rule may indicate using the node's MEMS component for connections to nodes that are two or more hops away, while the same rule or another rule may indicate using the WSS component for connections with nodes that are a single hop away. This rule has been used for assessing performance of the network node as described herein.

Figure 3:
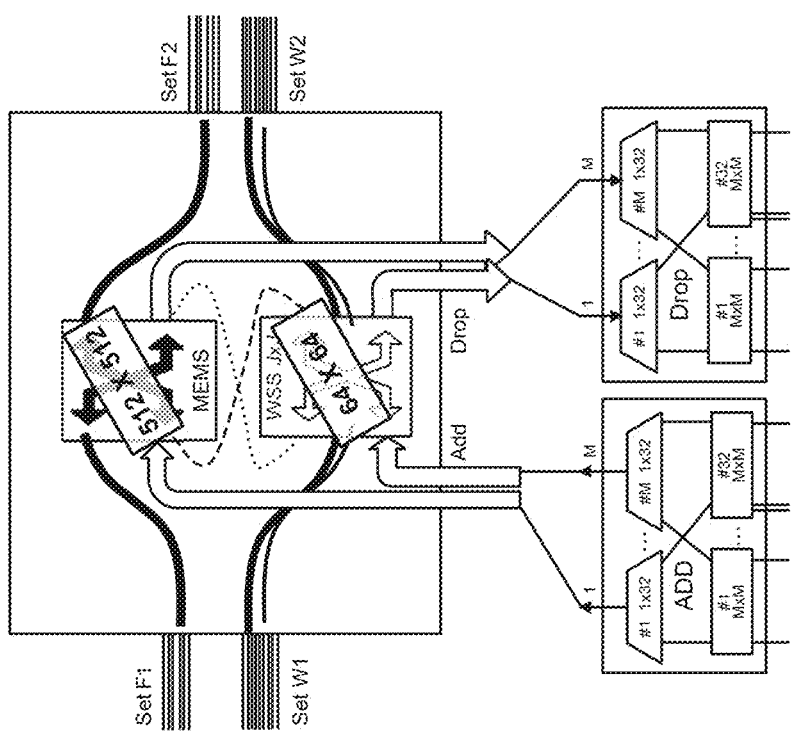
FIG. 3 illustrates a network node with both MEMS and WSS components being used for passthrough and add/drop, according to an embodiment.

FIG. 3 illustrates a network node 300 with both MEMS and WSS components being used for passthrough and add/drop, according to an embodiment. The network node 300 may be similar to the network node 100. In an embodiment, each of the MEMS and WSS component of the network node 300 operates independently for passthrough and add/drop. Network node 300 may operate based on a rule-based system that may be defined by a network operator. This mode of operation, which involves configuring the network node 300 to use both MEMS and WSS for passthrough and add/drop operations based on a rule-based system, may be used for modeling the network 200 to evaluate the performance of the network node 100. In modelling the network, the network traffic matrix is assumed to be uniform.

According to another embodiment, the network node is configured to use only MEMS for both passthrough and add/drop. In some embodiments, the network node that uses only the MEMS component 102 for passthrough and add/drop operations has a provisioned fiber to one or more other network nodes that results in aggregating the wavelength connections to the destination node. The one or more other network nodes may include a network node with operating WSS for aggregating the wavelength connections to the destination node. Conversely, in some embodiments, the connections at the destination nodes are disaggregated by the drop components as they are sent to the target transponder that operates at relevant wavelength.

Figure 4:
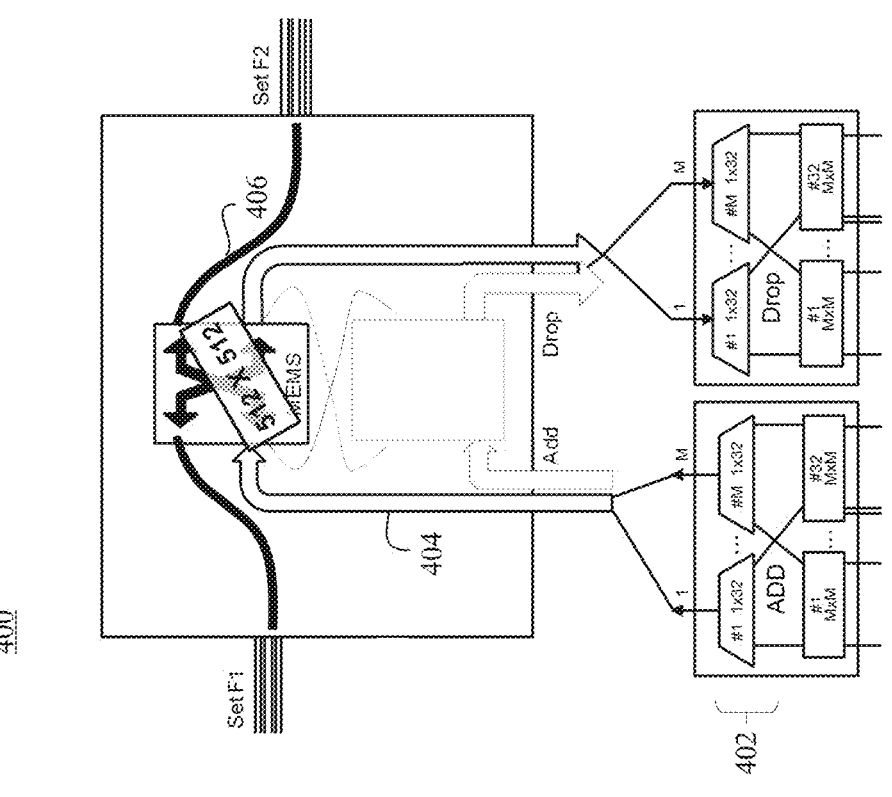
FIG. 4 illustrates a network node that uses only a MEMS component for passthrough and add/drop operations, according to an embodiment.

FIG. 4 illustrates a network node that uses only its MEMS component for passthrough and add/drop operations, according to an embodiment. In some embodiments, the wavelength connections destined to a given destination are aggregated by one or more of the M add WSSs 402 and then these fibers 404 are switched by the MEMS to the fiber path 406 provisioned for that destination. At the destination, the fiber path is switched to one or more of the M drop WSSs which switches the wavelength connection to the transponders.

Figures 5, 6:
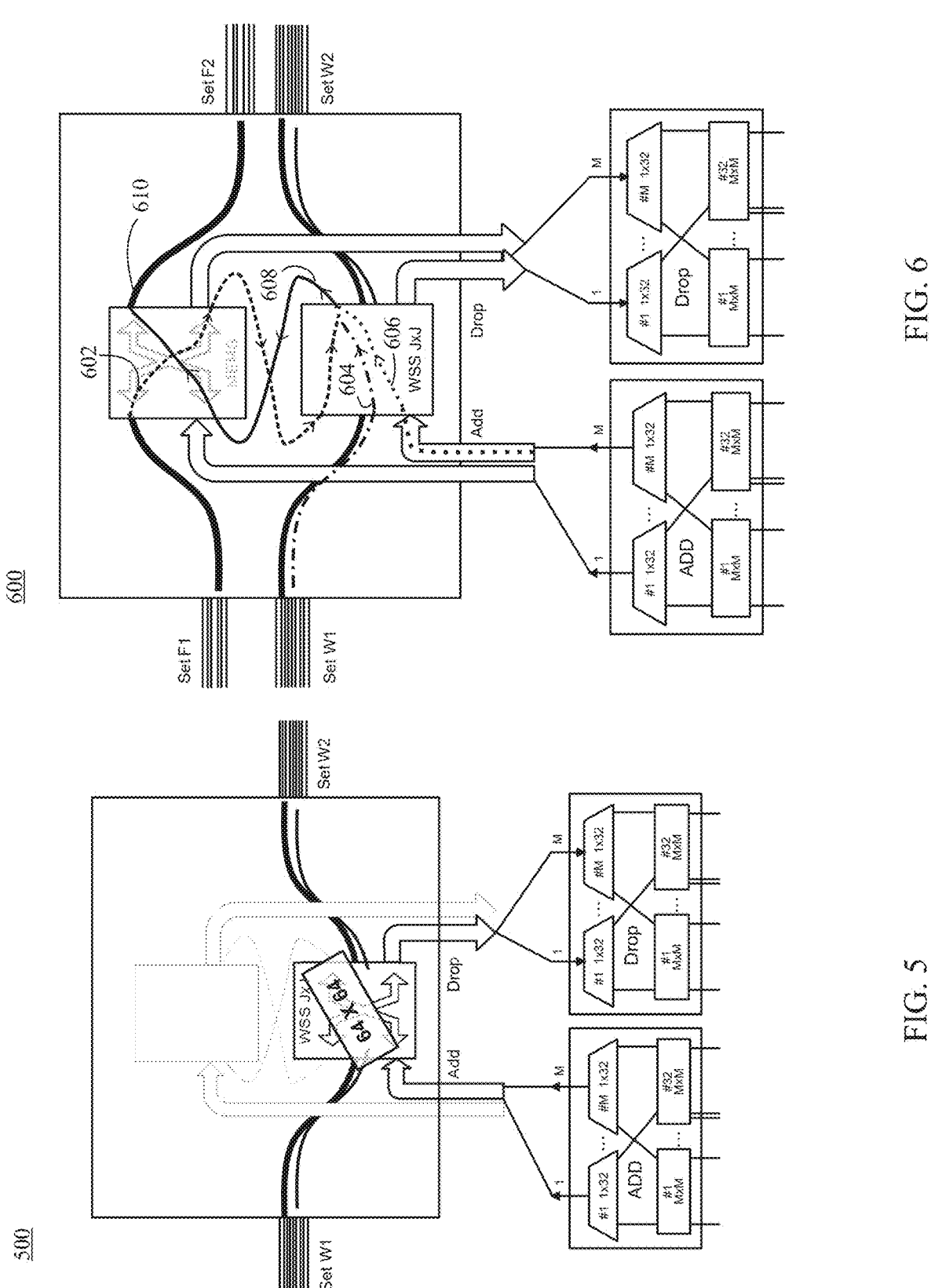
FIG. 5 illustrates a network node using only a WSS component to manage wavelength connections, according to an embodiment.
FIG. 6 illustrates a network node aggregating multiple optical signals, according to an embodiment.

In some embodiments, the network node is configured to use only the WSS component and operate similar to a traditional ROADM node, as though without fiber switching. Configuring the network node to use only its WSS component may offer an additional flexibility for service providers deploying this node architecture as it allows node planning of a network based on the traffic profile. For instance, for access ROADM nodes where the length of a connection in terms of number of hops is relatively short, this scenario (using only WSS component) may be a good option. FIG. 5 illustrates a network node using only its WSS component to manage wavelength connections, according to an embodiment. The network node 500, along with its WSS switch and the add/drop components, may operate similar to a conventional ROADM node. This mode of operation, referring to network node 500, may be referred to as classical ROADM mode.

In some networks, a network operator may decide to aggregate the traffic going to a certain destination at certain points of the network. A network node, according to an embodiment, aggregates multiple traffic received at the network node using the interconnectivity between the MEMS and the WSS.

FIG. 6 illustrates a network node aggregating multiple optical signals, according to an embodiment. Network node 600 may be configured to use both its MEMS and WSS for passthrough and add/drop operations. The MEMS and WSS of the network node 600 may further be connected via their corresponding ancillary optical inputs and ancillary optical outputs. For example, one or more ancillary optical outputs of the MEMS may be operationally connected (or configured to couple) to one or more ancillary optical inputs of the WSS. Similarly, one or more ancillary optical outputs of the WSS may be operationally connected (or configured to couple) to one or more ancillary optical inputs of the MEMS.

In an embodiment, network node 600 is configured to aggregate or route multiple optical signals received at multiple optical inputs to an optical output. For example, three sets of wavelength connections, including a first set of wavelength connections 602 (a first optical signal) received at an input fiber of the MEMS, a second set of wavelength connections 604 received at an input fiber of the WSS, and a third set of wavelength connections 606 received from an add WSS component, may be aggregated or routed into an output fiber 608 of the WSS. The output fiber 608 of the WSS may be operationally connected (or configured to couple) to an ancillary optical input of the MEMS. The MEMS may then switch the combined or aggregated optical signal received at the ancillary optical input to an output fiber 610 as shown.

For large networks, a network operator may choose to disaggregate the wavelength traffic that arrive at the input fiber of a network node. In some embodiments, disaggregation is applied to or at either the MEMS component or the WSS component. As may be appreciated, disaggregation is the inverse or opposite of aggregation function.

Figure 7:
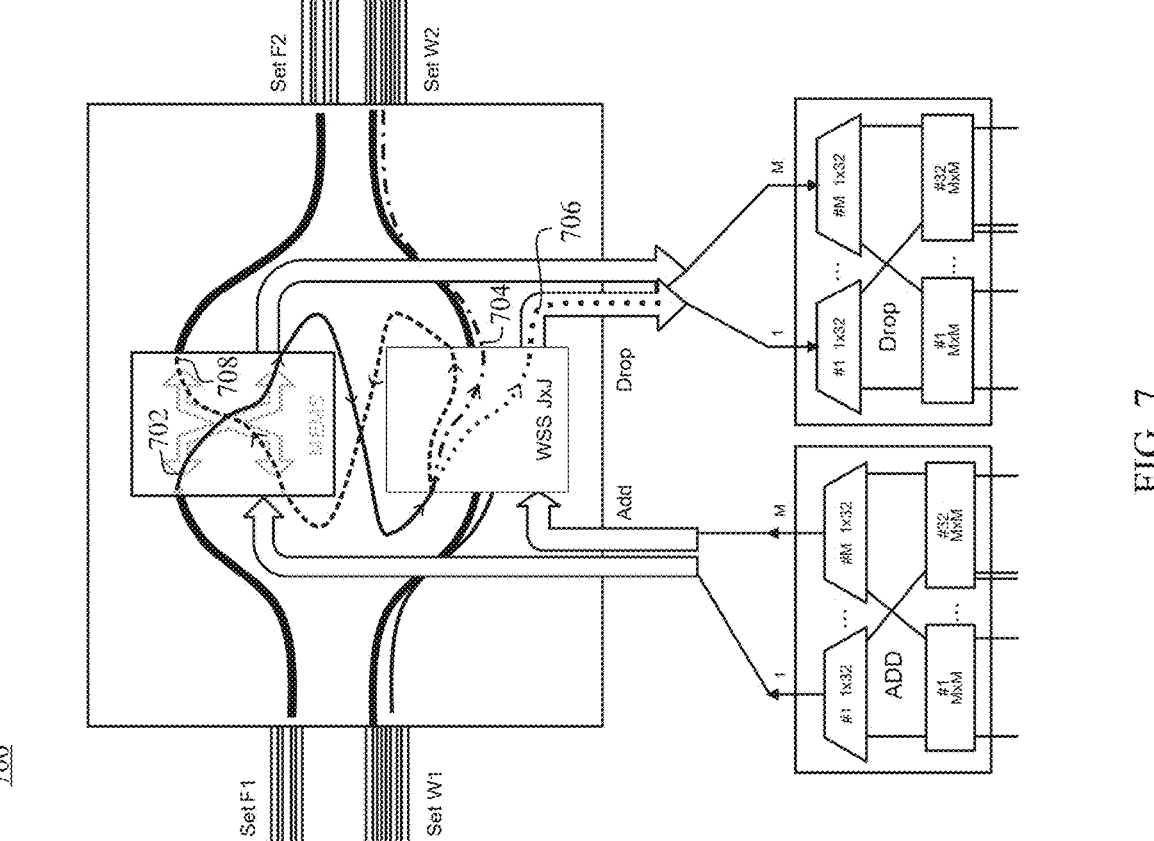
FIG. 7 illustrates a network node disaggregating multiple optical signals received at an input fiber, according to an embodiment.

FIG. 7 illustrates a network node disaggregating multiple optical signal received at an input fiber, according to an embodiment. Similar to network node 600, network node 700 may be configured to use both its MEMS and WSS for passthrough and add/drop operations. The MEMS and WSS of the network node 700 may further be connected via their corresponding ancillary optical inputs and ancillary optical outputs.

In an embodiment, network node 700 is configured to disaggregate multiple optical signals (multiple wavelengths) received an optical input to multiple optical outputs. For example, multiple wavelengths received at an input fiber 702 of the MEMS may be disaggregated or routed to an output fiber 704 of the WSS, a dropped fiber 706 of the WSS, and to an output fiber 708 of the MEMS (via the interconnectivity between the WSS and the MEMS as described herein). As may be appreciated, the disaggregation operations may also be done to an input traffic of WSS component of stacked architecture.

As described herein, the network node 100, according to one or more embodiments, includes at least one MEMS and at least one WSS. The add/drop design 120 may include a combination of WSS and MEMS as described herein.

In an embodiment, a network node with 192 degrees and a network node with 384 degrees is constructed. The network node with 192 degrees may have 33% add/drop rate. In an embodiment, the network node with 192 degrees includes for the line part: 1*(256×256) MEMS+WSS32×32. The network node with 192 degrees further includes for the add/drop part: 128*WSS1×32+64*(64×64) MEMS. As may be appreciated, the 64*(64×64) MEMS of the add/drop part may be replaced by 8*(512×512) MEMS.

The network node with 384 degrees may also have 33% add/drop rate. In an embodiment, the network node with 384 degrees includes for the line part: 1*(512×512) MEMS+ WSS 64×64. The network node with 384 degrees further includes for the add/drop part: 256*WSS1×32+64*(128× 128). As may be appreciated 16*(512×512) can replace the 64*(128×128) for the add/drop part.

For network node 100, depending on the mode or configuration that is being deployed, connection loss may differ. This is due to the handling of passthrough and add/drop connections which can be performed through either WSS or the MEMS component independently. Whether the WSS or the MEMS is used for a connection may depend on the rules set by a network operator. Some embodiments described herein illustrate an example of such rules in assessing end-to-end connection loss through the network. Regarding connection loss at the node-level, FIG. 8 illustrates connection losses through various components of the network node, according to an embodiment. Table 800 shows the connection loss for different components of the network node 100 in various modes of operation. The loss calculations are based on the following assumptions: a WSS J×J loss of 18 dB, a MEMS loss of 3 dB, and a WSS 1×32 loss of 8.5 dB. In some embodiments, the WSS J×J, e.g., WSS 32×32, may be constructed using a 2-stage architecture with 32 arrays of WSS 1×32 in stage-1, each fully connected to 32 WSS 32×1 of the stage-2. In some embodiments, the WSS J×J may be a single component. As may be appreciated, the estimated loss of 18 dB is based on the former assumption that a 2-stage array of WSS 1×32 and WSS 32×1 is used. As the loss of each WSS is 8.5 dB and with an additional 1 dB loss of the interconnection, the cumulative loss of the WSS 32×32 is estimated as 2×8.5 dB+1=18 dB In an embodiment, the performance of the network node 100 is evaluated and described herein. The performance metric and the simulation modeling used for evaluating performance are further described herein.

Performance metrics include blocking probability metrics both at node level and network level. Node-level blocking may be obtained either analytically or through simulation, considering a 100% load scenario where all wavelength connections are set-up, and then, blocking is calculated or measured.

For network-level blocking, the considerations extend beyond individual nodes, focusing on the entirety of the path that connections take across the network. Each connection traverses one or more nodes in a multi-hop manner. Network blocking may occur when there is a lack of wavelength conversion capability. Without these converters, each end-to-end connection may need to maintain the same wavelength across all the nodes it traverses, from the source node's transmitter (transmitter of transponder) to the destination node's receiver (receiver of another transponder). This constraint can lead to blocking if the required wavelength is not uniformly available along the entire path.

Network blocking may be obtained via network simulation for large ROADM degrees with various networking loading, when a large number of wavelength connections are established throughout the network. Each connection may last for a random period of time, and upon the completion of the service, the connections may be torn down and the resources returned to the network. The arrival of connections may follow a Poisson process, and the holding time of a connection may be exponentially distributed.

Performance metrics may further include signal loss (dB) at both node level and network level for multi-hop connections. The loss metric (signal loss) may be defined as the connection loss in dB from the transmitter of a transponder at a source node to the receiver of another transponder at a destination node, without considering amplification and connector/cable loss.

This loss typically considers the insertion loss of the components in the light path. With this in mind, a connection may go through one or more types of losses: an add loss type at the source node, a passthrough loss type at the intermediate node(s), and a drop loss type at the destination node. As end-to-end connections may be 1-hop or multi-hops, for the target network under consideration, the number of hops for all the connections may be obtained based on a given routing and wavelength selection method.

For the cost and complexity of each architecture under evaluation, the construction cost of each node based on a given architecture is considered. Two scenarios may be examined: one for 192-degree nodes and another for 384-degree nodes. The network-level cost may be obtained using the average cost of a node, or by proportional scaling of network cost using the number of nodes and the size of each node. In this analysis, the node cost is mainly considered.

For a reference network, the network 200 of FIG. 2A may be used. This network may constitute fiber optic links and can be optimized by dimensioning the size of each ROADM node and the number of fibers in each link based on one or more embodiments. Network-level knowledge, such as link utilization frequency derived from routing, may be used to engineer the network dimensions a priori, optimizing the number of fibers per link and the degree of the ROADM nodes. For example, the modification may include consolidating some of the smaller nodes into larger nodes. It is assumed that each node in this network can be provisioned to any degree. In some embodiments, the network 200 may include the modifications for optimizing the network according to one or more embodiments described herein. As described herein, the reference network 200 may comprise 26 nodes and 114 links (57 bi-directional links). In an embodiment, each link includes one or more fibers, and each fiber carries at least 80 channels per 50 GHz ITU grid for C-band or 80 super-channels of 150 GHz for super C+L. A link number has been assigned to each direction. For instance, link 202-1 connects node 201-1 to node 201-2, and link 202-58 connects node 201-2 to node 201-1. Each ROADM node of the network may be categorized as either a single chassis (degree≤16), a multi-chassis (16<degree≤36) or a high-degree node (degree>36).

In the optimized network 200 of FIG. 2, in an embodiment, 9 high-degree REOADMs may be present, which are indicated by crosshatching. Of the 9 high-degree REOADMs, 7 are in populous urban areas: nodes 201-5, 201-10, 201-12, 201-13, 201-17, 201-19, and 201-22 represent these populous urban areas. While nodes 201-4 and 201-7 are not large urban centers, the dimensioning results have shown that these nodes, with their large degree, contribute to more optimized network planning. The network 200 may be used as the reference network, with further increases in node sizes and the number of fibers on each link to achieve high-degree ROADM nodes that may handle over 3000 OMS for the same network. FIG. 9 illustrates a table indicating a non-optimized degrees of nodes of the reference network.

Consideration may be given to network traffic models and assumptions that underpin the system's design. A network may be considered where the network comprises N nodes that are connected by $L=\Sigma_i L_i f_i$ links, where $L_i$ represents link i, and $f_i$ is the number of fibers on $L_i$. Each fiber may carry C wavelength channels. The set of all source and destination (SD) pairs in the network may be denoted by $\beta$. The offered load for an SD pair m may be represented as $\rho_m$ {erlang}. The number of OMS for the SD pair m may be denoted by $r_m$. Assuming a wavelength connection with an arrival rate $\lambda_m$ for SD pair of m, and an average service duration (holding time) of $1/\mu$ for each wavelength connection, the offered load for the SD pair m may be given by $\mu_m=\lambda_m/\mu$, and the network load may be calculated as follows:

$$\text{Network Load} = \sum_{m \in \beta} (\rho_m \times r_m)/(L \times C)$$

Although the equation above for network load can be used in the simulations for network load modeling, it assumes that the number of sources (add-drop ports of a ROADM) is infinite. Since the number of transponders forming the source and destination pairs for the wavelength connections is finite, the simulation model uses Engset traffic modeling, as may be appreciated, to model or simulate wavelength connection demands. Each node i may have a finite number of transponders, $T_i$, determined as follows:

$$T_i = C. \ \alpha_i. \ \sum_j f_{i,j}, i = 1, \dots, 26$$

where C is the number of channels on a fiber, $\alpha_i$ is the add-drop rate of node i, and $f_{i,j}$ is the number of fibers on the link j of node i. The time until an idle source attempts to make a connection may be exponentially distributed with a mean of $1/\lambda$ and the holding time of a connection may be $1/\mu$. If the total number of active sources observed by a Poisson inspector at node i is $A_i$, then the total offered load, $\Lambda$, may be calculated as follows:

$$\Lambda = \left(\frac{\lambda}{\mu}\right)\sum_{i=1}^{26} A_i$$

Access blocking may occur when there is no available transponder at the destination node for an active source, resulting in a connection being blocked. Initially, when a connection request arrives, it is the availability of the destination transponder that is examined. If this examination reveals no access blocking, the search proceeds to identify an available channel or super-channel. Network blocking may occur when there is no consistent (or same) channel or super channel available on all the links of the network connecting an active source to the desired destination node, leading to the connection being blocked. If the number of connections that are generated is $q_{total}$ and the total number of connections that are blocked is $b_{total}$, then the total blocking probability is defined as $B_{total}=b_{total}/q_{total}$. If $b_{access}$ denotes the number of blocked connections due to the unavailability of transponder at either the source or destination, and $b_{network}$ represents the number of connections blocked due to the unavailability of the same wavelength on the network links, then the network blocking rate, $B_{network}$, may be given by $$B_{network} = \frac{b_{network}}{q_{total} - b_{access}}$$

The access blocking rate, $B_{access}$, may be obtained according to:

$$B_{access} = \frac{B_{total} - B_{network}}{1 - B_{network}}$$

To consider network blocking, the offered load in the simulation modeling may be modified as follows:

$$\text{offered load} = \Lambda(1 - B_{access})$$

As described herein, for the reference network, N is 26, and the total number of SD pairs is N(N−1). The connection arrival on each SD pair may follow the Poisson process, and the service time of a connection may be exponentially distributed. It may be assumed that the connection demand from the sources of each ROADM node to all the other ROADM nodes is uniformly distributed. With this uniform assumption, if the traffic demand increases by n-fold, a reactive strategy in dimensioning the network may require that the number of fibers (or OMSs) on each link be increased n times.

For the choice of routing algorithm in the modeling, any of the fixed routing, alternate routing, or adaptive routing may be used. As for wavelength/super-channel or spectrum assignment, several choices may exist, such as random (R), first-fit (FF), or most-used (MU). Alternatively, a heuristic A-star algorithm that performs joint routing and spectrum assignment may be used. In this work, with no loss of generality and for the purpose of evaluating performance of the network node 100 in comparison to other architectures or alternatives, fixed routing and first-fit wavelength assignment are considered. Link loss may be selected as the routing metric. Generally, the use of other metrics such as optical signal-to-noise ratio (OSNR), distance, or hop counts is likely to have minimal effect when comparing the architectural performance with one another.

Consideration is further given to the hop counts of connections within the reference network. Given the assumptions in routing and channel assignment described herein, as well as the constraints in assigning a path from a source to a destination, the distribution and characteristics of connection paths for the reference network are described.

Hop-count (section-count) distribution is described. The path for connections may depend on link metric constraints (such as OSNR, number of hops/sections, or dB loss) and the choice of routing to find an optimum path from a source to a destination. For the reference network 200 with 26 nodes, there are a total of 26*25=650 connection paths that use one or more of the 114 links. As each link can include one or more fibers, in some embodiments, the routing method may be based on selecting the first available capacity on any of the fibers within a link. Paths between a source and a destination may range 1 to 5 hops, each hop may be equivalent to a section. For example, connection path from node 201-3 to all other 25 nodes is considered.

Figure 10B:
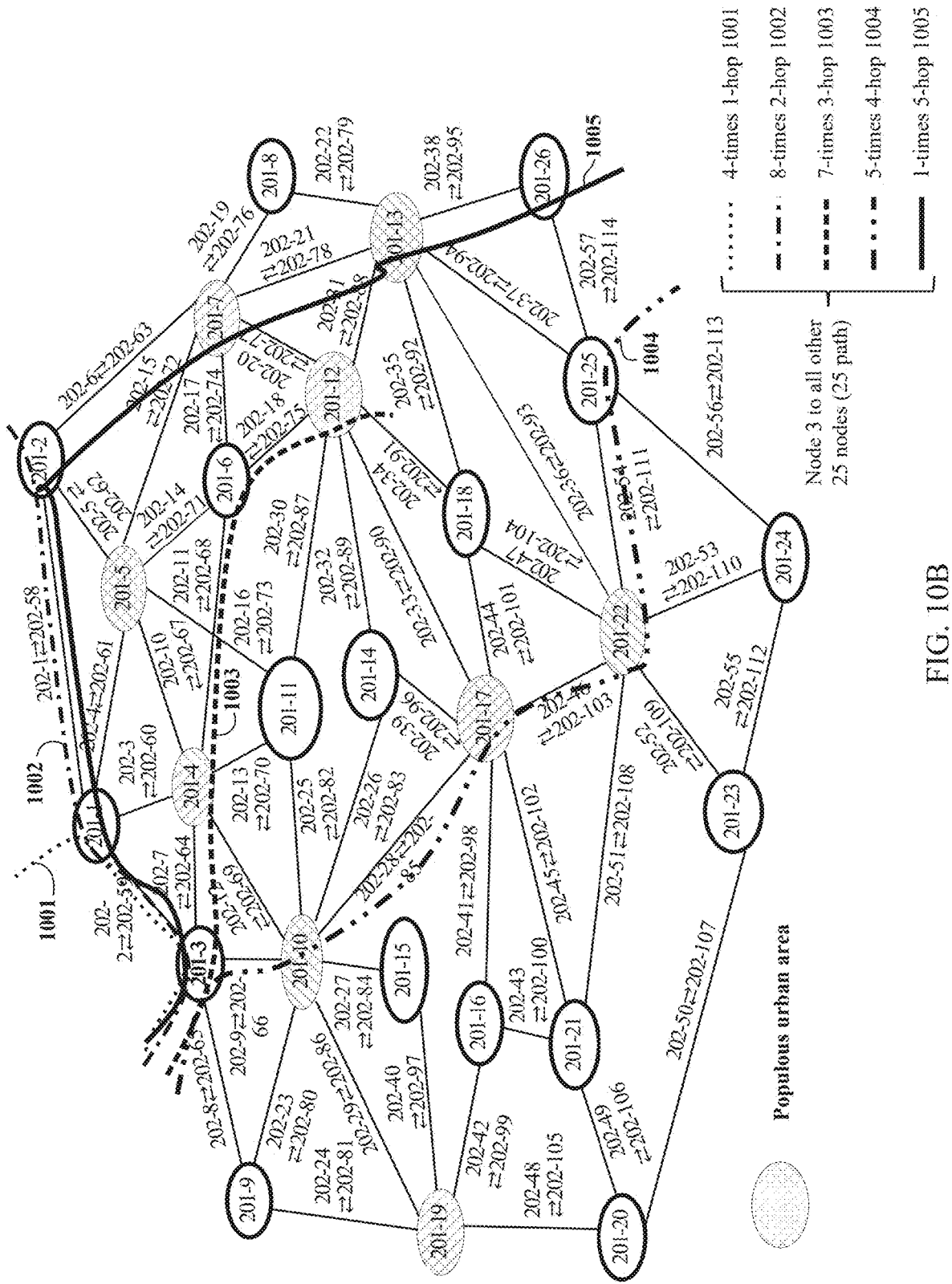
FIG. 10B illustrates examples of connection paths with different hop counts from a source node of the network of FIG. 2A, according to an embodiment.

FIG. 10A illustrates a table indicating the hop counts from a source node 201-3 to other nodes in the reference network, according to an embodiment. Table 1000 shows the connection paths from node 201-3 to the other 25 nodes of the reference network along with their corresponding hop count distributions. FIG. 10B illustrates examples of connection paths with different hop counts from source node 201-3 of the reference network, according to an embodiment. Referring to FIG. 10B, illustrated connection paths with different hop counts include: a 1-hop connection path 1001 from source node 201-3 to destination node 201-1, a 2-hop connection path 1002 from source node 201-3 to destination node 201-2, a 3-hop connection path 1003 from source node 201-3 to destination node 201-12, a 4-hop connection path 1004 from source node 201-3 to destination node 201-25, and a 5-hop connection path 1005 from source node 201-3 to destination node 201-26. As indicated in FIGS. 10A and 10B, from source node 201-3 to all the other nodes, there are four 1-hop connections, eight 2-hop connections, seven 3-hop connections, five 4-hop connections, and one 5-hop connection.

Figure 11:
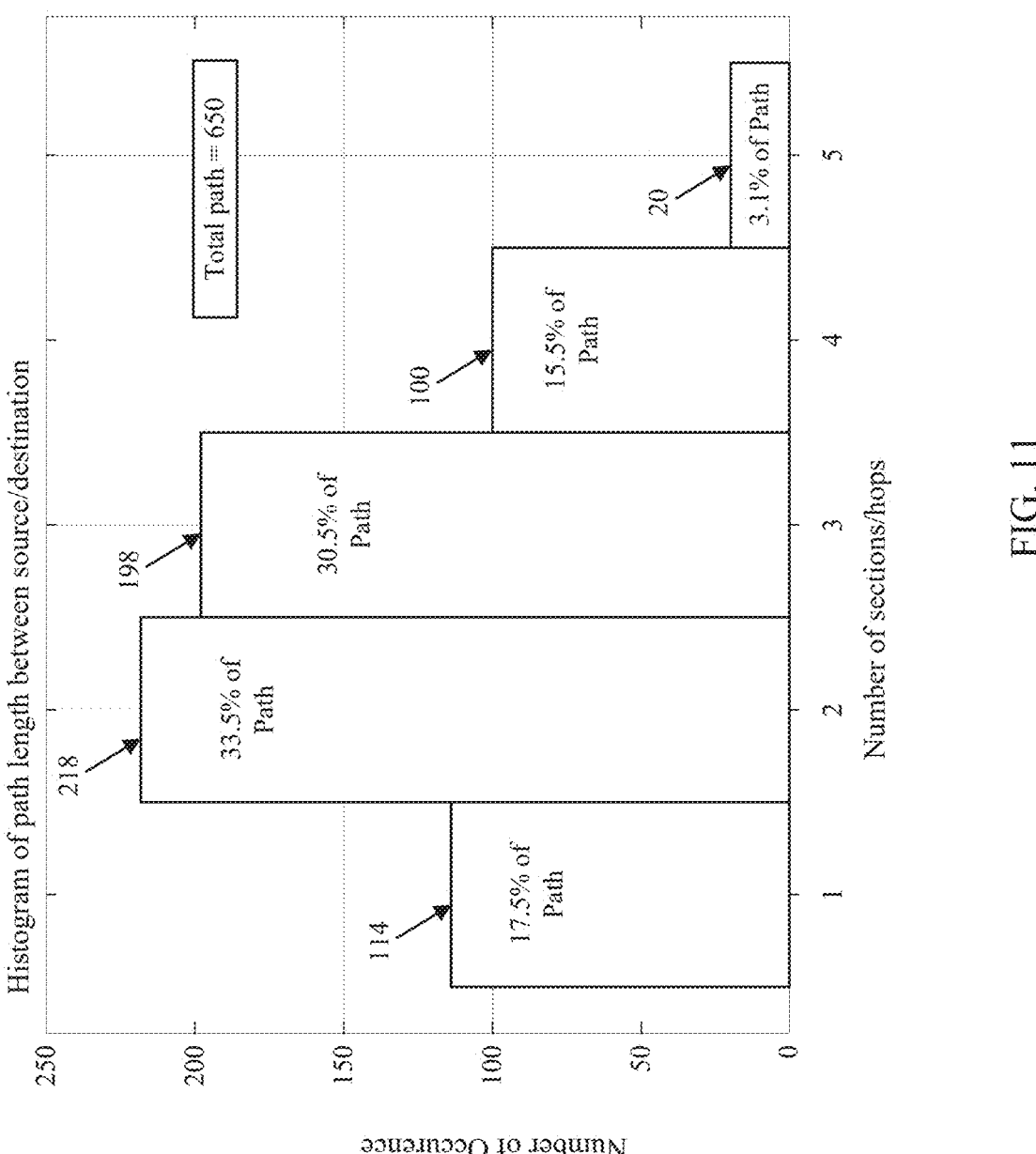
FIG. 11 illustrates the hop count distribution for the connection paths of the network of FIG. 2A, according to an embodiment.

The total connections paths from all source nodes to other nodes in the reference network is 650. FIG. 11 illustrates the hop count distribution for the connection paths of the reference network, according to an embodiment. As illustrated, in the reference network, there are 114 paths that are 1 hop (17.5% of the paths), 218 paths that are 2 hops (33.5% of the paths), 198 paths that are 3 hops (30.5% of the paths), 100 paths that are 4 hops (15.5% of the paths), and 20 paths that are 5 hops (3% of the paths). The average hop count for all paths is 2.53.

Figure 12:
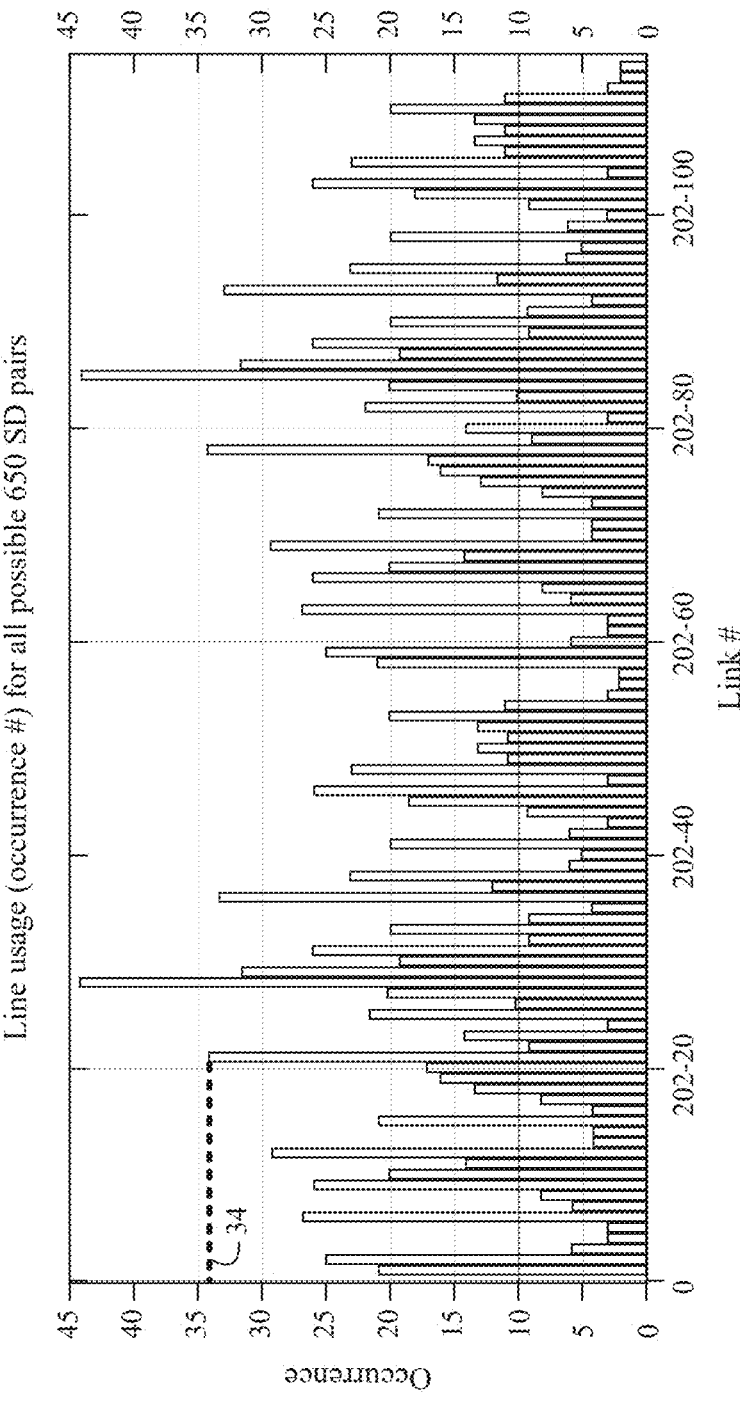
FIG. 12 illustrates link usage of the network of FIG. 2A, according to an embodiment.

The impact of multi-hop distribution on link utilization is further described. For the reference network, where N is 26, given that the N*(N−1) paths share links of the network, the utilization of each link may vary depending on routing scheme, which involves selecting the best path from a source to a destination based on one or more link metrics (such as Loss, OSNR or hop-count). FIG. 12 illustrates link usage of the reference network, according to an embodiment. The number of times (y-axis) each of the 114 links (x-axis) is used for all 650 connection paths of the reference network is shown. For instance, link 202-21 has been used 34 times for the 650 paths.

Figure 13:
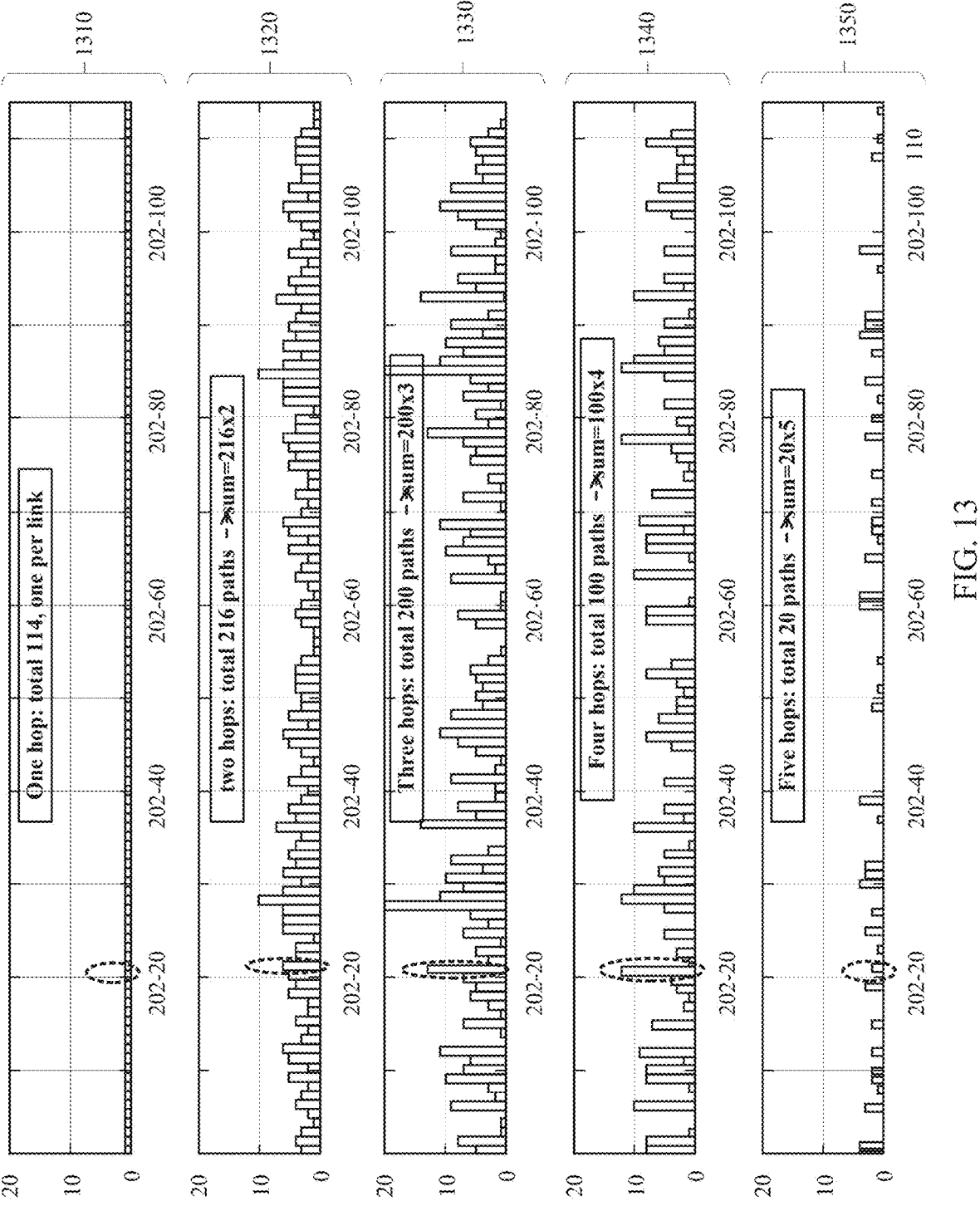
FIG. 13 illustrates link utilization for connections with different hop-count sizes, according to an embodiment.

To determine the number of times each link has been used for different hop-count size connections, the link utilization number may be broken down accordingly. FIG. 13 illustrates link utilization for connections with different hop-count sizes, according to an embodiment. The link utilization for connection sizes of 1 to 5 hops are illustrated in graphs 1310, 1320, 1330, 1340 and 1350 respectively. The y-axis indicates the number of times a link, on the x-axis, has been used for all 650 connection paths of the reference network. For example, link 202-21 usage is detailed as follows: once for single hop connection, 6 times for 2-hop connections, 13-times for 3-hop connections, 12-times for 4-hop connections and 2-times for 5-hop connections. The total utilization for link 202-21 is 34, as seen in FIG. 12.

Consideration is further given to link fiber counts and the degree of the reference network. The number of fibers on each link of the reference network 200 may vary. As may be appreciated, the number of fibers on the links may have been sub-optimally obtained, as the reference network is used as a starting point. The network can be scaled n-fold(s), and various node designs may be replaced or used for the nodes of the reference network 200, including nodes with architectures 0, 1, 2 and 3b as described herein. Consequently, in FIG. 2C, this network is labeled as 1×, since scaling the number of fibers to n-fold can change the degree of the network. This indicates that while the geographical degrees of the ROADMs (illustrated in FIB. 2B) may remain constant with increased traffic, the number of fibers per geographical degree (referring to FIB. 2C) can increase by n-fold(s), thus potentially impacting the ROADM fiber degree.

In the context of super-channel services and modeling of end-to-end connections through the network, it may be assumed that one or more connections may use super-channels. The number of super-channels that can be multiplexed in a fiber depends on the bandwidth of each super-channel. Assuming a 400G signal occupies 150 GHz of bandwidth, and given that the fiber capacity is 12 THz, the total number of 400G super-channels that can be carried on a fiber would be 80. Similarly, assuming an 800G signal occupies 200 GHz of bandwidth, the total number of 800G super-channels that can be carried on a fiber would be 60.

Figure 14:
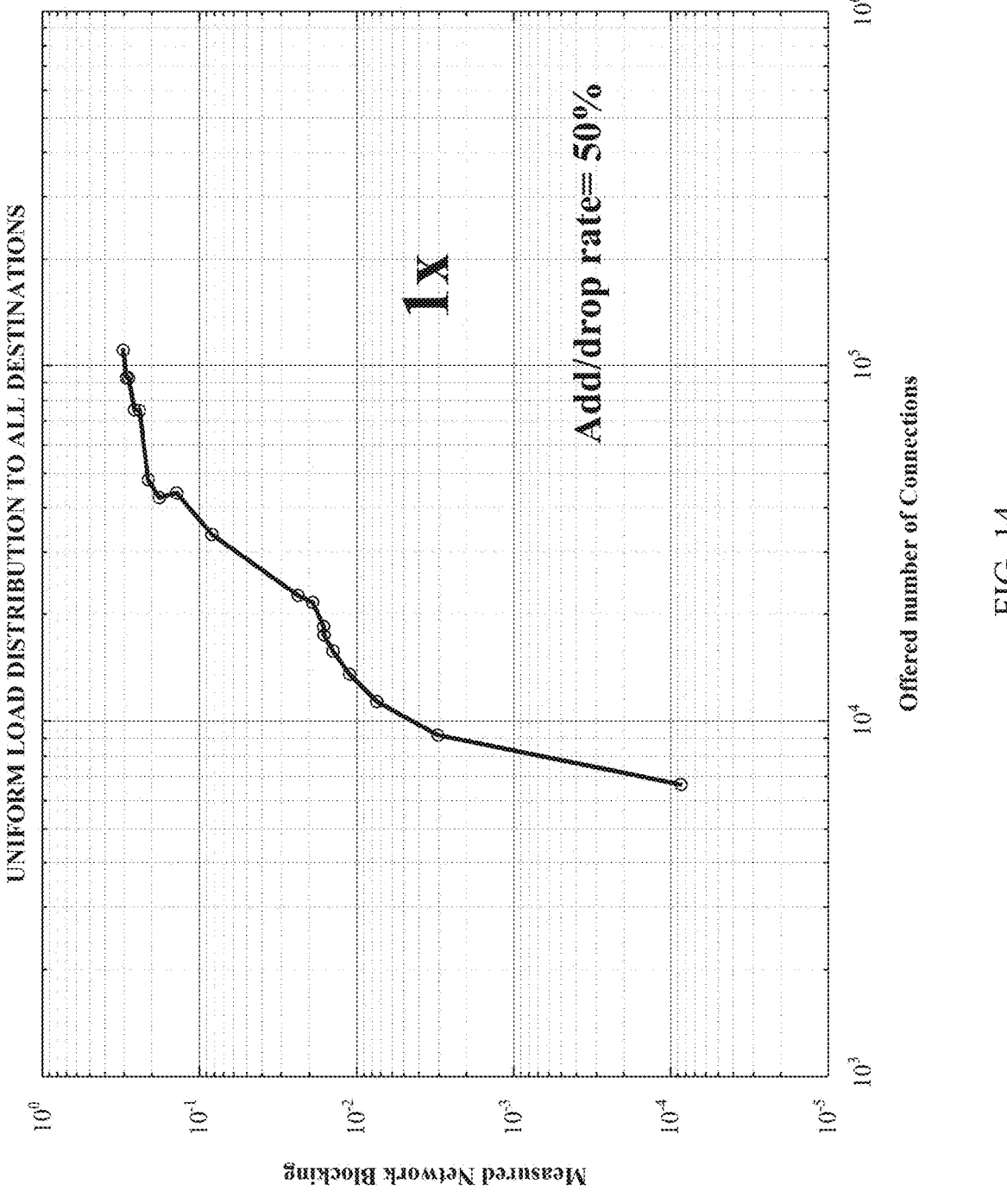
FIG. 14 illustrates network blocking performance of the reference network with 80 super-channels per fiber, according to an embodiment.

Under the modeling assumptions described herein, the network blocking performance for the reference network (1× network) is depicted in FIG. 14. FIG. 14 illustrates network blocking performance of the reference network with 80 super-channels per fiber, according to an embodiment. The add/drop rate is considered to be 50%, and each node of the network operates in a nearly non-blocking mode, with a blocking rate of $10^{-5}$. However, none of the blocked connections at network level was due to node blocking. The blocked connections are due to unavailability of a channel or a super-channel end-to-end (when there is no wavelength/spectrum conversion).

Depending on the network scenario and the network operator's preference, one or more different modes (architecture or configuration) of the network node 100, as described herein, can be used for the nodes of the reference network. While each node of the network can assume any of mode of the network node 100 described herein, for illustration purposes, the mode where both MEMS and WSS components of the node is used for traffic handling is used. This mode is referred to as architecture 3 herein. Additionally, it is assumed that network operator prefers that nodes of the reference network operate according to a defined rule. For example, all short connections, e.g., the one-hop connection, use the WSS component, and the longer connections, 2-hops to 5-hops, use the MEMS component. As described herein, for the selected mode (i.e., architecture 3), each of MEMS and WSS components can independently handle the addition and dropping of wavelengths.

Accordingly, in an embodiment, the reference network may be enhanced via the network node 100. In such a network, each node of the network may be based on architecture 3, where each MEMS and WSS component can handle passthrough and add/drop connections independently.

A scheme may be considered by which the ROADM degree of each node (and/or including the number of fibers per link) can be decided. This scheme may be derived from the traffic matrix and the consideration of the amount of traffic from one node to all other nodes. For instance, if the traffic from one node to all other nodes is uniformly distributed, then one can provision the same amount of fiber capacity from that node to all other nodes. The allocated fiber can span through many nodes.

For example, F fibers may be assumed from every node to all other nodes, given that the amount of traffic from one node to all other nodes is equal. If the number of super-channel connections from a node to all other nodes is X, then each of the 25 other nodes can have X/25 connections. Thus, each node can have 25*F fiber connectivity to all other nodes, one to each node. The traversal through other nodes and the 25 paths from each node to other nodes can be obtained using routing with a constriction metric of link dB loss (or hop count or OSNR).

FIG. 15 illustrates an example of fiber allocation, according to an embodiment. Table 1500, similar to table 1000, shows the hop-count distribution of the connection paths from node 201-3 to the other 25 nodes of the reference network 200, in addition to allocated fiber(s) on each of the sections (OMS) of the path. This indicates that each of the 25 paths from node 201-3 to all other nodes has 2 fibers, as node 201-3 has equal traffic (same number of super-channels) to all the other 25 nodes. Assuming the same 2 fibers from every node to all other nodes, then all 650 paths would have equal capacity, implying that each node has same amount of traffic to all other nodes. As may be appreciated, the matrix of the fiber allocation from one node to another may be non-uniform, leading to varied fiber allocation. With the assumption of two fibers from each node to every other node along the path determined by the routing method, the number of fibers per section would vary.

Figure 16:
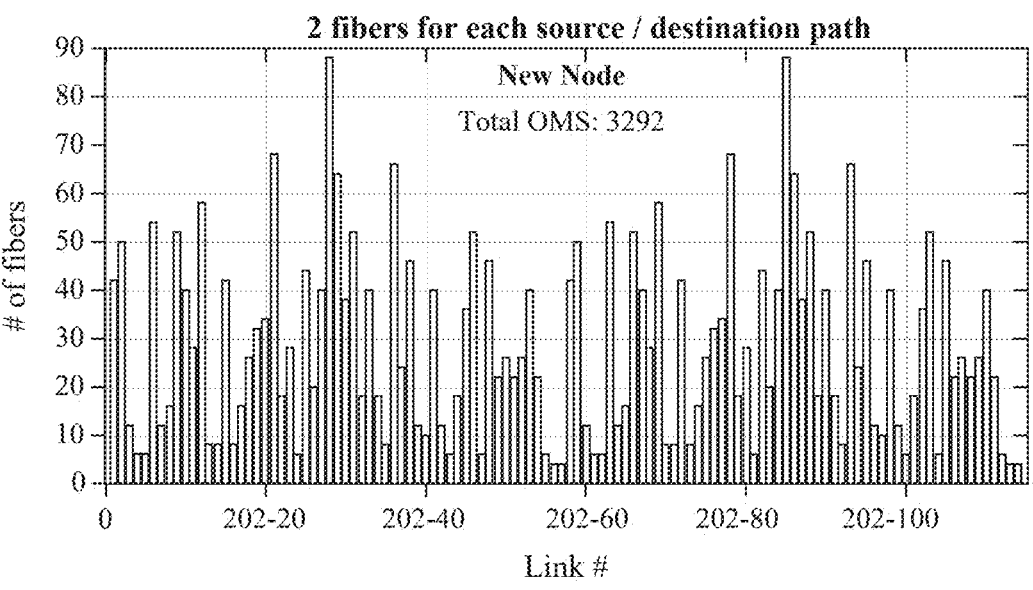
FIG. 16 illustrates a distribution of fibers on each link of the network of FIG. 2A, according to an embodiment.
Figure 17:
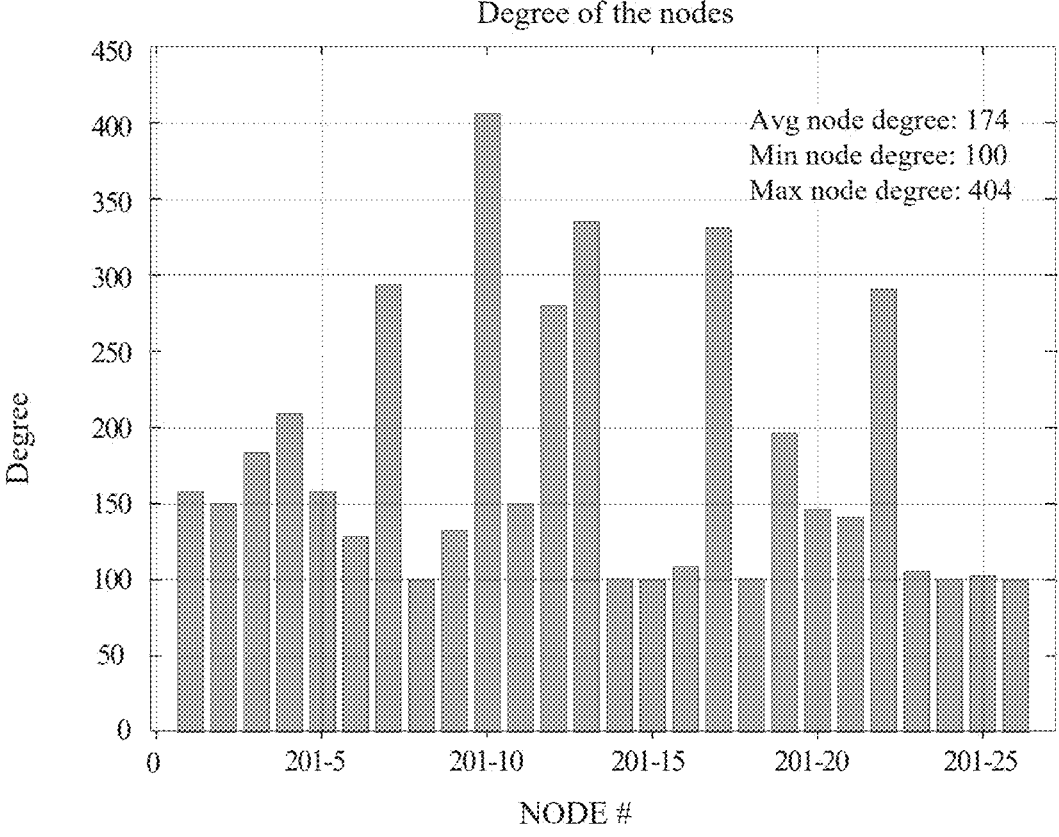
FIG. 17 illustrates the degrees of the nodes of the network of FIG. 2A, according to an embodiment.

FIG. 16 illustrates a distribution of fibers on each link of the reference network, according to an embodiment. The illustrated fiber distribution for the links of the reference network is based on using the selected mode, i.e., architecture 3. The number of fibers on each of the 114 links of the reference network are shown. Using the number of fibers on each link of the network, the degree of the 26 nodes of the network can be determined, as plotted in FIG. 17. FIG. 17 illustrates the degrees of the nodes of the reference network, according to an embodiment. The degree of each node of the reference network is shown. The node degrees shown are based on the selected mode, architecture 3 of the network node 100. The average node degree is 174, with the minimum node degree at 100 and the maximum node degree at 404.

Figure 18:
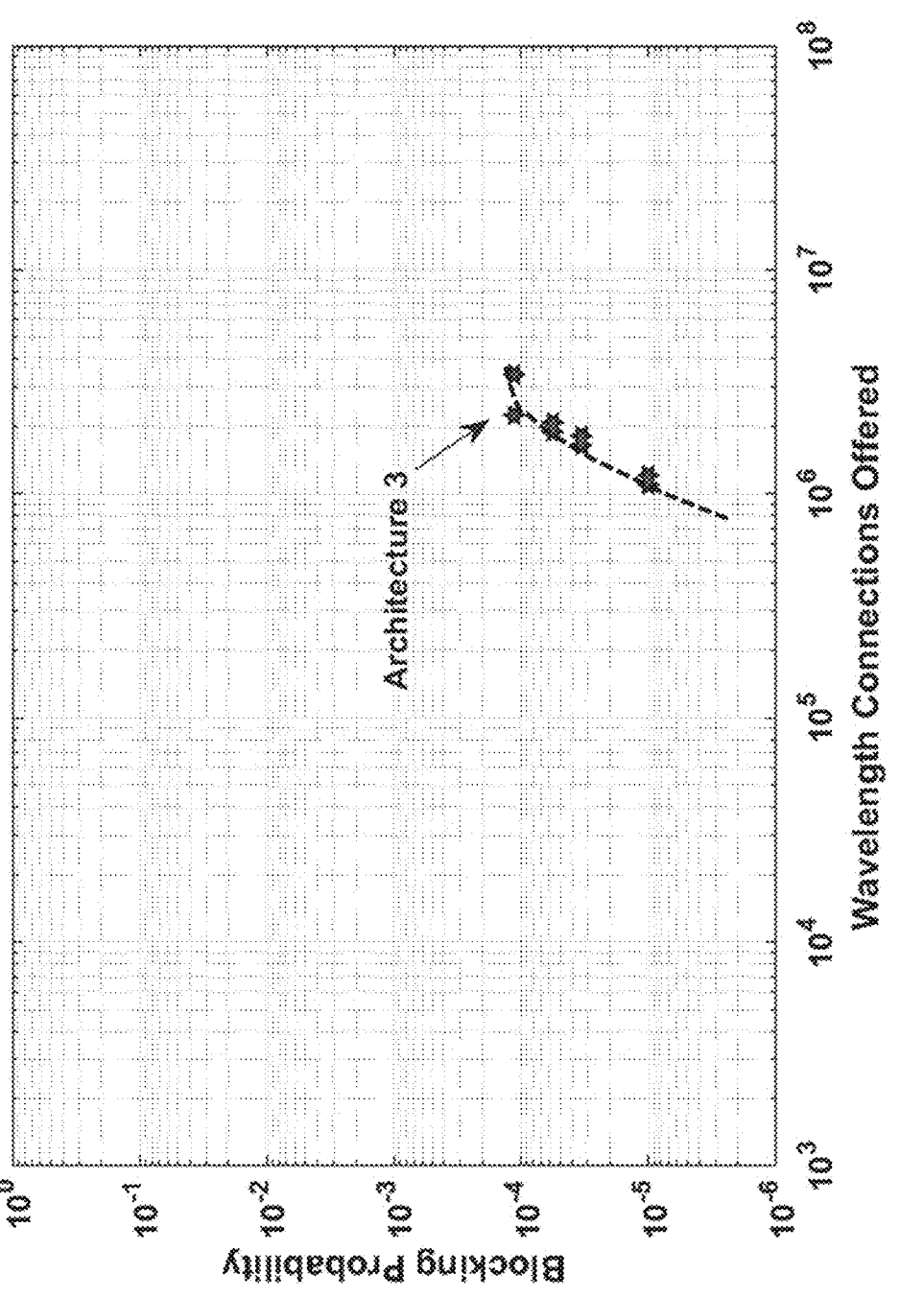
FIG. 18 illustrates network blocking performance based on a selected mode, according to an embodiment.

Embodiments further discuss blocking performance based on the selected node of the network node. According to an embodiment, the reference network is simulated based on the selected mode of architecture 3 to evaluate and obtain network performance. As described herein, in the selected mode, both WSS and MEMS components are used for node-to-node connectivity based on a set of rules given by network provider. The set of rules can include for example, use WSS component for one-hop connection and use MEMS for 2-hops and more. FIG. 18 illustrates network blocking performance based on a selected mode, according to an embodiment. The blocking probability of the reference network based on the selected mode of network node 100, i.e., architecture 3, is shown. As described herein, the numbers of fibers on each link and the network node degrees for the selected mode are shown in FIG. 16 and FIG. 17, respectively.

Embodiments describe one or more required components for a network node based on the selected mode. According to an embodiment, one or more required components of a design of a 192-degree node is described. According to an embodiment, one or more required components of a design of a 384-degree node is described.

Embodiments further describe connection loss based on the selected mode. While connection loss at node level based on the selected mode is described elsewhere herein, embodiments describe end-to-end connection loss based on the selected mode. In the selected mode, i.e., architecture 3, both WSS J×J and MEMS components are used for add/drop. Under the selected mode, the network node can further be categorized or configured to operate according to two configurations or modes, namely cases 3(a) and 3(b).

Figure 19:
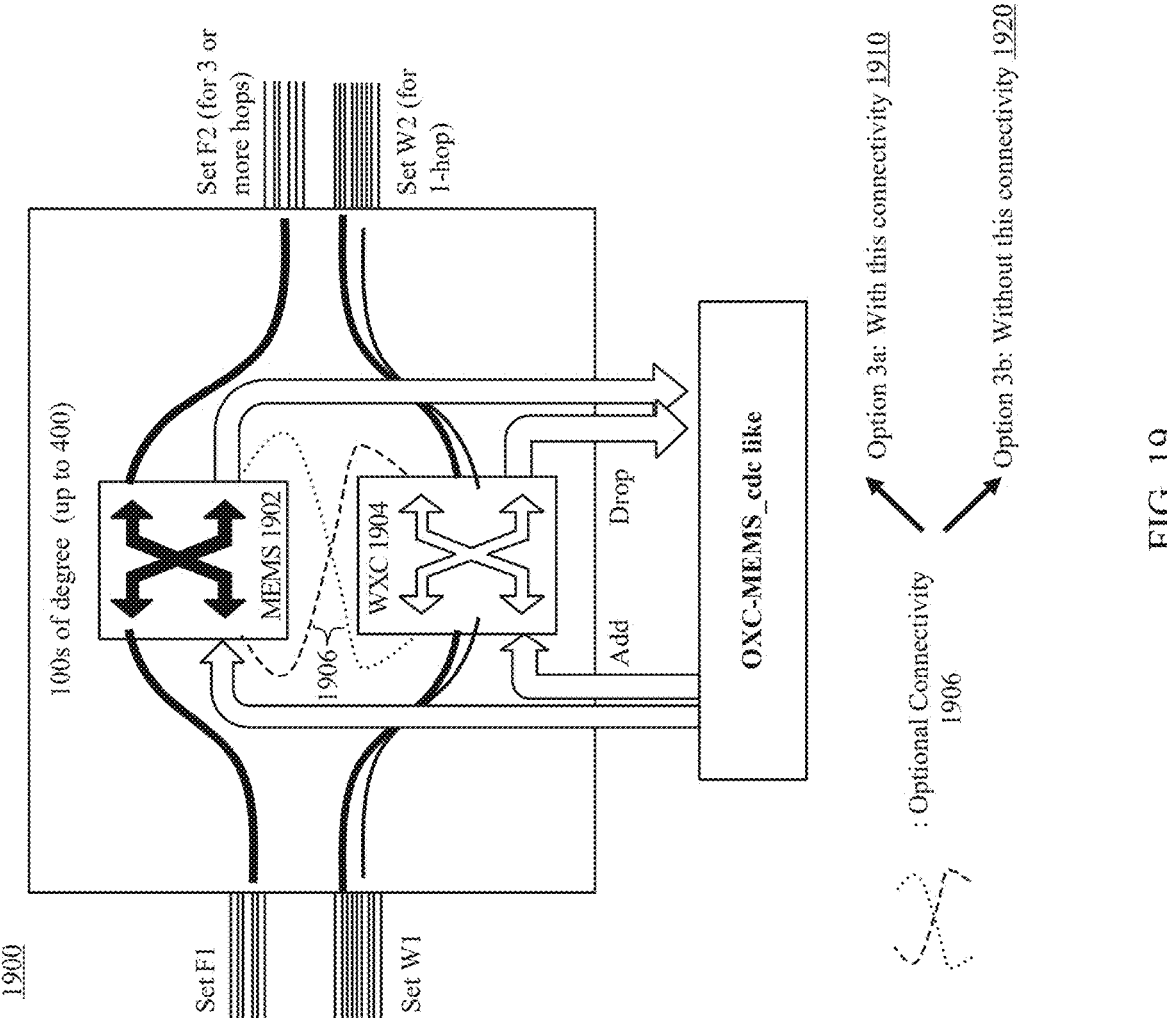
FIG. 19 illustrates a network mode configured according to a selected mode, according to an embodiment.

Under case 3(a) 1910 of FIG. 19, the connectivity between the two components (WSS and MEMS) is used for add/drop connections. This configuration may increase flexibility but may also contribute to connection loss. Additionally, it may consume some bandwidth from both components for interconnection. Under case 3(b) 1920, the two components operate independently for add/drop and passthrough connections. This arrangement may allow for improved component capacity and result in a more favorable connection loss.

FIG. 19 illustrates a network mode configured according to the selected mode, according to an embodiment. Network node 1900 may be similar to network node 100 comprising at least one MEMs component 1902 and at least one WSS component 1904. In some embodiments, network node 1900 is configured with the MEMS component connected to the WSS component, and this interconnection 1906 can be used for adding or dropping some or all of super-channels, for example, in case 3(a) 1910. In some embodiments, the network node 1900 is configured according to case 3(b) 1920, where each of the MEMS and WSS operate independently for add/drop and passthrough connections. In some embodiments, under case 3(b) 1920, network node 1900 uses some rules to differentiate which connections use the MEMS and which ones use the WSS. One such rule may be based on the number of hop-counts of the connection. For example, for one-hop connections, the WSS component 1904 is used (e.g., via the set of W1 and W2 connections), and for multi-hop connections, the MEMS component 1902 is used (e.g., via the set of F1 and F2 connections). As may be appreciated, irrespective of which one of these components are used for a connection, under case 3(b), each of the components is capable of dropping to or adding from any of the transponders.

In some embodiments, under case 3(b), the network node may or may not have the interconnectivity 1906 between the MEMS and the WSS components when operating. In some embodiments, the components may be interconnected but not activated when operating. In some embodiments, the components may lack the interconnectivity 1906 between the components.

In an embodiment, connection loss for case 3(a) and case 3(b) may be analyzed. To analyze the connection loss, two end-to-end connections of the reference network enhanced via the selected mode may be considered. The two connections include a one-hop connection, from source node 201-9 to destination node 201-19, and a 5-hop connection, from source node 201-9 to destination node 201-25 (the connection path including nodes: 202-9, 201-19, 201-10, 201-17, 201-22, and 201-25).

Figure 20:
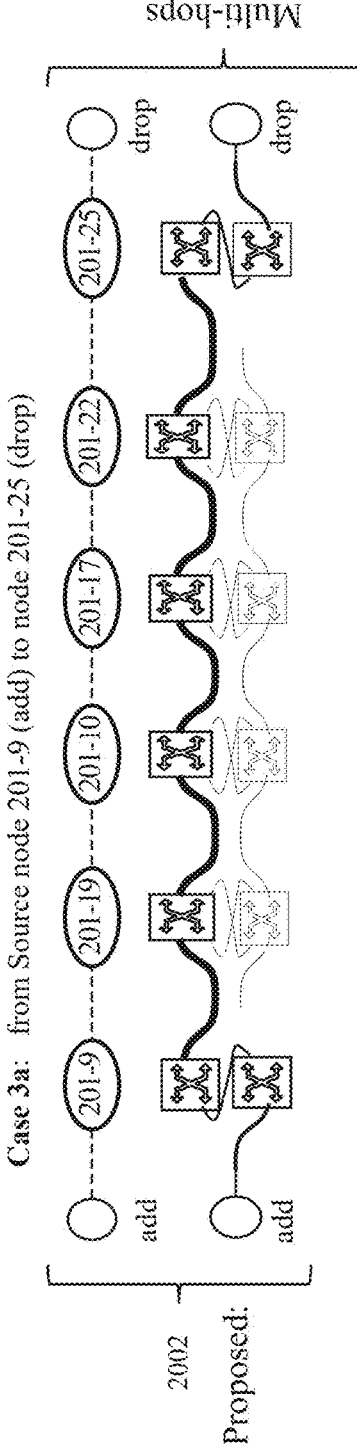
FIG. 20 illustrates a 5-hop connection under a first mode of the network node of FIG. 19, according to an embodiment.

In some embodiments, for case 3(a), some connections may directly use WSS component, and some connections may go through both the MEMS and the WSS components. An example is illustrated in FIG. 20. FIG. 20 illustrates a 5-hop connection under a first mode (e.g., case 3(a)) of the network node of FIG. 19, according to an embodiment. The 5-hop connection 5002 refers to a connection from source node 201-9 to destination node 201-25, which includes the following nodes: 202-9, 201-19, 201-10, 201-17, 201-22, and 201-25. As illustrates, referring to the connection path 2002, the add connection at node 201-9 and drop connection at node 201-25 goes through both WSS and MEMS. Whereas, at the intermediate nodes, 201-19, 201-10, 201-17, and 201-22, the connection path is passed through via the MEMS component (only the MEMS component is used at the intermediate nodes).

The connection loss for case 3(a) for n-hops can be obtained as follows:

$$\mathrm{Connection}_{Loss}^{3(a)} =$$

$$\mathrm{Add}_{loss} + Passthru_{loss} + \mathrm{Drop}_{loss} = \left(MEMS_{loss}^{add} + WSS_{loss}^{1\times32} + WSS_{loss}^{J\times J}\right) +$$

$$(n+1)MEMS_{loss} + \left(MEMS_{loss}^{add} + WSS_{loss}^{1\times32} + WSS_{loss}^{J\times J}\right)$$

where n is the number of hops. Using the above formula, and loss values of 3 dB for MEMS, 8.5 dB for WSS 1×32 and 18 dB for WSS J×J, the connection loss for case 3(a) may be given as:

$$\mathrm{Connection}_{Loss}^{3(a)} = 29.5 \ \mathrm{dB} + (n+1)*3 + 29.5 \ \mathrm{dB}$$

Figure 21:
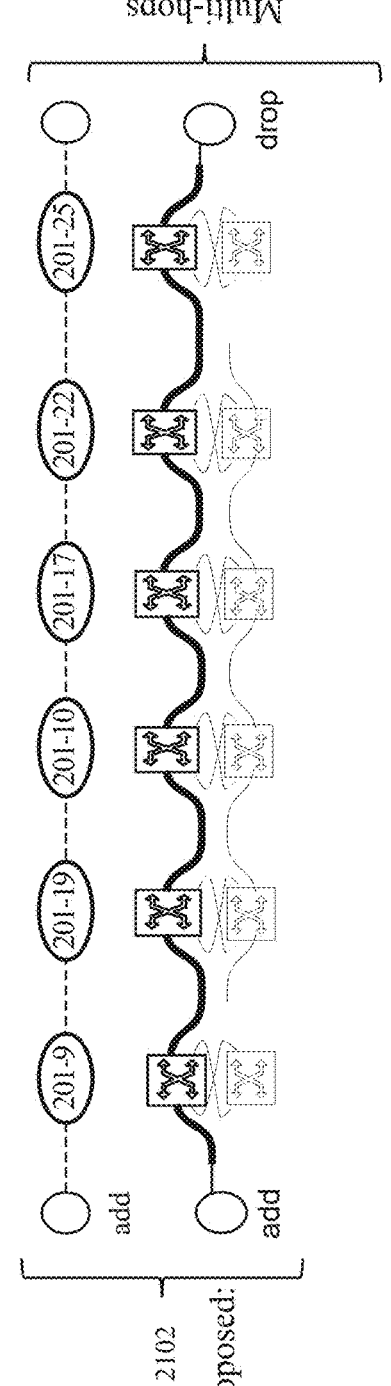
FIG. 21 illustrates a 5-hop connection under a second mode of the network node of FIG. 19, according to an embodiment.

FIG. 21 illustrates a 5-hop connection under a second node (e.g., case 3(b)) of FIG. 19, according to an embodiment. The 5-hop connection 2102, similar to connection 2002, refers to a connection from source node 201-9 to destination node 201-25, the connection path including the following nodes: 202-9, 201-19, 201-10, 201-17, 201-22, and 201-25. In an embodiment, the connection 2102 uses the MEMS component at each node unless a rule specifies that it shall or should use a WSS component. In an embodiment, the connections may be multiplexed at an add input/port of source node 201-9 and demultiplexed at a drop output/port of the destination node 201-25. For the connection 2102, the adding at the source node and the dropping at the destination node may be done via a MEMS component without involving WSS J×J component.

The connection loss for case 3(b) for n-hops can be obtained as follows:

$$\mathrm{Connection}_{Loss}^{3(b)} = \mathrm{Add}_{loss} + Passthru_{loss} + \mathrm{Drop}_{loss} =$$

-continued $$\left(MEMS_{loss}^{add} + WSS_{loss}^{1\times32}\right) + (n+1)MEMS_{loss} + \left(MEMS_{loss}^{add} + WSS_{loss}^{1\times32}\right)$$

where n is the number of hops. Using the above formula and loss values of 3 dB for MEMS and 8.5 dB for WSS 1×32, the connection loss for case 3(b) be given as:

$$\mathrm{Connection}_{Loss}^{3(b)} = 11.5 \ \mathrm{dB} + (n+1)*3 + 11.5 \ \mathrm{dB}$$

In some embodiments, for case 3(b), some of the connections use only the WSS J×J component. This use of WSS component may be based on a defined rule, e.g., single-hop connection should use WSS J×J component as the distance is short, while multi-hop count connections shall use the MEMS component.

Figure 22:
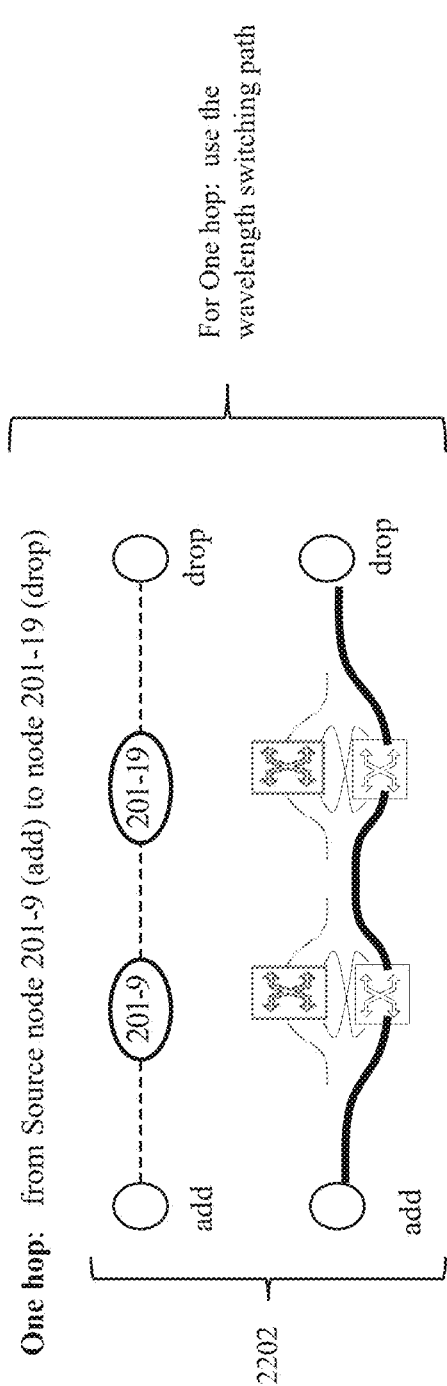
FIG. 22 illustrates a single hop connection, according to an embodiment.

FIG. 22 illustrates a single hop connection, according to an embodiment. The single hop connection 2202 may refer to a connection from source node 201-9 to destination node 201-19. In this case, the connection loss may be given as $$\mathrm{Connection}_{Loss}^{3} = \mathrm{Add}_{loss} + Passthru_{loss} + \mathrm{Drop}_{loss} =$$

$$\left(MEMS_{loss}^{add} + WSS_{loss}^{1\times32}\right) + n*WSS_{loss}^{J\times J} + \left(MEMS_{loss}^{add} + WSS_{loss}^{1\times32}\right)$$

$$\mathrm{Connection}_{Loss}^{3} = 11.5 \ \mathrm{dB} + n*18 + 11.5 \ \mathrm{dB}$$

As may be appreciated, given that the loss of WSS J×J is higher relative to MEMS, then to minimize connection loss, in some embodiments, use of the WSS J×J component may be limited for small hop-count connections. Based on this, a rule may be defined to use WSS component for small hop-count connections. In the simulations described herein, single hop connections (n=1) use WSS J×J component.

FIG. 23 illustrates the performance results for the first mode (e.g., case 3(a)) and the second mode (e.g., case 3(b)), according to an embodiment. Table 2300 shows performance results for case 3(a) and 3(b) in terms of: node level blocking, network blocking at full load, and end-to-end connection loss. Additionally, table 2300 further indicates the required components for a 384-degree node with a 33% add/drop rate and for a 192 degree-node with a 33% add/drop rate.

As illustrated, the case 3(b) performs better than case 3(a) in terms of end-to-end connection loss for multi-hop connections. This may be due to the majority of super-channel connections (about 83%) using the MEMS directly from add/drop as add/drop WSS multiplexes and demultiplexes the connections into the path. Further, the improved performance of case 3(b) may result from bypassing the WSS in the node for the connection. This is because add/drop connections did not need to pass through the Node WSS, unlike case 3(a), where connections were directly multiplexed (de-multiplexed) to (from) MEMS by the Add (drop) WSS.

Figure 24:
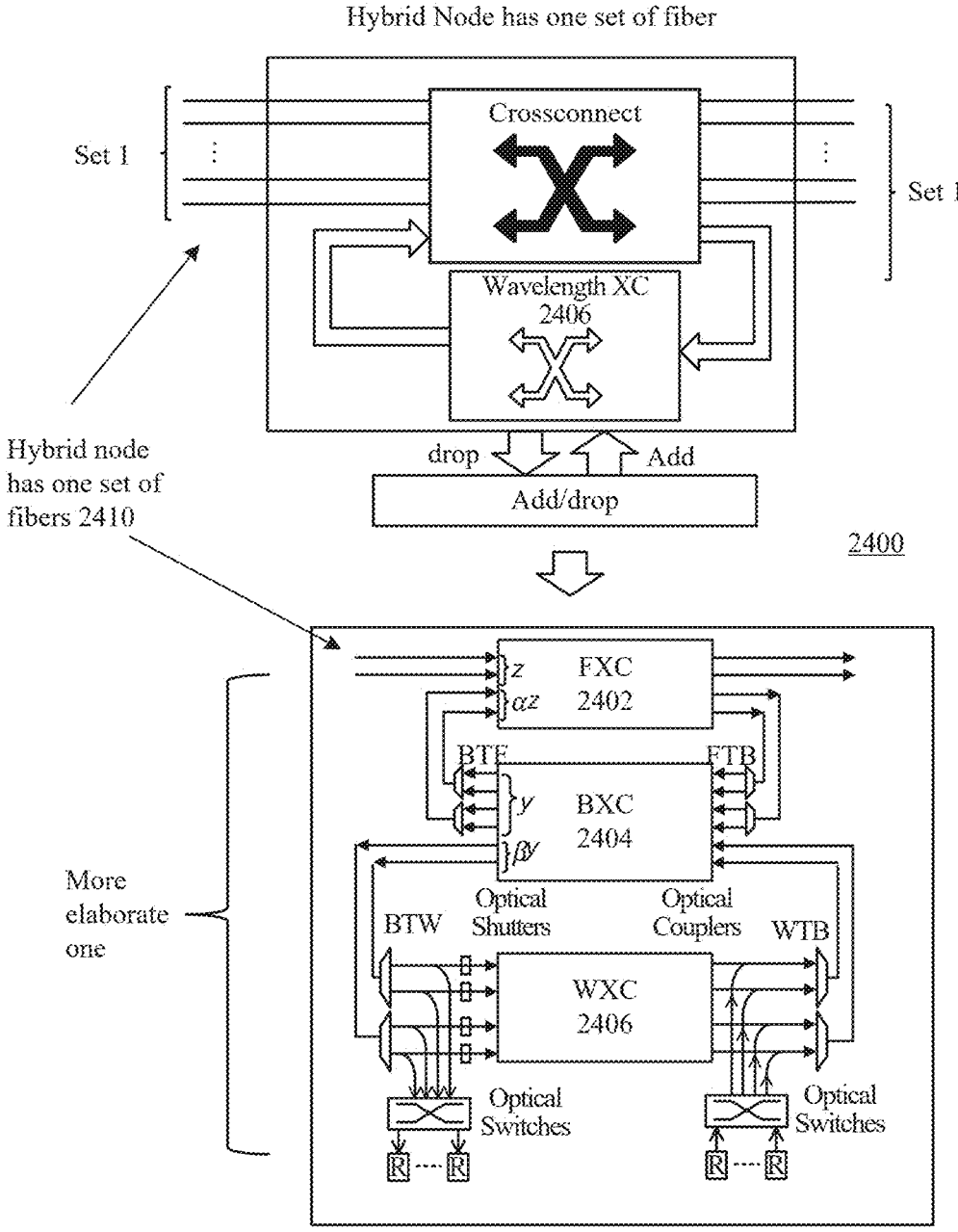
FIG. 24 illustrates a hybrid node, according to an embodiment.

Some existing node architectures use both MEMS and WSS. These architectures can be generalized by a MEMS and one or two sets of WSSs. In such existing architectures, one set of WSSs performs waveband switching, whereas the second set performs wavelength switching. This is shown in FIG. 24. FIG. 24 illustrates a hybrid node. The hybrid node 2400 is a combination of fiber cross-connect (FXC) 2402, band cross-connect (BXC) 2404 and wavelength cross-connect (WXC) 2406 as shown. The hybrid node 2400 has several limitations and differences when compared to the network node 100.

In some embodiments, the network node 100 (including architecture 3) has two sets or classes of fiber at the line side (108 and 112), whereas the hybrid node 2400 has only one set or class of fibers 2410. In some embodiments, the network node 100 has independent connectivity to and from add/drop, where each of the MEMS and WSS component can perform add/drop operations independently as described herein. The hybrid node 2400 has to follow a chain and reach WXC 2406 for add/drop connections. The network node 100 may provide better scalability both on the line and the add/drop side. For example, for a 100-degree ROADM, the add/drop rate of the hybrid node 2400 may be limited, whereas the network node 100 may support full (100%) add/drop rate. For the hybrid node 2400, since the add/drop is directly connected to WXC 2406 and given the size of WXC is not large, the size of add/drop could not be large, especially for high degree nodes.

Further, the flexibility of the network node 100, in terms of architecture and various modes of operations as described herein may allow for an adaptive and dynamic design to support various deployments. As such, this design flexibility may allow for a wide range of deployments by service providers. Compared to the hybrid node, the network node 100 may provide for one or more of: service class distinction (multi-set fiber), flexibility to carve-out certain connections through WSS J×J and/or certain others through MEMS. In some embodiments, the network node 100 may offer unique and direct add/drop design with plug and play feature. In some embodiments, the service class distinction may be based on having two set of fibers which may indicated two classes of traffic, and each class is differentiated in terms of loss or other metric. An example of service class is that the MEMS connections could be whole-sale connections between two nodes of the network, whereas the WSS connections could be for retail (or in 1-hop as in the disclosure) connections. Accordingly, the type of connections may indicate the service class (or vice versa), thereby defining which service class could use MEMS and which service class could use WSS.

In one or more embodiments, the performance of the network node 100, based on architecture 3, is compared with three other architectures, namely, architectures 0, 1 and 2. The performance is evaluated based on the following criteria: performance in terms of blocking, insertion loss in dB, and the number of (the least) components needed to build the architecture.

Architecture 0 is based on a large theoretical WSS. Given today's ROADMs are designed with full connectivity of an ingress WSS to all egress WSS, then, theoretically, if a large WSS could be built, then a large degree ROADM may be constructed. It is understood that expanding the size of a WSS may pose challenges and be expensive due to the limited steering angle of liquid crystal on silicon technology. Hence, to this date, a common strategy may be to use small-size WSSs to construct high-degree ROADMs. However, for the purpose of comparison, the case may be considered where it is technologically feasible to build a high-degree ROADM using a large size WSS.

Figure 25A:
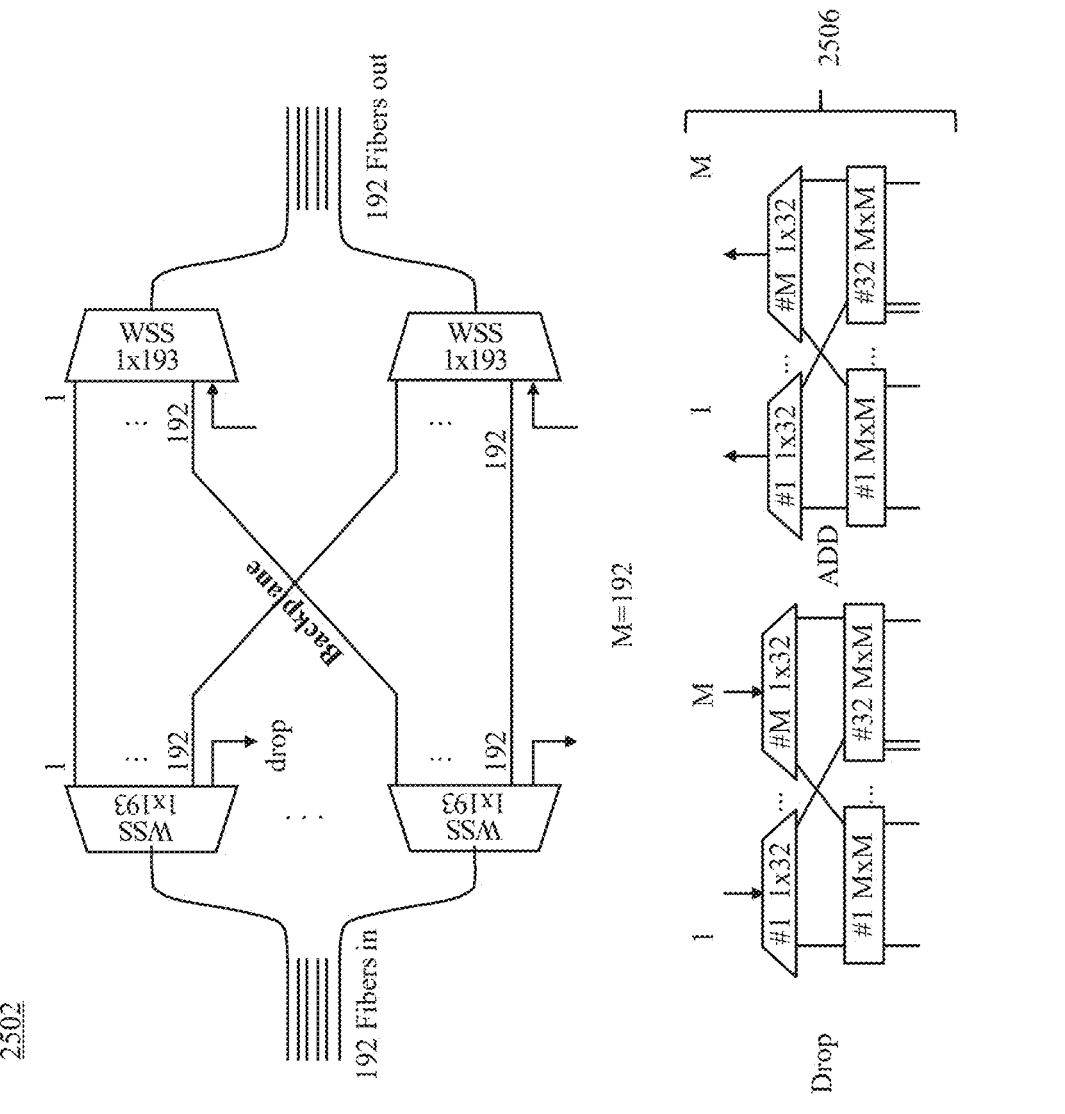
FIG. 25A illustrates a node architecture based on a large WSS, according to an embodiment.

FIG. 25A illustrates a node architecture based on a large WSS, according to an embodiment. The architecture of the 192-degree ROADM 2502 may be understood as a theoretical architecture based on a WSS 1×193 and assuming feasibility of a large WSS using full connectivity of ingress WSS to egress WSS via a backplane or fiber connectivity.

Figure 25B:
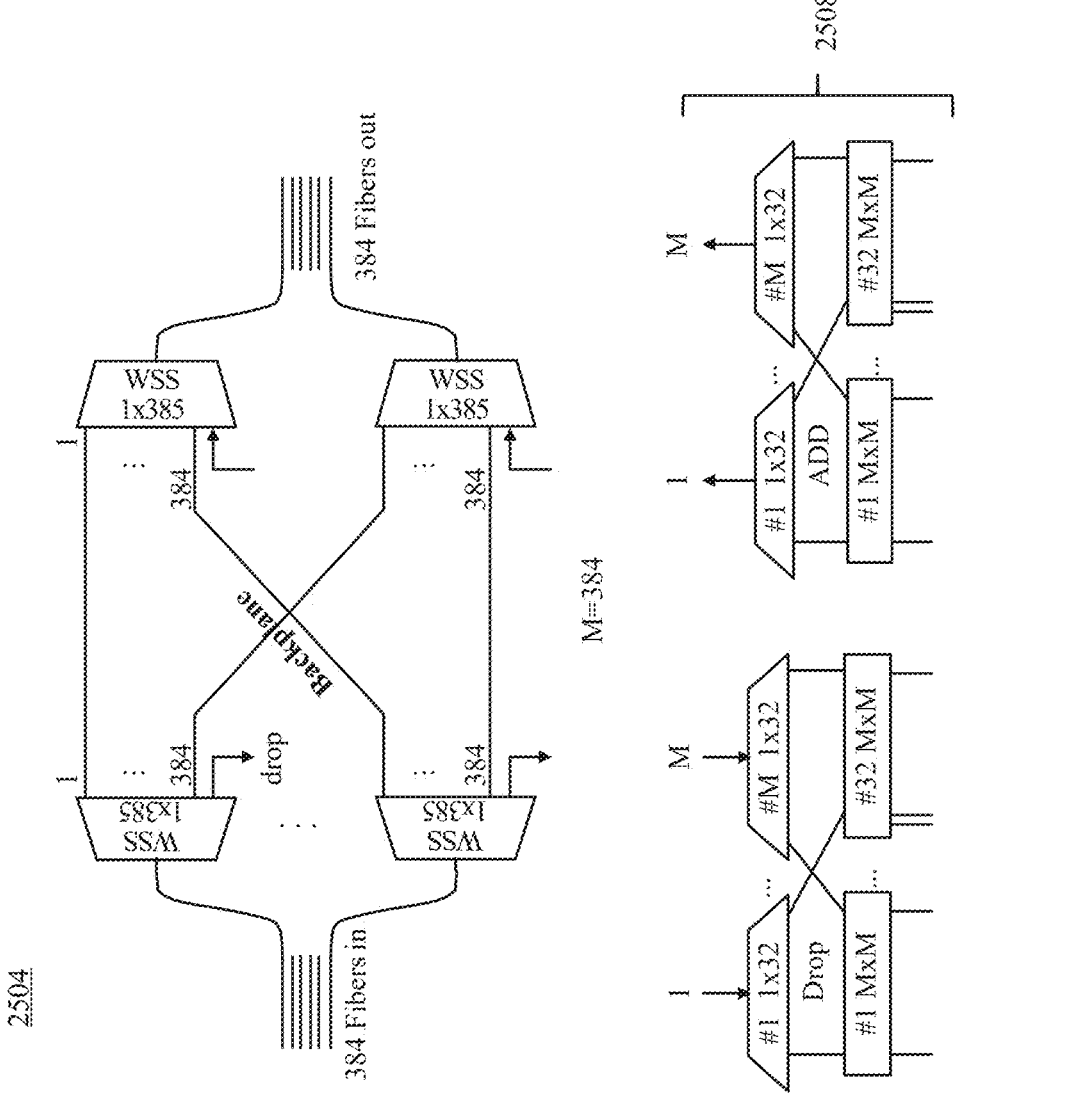
FIG. 25B illustrates another node architecture based on a large WSS, according to an embodiment.

FIG. 25B illustrates another node architecture based on a large WSS, according to an embodiment. The 384-degree ROADM 2504 is based on a WSS 1×385. As mentioned, each ingress WSS of the 192-degree ROADM and the 384-degree ROADM may be assumed to be fully connected to all the corresponding egress WSS of the line cards through either an optical backplane or fiber connectivity.

The add/drop design of the 192-degree ROADM 2502 and the 384-degree ROADM 2504 may be any design including CD design or CDC design based on Multi-Cast Switch (MCS) or WSS M×N. In an embodiment, referring to FIG. 25A and FIG. 25B, the add/drop designs 2506 and 2508, respectively, are enhanced add/drop designs that are based on and leverages MEMS technology. In an embodiment, these add/drop designs 2506 and 2508 are used for comparison with add/drop designs of other architectures as described herein. In an embodiment, each of the add/drop design 2506 and 2508 is a CDC design that uses smaller WSS, such as 1×32, and MEMS for high port count as illustrated.

FIG. 26A illustrates required components of the node architecture of FIG. 25A and FIG. 25B, according to an embodiment. Table 2600 illustrates the required components to build a node with D-degree as indicated. Table 2600 provides two examples including a 192-degree node and a 384-degree node using WSS 1×193 and WSS 1×385, respectively. The add/drop components assume WSS 1×32 and MEMS design for D×D. In some embodiments, a larger MEMS may be used, such as 512×512 MEMS, and thus the number of MEMS may be reduced. This alternative has been tabulated for the 192-degree and 384-degree nodes. For the 192-degree design, the design uses 192 WSS 1×32 and 32 MEMS 192×192 for add and similar quantity for the drop. In some embodiments, 12 MEMS 512×512 is used instead of 32 MEMS 192×192. In an embodiment, the 384-degree design uses 384 WSS 1×32 and 32 MEMS 384×384 for add component and similar quantity for the drop component. In some embodiments, 24 MEMS 512×512 is used instead of 32 MEMS 384×384 for either add or drop components of the 384-degree node.

For determining the connection loss through the node of architecture 0, referring to FIGS. 25A and 25B, 8.5 dB insertion loss (IL) of today's WSS 1×32 is considered as reference. Then, for each doubling WSS size, a modest loss of 1 dB may be added. If WSS 1×32 has a loss of 8.5 dB, then the loss of WSS 1×193 may be about 11 dB and that of WSS 1×385 may be about 12 dB. FIG. 26B illustrates connection loss (dB) through the node architecture of FIG. 25A and FIG. 25B, according to an embodiment. Table 2610 lists the signal loss for passthrough signals, add and drop signals. The information in this table 2610 can be used to calculate connection loss for connections with different hop sizes or counts (e.g., one-hop, two-hop, . . . , 5-hop). For instance, one-hop connection loss may be the sum of add loss and drop loss, whereas 2-hop loss may be the sum of add, passthrough, and drop loss.

Figure 27B:
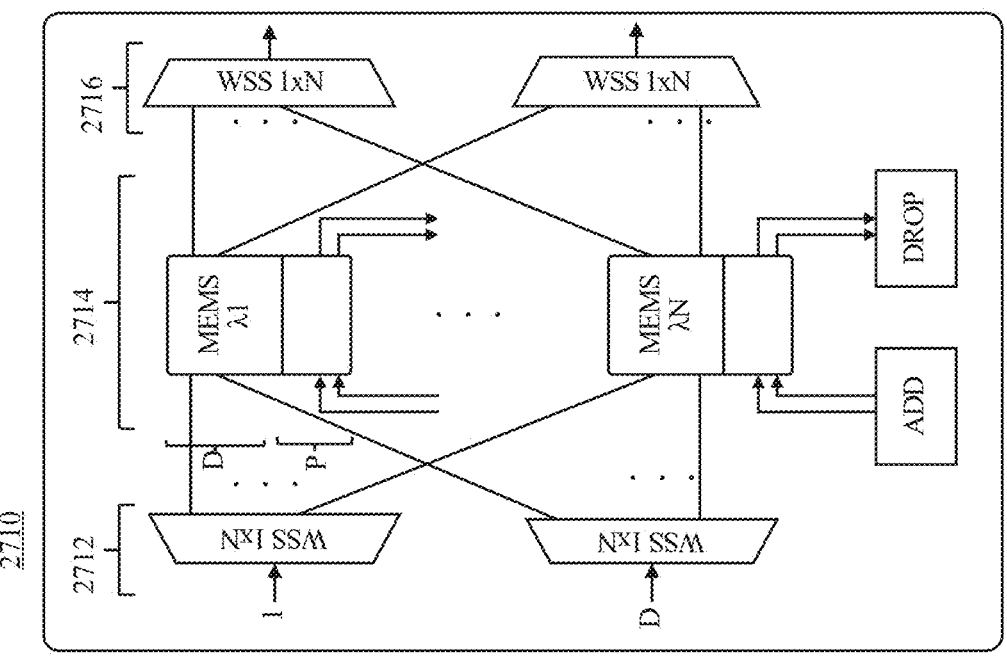
FIG. 27B illustrates a second design of a high-degree ROADM based on a first architecture using a 3-stage WSS-MEMS-WSS solution, according to an embodiment.
Figure 27A:
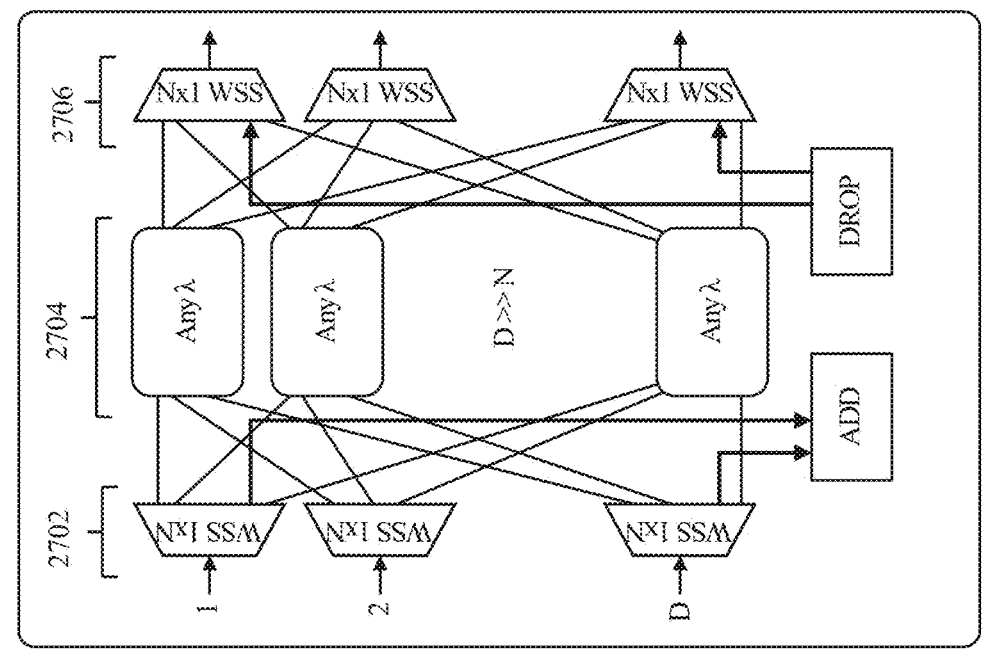
FIG. 27A a first design of a high-degree ROADM based on a first architecture using a 3-stage WSS-MEMS-WSS solution, according to an embodiment.

FIG. 27A a first design of a high-degree ROADM using a 3-stage WSS-MEMS-WSS solution, according to an embodiment. FIG. 27B illustrates a second design of a high-degree ROADM using a 3-stage WSS-MEMS-WSS solution, according to an embodiment. Each of the high-degree ROADM 2700 and 2710 uses a 3-stage WSS-MEMS-WSS solution with wavelength and space switching at both the first stage (2702 for ROADM 2700 and 2712 ROADM 2710) and third stage (2706 ROADM 2700 and 2716 ROADM 2710) and space switching at the second or middle stage (2704 ROADM 2700 and 2714 ROADM 2710). In an embodiment, the first and the third stages use WSS 1×N, whereas the middle-stage uses MEMS optical cross-connect.

The 3-stage design, WSS-MEMS-WSS, of the high-degree ROADM 2700 and 2710 may be referred to as Architecture 1. In an embodiment, a first design of the high-degree ROADM 2700, which may be referred to as Architecture 1a, is based on an arrangement that allows each center-stage 2704 to handle many wavelengths as illustrated. In the design 2700, the center-stage MEMS 2704 may not be associated to any super-channel wavelength. In some embodiments, while the add (drop) fibers could originate from (to) either WSS or MEMS, selecting WSS stage provides a simpler design and connection management handling.

In an embodiment, a second design of the high-degree ROADM 2710, which may be referred to as Architecture 1b, is based on an arrangement that defines wavelength planes so that each center-stage 2714 handles one of the super-channel wavelengths (or a specific super-channel wavelength). As for add/drop design, using center-stage MEMS provides more flexibility and much simpler design.

In an embodiment, Architecture 1a, referring to ROADM 2700 is understood as a WSS-MEMS-WSS design with no wavelength planarization. Whereas Architecture 1b, referring to ROADM 2710, in an embodiment, is understood as a WSS-MEMS-WSS design with wavelength planarization. In terms of performance, Architecture 1a (with no wavelength planarization) underperforms that of planarized wavelength design 2710, Architecture 1b, for the same size center-stage. This is because in the Architecture 1a, the allocation of center-stage space switch may appear to or may behave like a random assignment whereas in Architecture 1b, the allocation of-center-stage uses order-based that may allow for better blocking probability than random-based.

Embodiments further analyze the performance of Architecture 1a in terms of blocking probability when a random scheme is used for center-stage allocation. In an embodiment, it is assumed that there are W super-channel wavelengths on each input of the WSS and the size of WSS is 1×N. This means that there are N path(s) between input and output through N MEMS components. Where the probability that each of these super-channel wavelengths is occupied may be $\rho$, then the probability that the first link from the input WSS 2702 to middle-stage MEMS 2704 is idle is (1−p), where p is $$\frac{W\rho}{N}.$$

The same probability, (1−p), may apply for the second link between middle-stage MEMS 2704 and the output WSS 2706. Accordingly, the probability that both of these links is idle is (1−p)*(1−p). Thus, the probability that both of these links are blocked is 1−(1−p)*(1−p). As may be appreciated, a path from an input WSS to an output WSS is blocked if all the M links (as there are M MEMS in the center-stage) are blocked. M may be equal to N as illustrated. Thus, the probability of all the links being blocked may be determined according to $[1-(1-p)(1-p)]^M$. As a result, total blocking probability $P_B$ with substituting p may be given as:

$$P_B = \left[1 - \left(1 - \frac{W\rho}{N}\right)^2\right]^M \quad 0 \le \rho \le 1$$

Figures 28, 29:
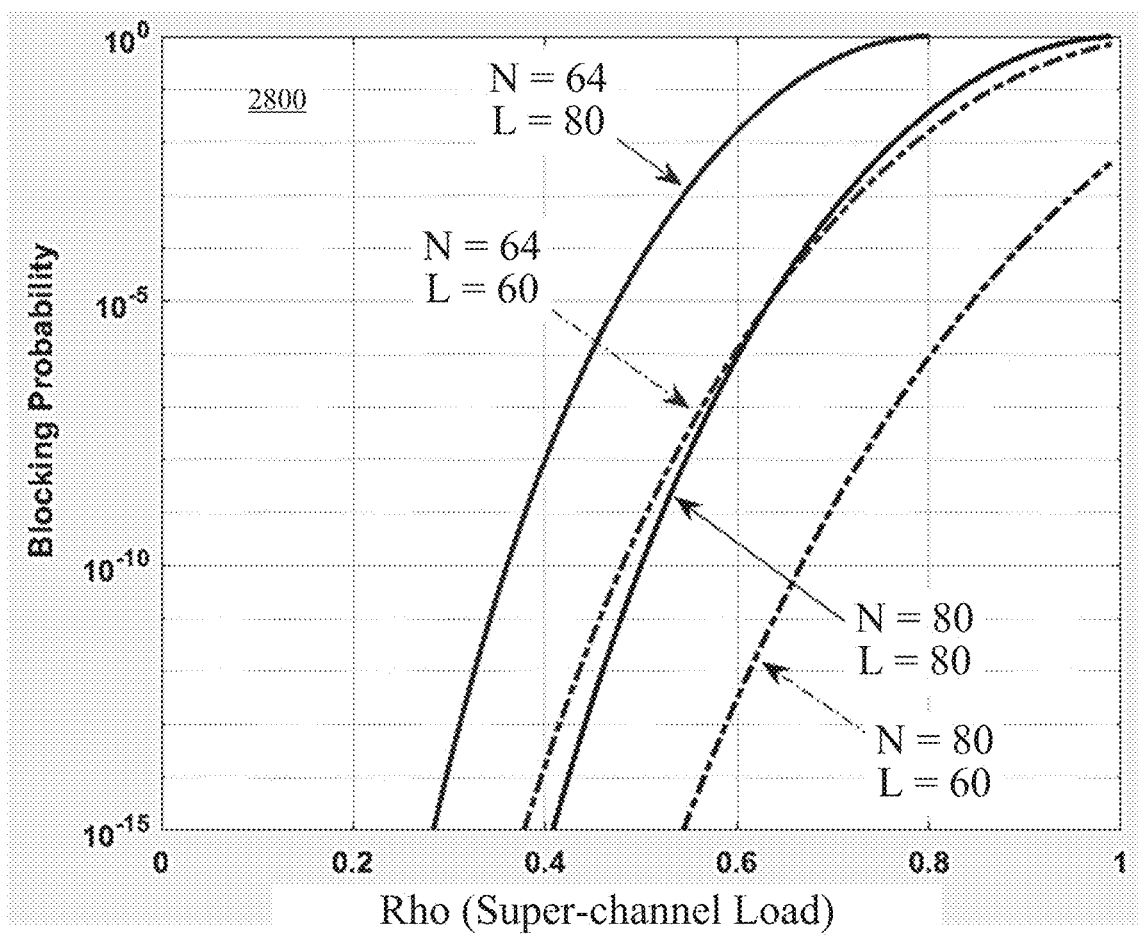
FIG. 28 shows plots of blocking probability of the high-degree ROADM of FIG. 27A as a function of rho, according to an embodiment.
FIG. 29 shows a table indicating blocking probability of the high-degree ROADM of FIG. 27B, according to an embodiment.

FIG. 28 illustrates blocking probability of the high-degree ROADM of FIG. 27A as a function of rho, according to an embodiment. As described herein, the high-degree ROADM 2700 of FIG. 27A may refer to architecture 1a. The plot 2800 indicates the blocking probability as a function of rho (p) for architecture 1a. In some embodiments, p is the probability that a channel or super-channel is busy. This probability depends on the traffic loading. As the traffic is assumed to be uniform, for a traffic loading of 90%, p can be assumed as 0.9. The plot 2800 is based on an analytical result of random routing for WSS-MEMS-WSS of architecture 1a. Where N is the size of WSS, L is the number of super-channels on the fiber, and M=N, then plot 2800 indicates 6 cases of N={32, 64 and 80} and L={60 and 80} that represents a total of 60 super-channels of 200 GHz and 80 super-channels of 150 GHz, respectively. For non-blocking condition at the node-level, N>=L where N is the size of WSS and L is number of super channels. As the number of super-channels increases, the blocking probability also increases. On the other hand, an increase of the WSS size improves the blocking probability.

In an embodiment, when the center-stage MEMS 2714 is planarized, referring to Architecture 1b (WSS-MEMS-WSS with wavelength planarization), each MEMS handles one wavelength. As a result, its blocking performance follows an order-based scheme which may be better than random-based scheme of architecture 1a.

In Architecture 1b, given that the size of MEMS is much bigger than the ROADM degree, D, there may be no blocking (or less likely that there will be blocking) on the path that connects the first and the third stage to the center-stage. The blocking, however, may be determined based on whether WSS of the first stage has enough ports to switch all the super-channels on its input fiber.

FIG. 29 illustrates a table indicating blocking probability of the high-degree ROADM 2710 (Architecture 1b) of FIG. 27B, according to an embodiment. The blocking probability or blocking rate indicated by table 2900 assumes that the size of WSS is 1×N and a total of L super-channels exists on the input fiber of a WSS. In an embodiment, the blocking probability of architecture 1b is indicated as a function of N and L. As may be appreciated, since there are two super-channel services with bandwidth of 150 GHz and 200 GHz, and the fiber capacity is 12 THz, then, a fiber can support 60 channels of 200 GHz or 80 channels of 150 GHz. As mentioned, the blocking probability of Architecture 1b is based on WSS size, N, and the maximum number of super-channels at the input fiber of the WSS of the first stage 2712 of the WSS-MEMS-WSS design.

According to table 2900, Architecture 1b exhibits (or experiences) blocking when there are 80 super-channels on the fiber and the first-stage WSS is 1×64. When the size of WSS is equal to or greater than the number of super-channels on the fiber, there may be no blocking (or lower likelihood of blocking).

Based on the analytical results of the blocking probability of Architecture 1a (as shown in FIG. 28) and the blocking rate for Architecture 1b (as shown in table 2900 of FIG. 29), it can be observed that architecture 1b may outperform Architecture 1a. As a result, Architecture 1b may be used as the chosen ROADM design (for the 3-stage solution, i.e., WSS-MEMS-WSS) for comparison with architecture 3 (e.g., case 3b) of network node 100.

Embodiments further describe node and add/drop design of the WSS-MEMS-WSS architecture. Embodiments further discuss example designs for WSS-MEMS-WSS architecture in terms of cost, feature, insertion loss and the add/drop.

Given that for this architecture, the center-stage has been planarized (referring to architecture 1b) and each MEMS handles switching of a super-channel wavelength from all the inputs to the outputs, it may be beneficial to connect the add/drop connections to this stage. If the size of MEMS switch is M, and total degree supported is D, then the number of fiber connections used for add/drop, denoted as P, may be given as P=M−D.

Figure 30:
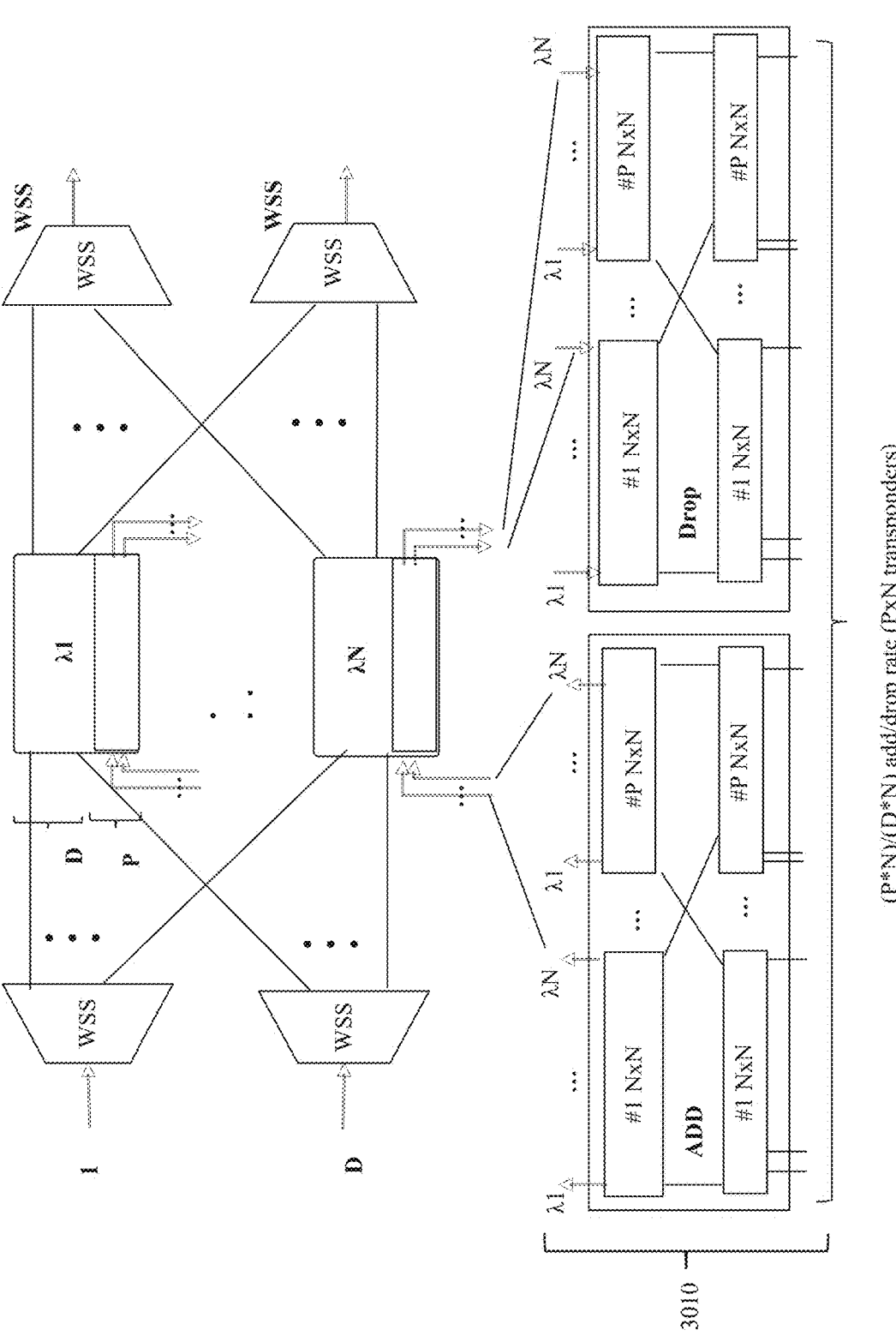
FIG. 30 illustrates an example of add/drop design for the high-degree ROADM of FIG. 27B, according to an embodiment.

FIG. 30 illustrates an example of add/drop design for architecture 1 (the high-degree ROADM of FIG. 27B), according to an embodiment. In some embodiments, the add/drop design 3010 is based on a CDC design and thus has CDC capability. In some embodiments, the add/drop design 3010 is based on a 2-stage MEMS as shown, where each stage includes an array of P MEMS cross connects, and each MEMS is of size N×N.

In some embodiments, an add/drop design may be provided that uses WSS 1×N, MEMS M×M and P*N transponders for add/drop of super-channels. In some embodiments, the CDC design uses smaller N×N MEMS switches or consolidates these smaller switches into a much larger one. In an embodiment, the total number of transponders that this architecture may support is N*P.

In some embodiments, the add/drop design for architecture 1a may be based on 2-stage design with a first sage using WSS and the second stage using MEMS.

Embodiments further describe required components of Architecture 1b. FIG. 31 illustrates design parameters and components for the high-degree ROADM of FIG. 27B (Architecture 1b) and its associated cost of equipment, according to an embodiment. Table 3100 shows the design parameters for architecture 1b using two different sizes of MEMS, M, for add/drop, and the number of components needed in order to build such a design. The design parameters are further based on an add/drop rate of β=33%. Table 3100 further displays two sizes of ROADM degrees, D: 192 degrees and 384 degrees. As may be appreciated, smaller MEMS components of add/drop may be consolidated into a larger one to reduce the number of components used.

Table 3100 may be used for comparing architecture 1b with other architectures (including architecture 3) as described herein.

Embodiments further describe node loss (dB) for Architecture 1b. FIG. 32 illustrates a table indicating insertion loss for the high-degree ROADM of FIG. 27B (Architecture 1b), according to an embodiment. The calculated insertion loss indicated in table 3200 is based on the following assumptions: each WSS on the light-path has a loss of 8.5 dB, the large MEMS device has a loss of 3 dB for passthrough and the smaller MEMS in add/drop has a loss of 2.5 dB.

Figure 33:
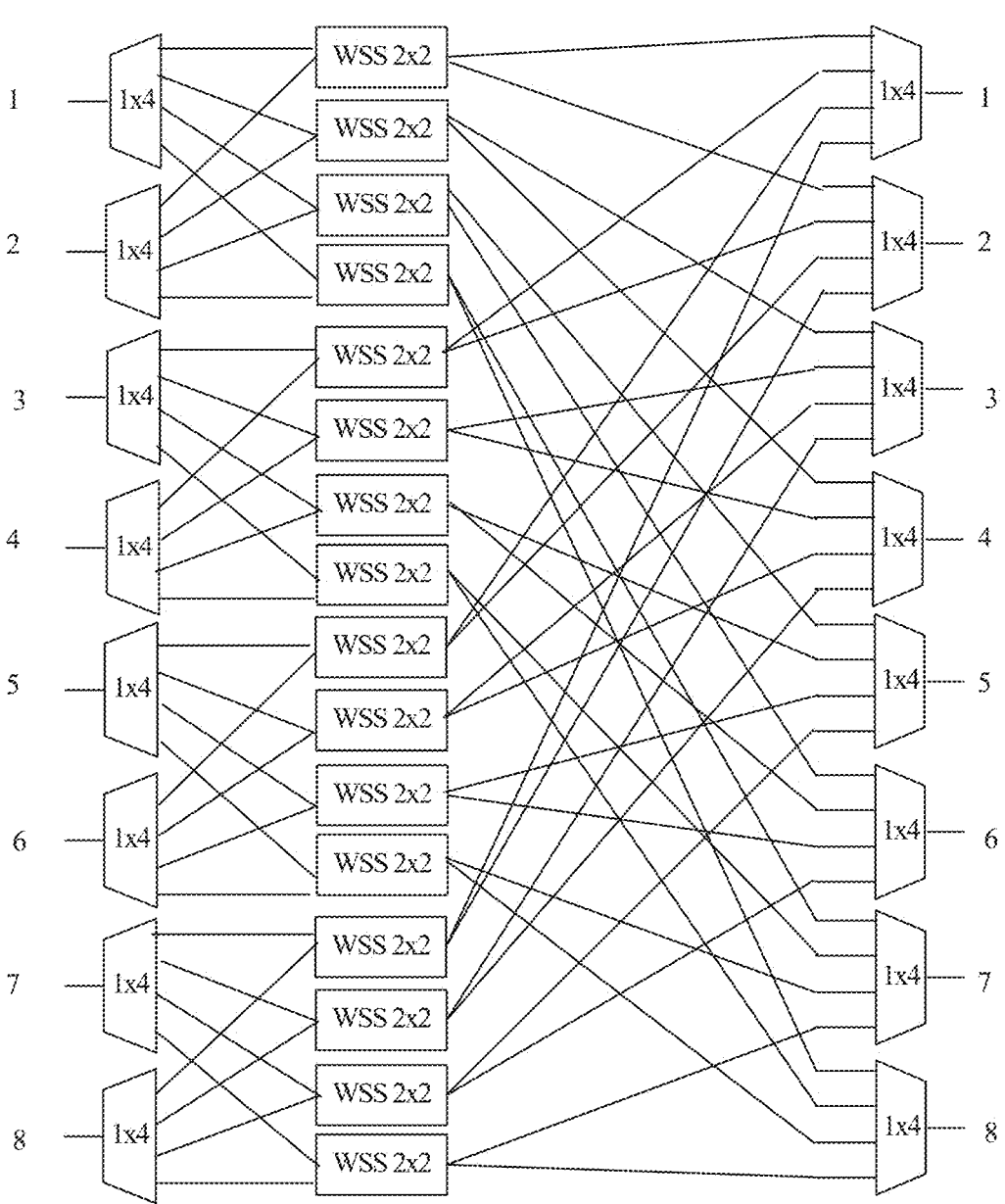
FIG. 33 illustrates an 8-degree ROADM based on a second architecture using a 3-stage WSS-WSS-WSS solution, according to an embodiment.
Figure 34:
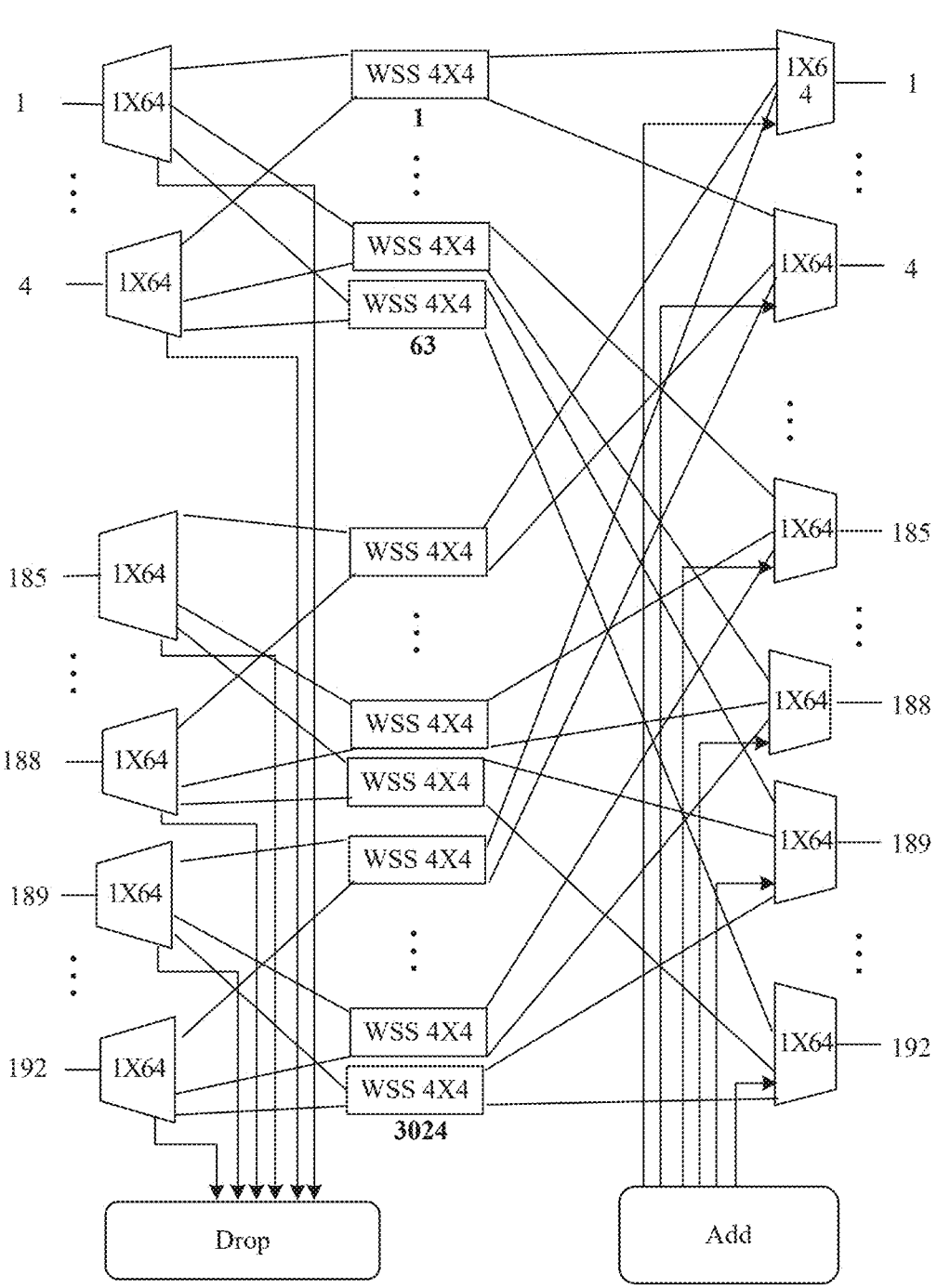
FIG. 34 illustrates a 192-degree ROADM based on the second architecture using a 3-stage WSS-WSS-WSS solution, according to an embodiment.
Figure 35:
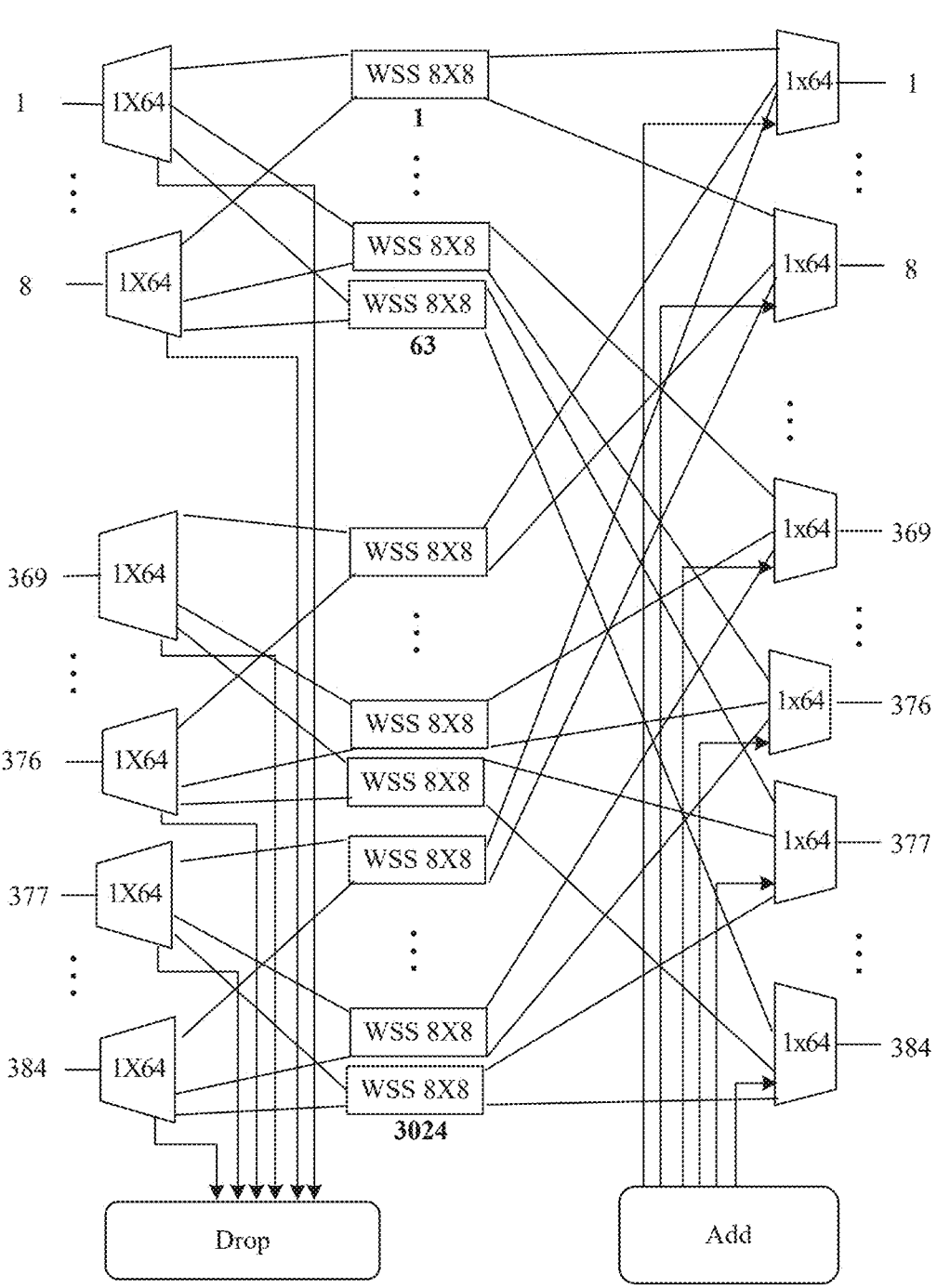
FIG. 35 illustrates a 384-degree ROADM based on a second architecture using a 3-stage WSS-WSS-WSS solution, according to an embodiment.

Similar to Architecture 1, a second architecture, Architecture 2, based on a 3-stage design is considered. Architecture 2 is based on a 3-stage WSS-WSS-WSS architecture. Different from Architecture 1, Architecture 2 has WSS as a center-stage or second stage which is capable of handling both wavelength and space switching. In an embodiment, as both the first and the third stages use WSS 1×N and WSS N×1 respectively, the center-stage WSS is H×H. In some embodiments, to minimize costs, the design for the center stage uses the smallest H for the WSS H×H, while still remaining non-blocking. To achieve this, the relationship between number of degrees, D, and WSS size, H, may be given by:

$$D = N \times H$$

where N is the size of the WSS at the first and third stages. The connectivity from inputs to the outputs is illustrated in FIG. 33. FIG. 33 illustrates an 8-degree ROADM based on a second architecture using a 3-stage WSS-WSS-WSS solution, according to an embodiment. The 8-degree ROADM 3300 is based on a 3-stage WSS-WSS-WSS design (i.e., Architecture 2) that uses WSS 1×4 and WSS 2×2. The degree size, D, for ROADM 3300 may be determined as follows: D=N*H=4*2=8. As illustrated, each output of WSS 1×N is being fan-out by the WSS H×H to the output, providing full connectivity. A similar design may be used to build higher degree ROADMs as illustrated in FIGS. 34 and 35. FIG. 34 illustrates a 192-degree ROADM based on the second architecture using a 3-stage WSS-WSS-WSS solution, according to an embodiment. FIG. 35 illustrates a 384-degree ROADM based on the second architecture using a 3-stage WSS-WSS-WSS solution, according to an embodiment. In an embodiment, the 192-degree ROADM 3400 is based on the 3-stage WSS-WSS-WSS architecture and constructed using WSS 1×64 and WSS 4×4 (H=4). In some embodiments, one port of WSS 1×64 is used for add/drop functionality as illustrated. Similarly, in an embodiment, the 384-degree ROADM 3500 is based on a 3-stage WSS-WSS-WSS architecture and constructed using WSS 1×64 and WSS 8×8 (H=8) as illustrated. In an embodiment, one port of the WSS 1×64 (per direction) is used for add/drop functionality.

Embodiments further describe add/drop design for Architecture 2, the 3-stage WSS-WSS-WSS architecture. While FIG. 34 and FIG. 35 illustrate examples of light-path connectivity on the line side, the add/drop design is further depicted in FIG. 36 and FIG. 37 for the ROADM 3400 and 3500 respectively.

Figure 36:
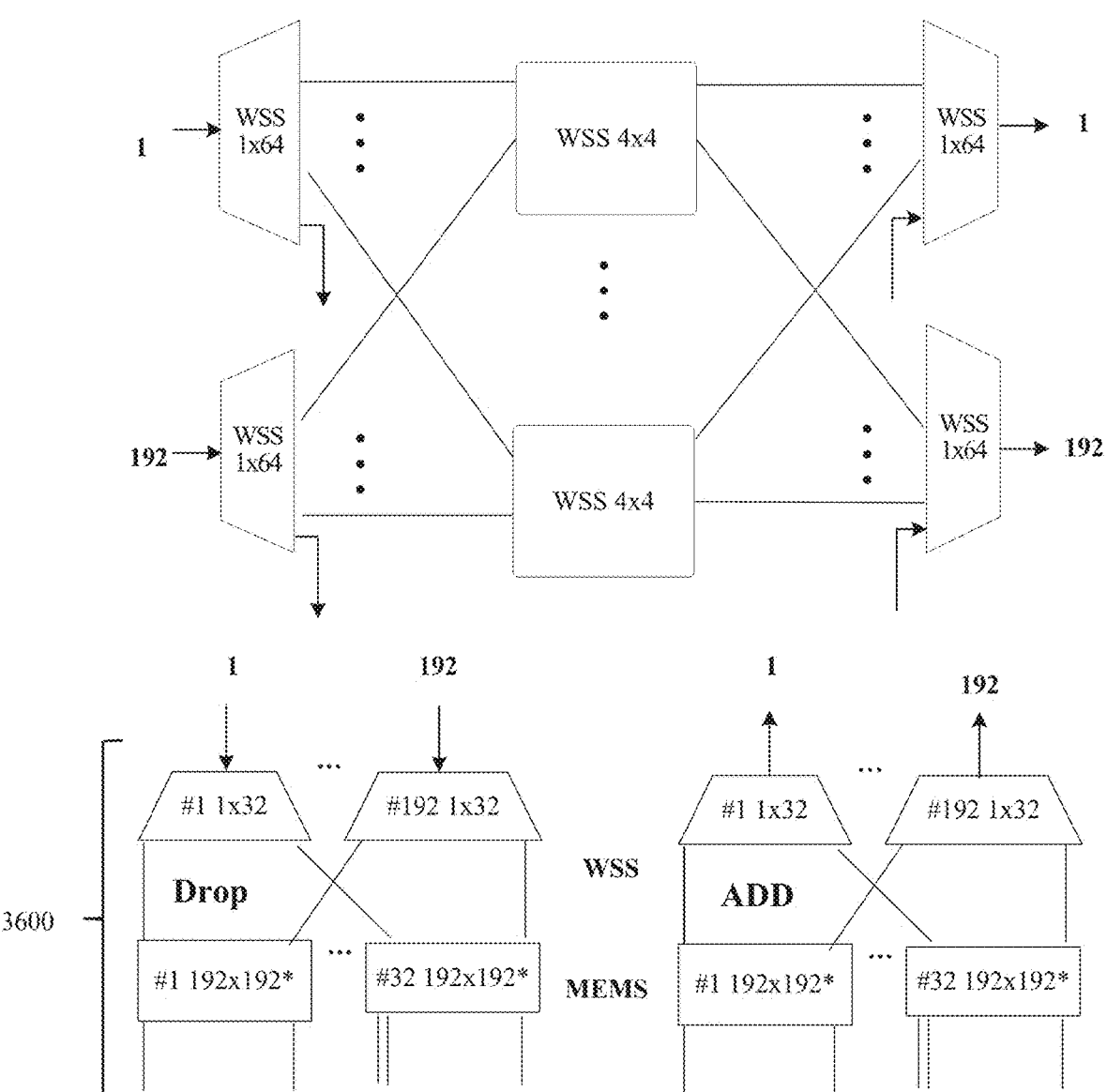
FIG. 36 illustrates an example design for the add/drop functionality of the ROADM of FIG. 34, according to an embodiment.
Figure 37:
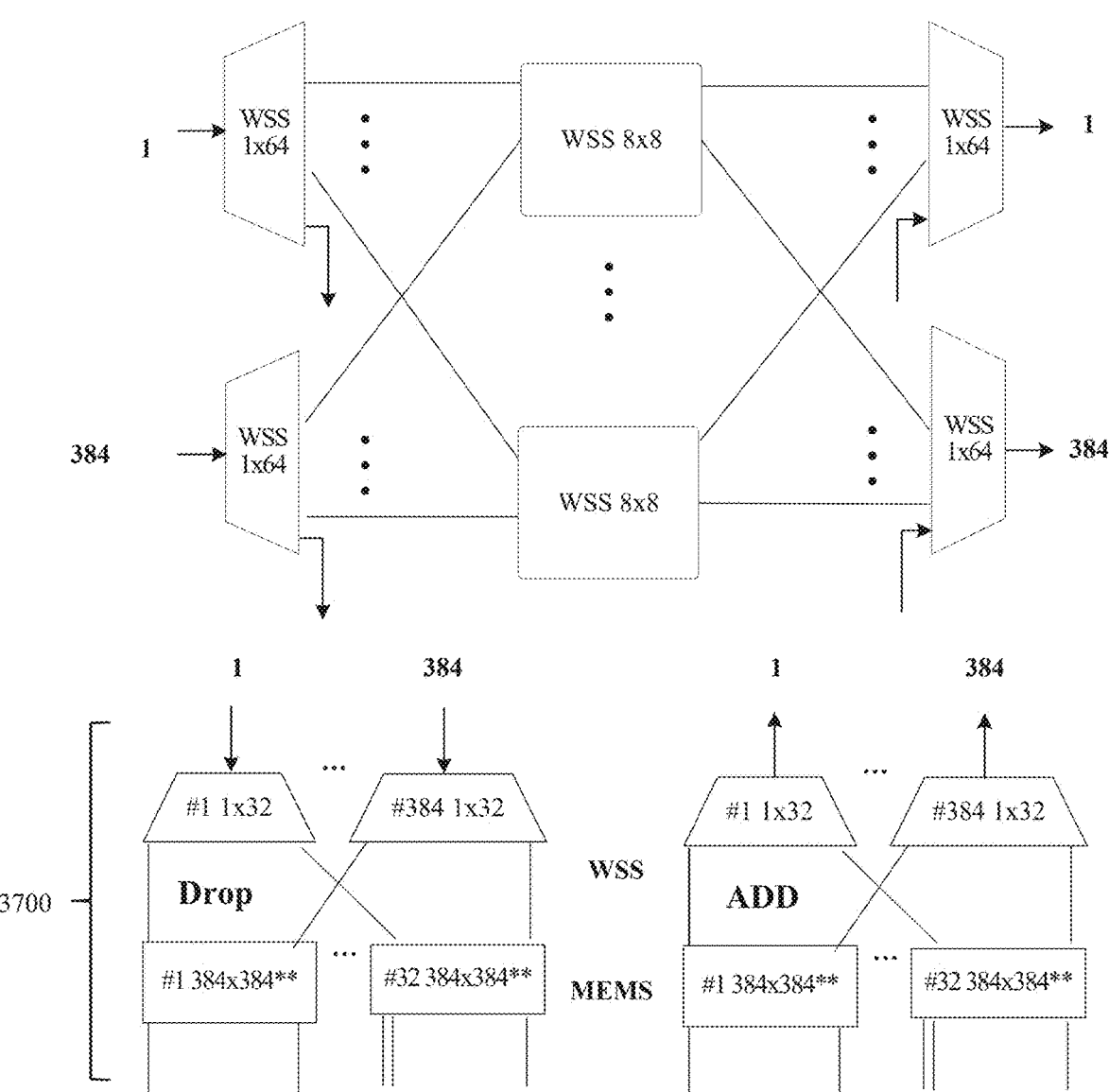
FIG. 37 illustrates an example design for the add/drop functionality of the ROADM of FIG. 35, according to an embodiment.

FIG. 36 illustrates an example design for the add/drop functionality of the 192-degree ROADM, according to an embodiment. FIG. 37 illustrates an example design for the add/drop functionality of the 384-degree ROADM, according to an embodiment. In an embodiment, each of the add/drop design 3600 and 3700 is based on a CDC design and uses both WSS and MEMS for the CDC add/drop. In an embodiment, for an add/drop rate of 40%, with 80 super-channels on the fiber, the size of required MEMS for the add/drop of 192-degree and 384-degree ROADMs are 192× 192 and 384×384, respectively, as illustrated. In some embodiments, these smaller MEMS is consolidated into a larger one, for example, instead of using 32 MEMS 192× 192, 12 MEMS 512×512 can be using. Similarly, instead of using 32 MEMS 384×384, 24 MEMS 512×512 can be used.

As may be appreciated, the node design of Architecture 2, which refers to the 3-stage WSS-WSS-WSS architecture, may allow for a non-blocking design as every super-channel at the input of the 3-stage space/wavelength switch can connect to any of the outputs.

Embodiments further discuss the connection loss of Architecture 2. In terms of loss, each WSS 1×64 may be considered to have a loss of 8.5 dB, while the loss of a WSS H×H, with a smaller H, may be approximated to be 6 dB. FIG. 38 illustrates a table indicating connection loss based on the second architecture using a 3-stage WSS-WSS-WSS solution (Architecture 2), according to an embodiment. Table 3800 provides connection loss for the 3-stage WSS-WSS-WSS architecture for passthrough, add and drop connections. Multi-hop connection loss for Architecture 2 may also be determined based on table 3800 as discussed in embodiments herein. Embodiments further compare Architecture 2 with other Architectures described herein based on connection loss.

The component cost and complexity of Architecture 2 is considered. In terms required components for building a node based on Architecture 2, the add/drop design according to the add/drop design 3600 and 3700 may be considered. FIG. 39 illustrates a table indicating component cost and complexity based on the second architecture using a 3-stage WSS-WSS-WSS solution (Architecture 2), according to an embodiment. In an embodiment, for the 192-degree ROADM, the mid-stage WSSs 4×4 or 8×8 can be replaced by WSSs 32×32, reducing the number of required WSSs from 3024 to 378. Similarly, for the 384-degree ROADM, using WSSs 32×32 reduces the number of mid-stage WSSs from 3024 to 768. However, as may be appreciated, the tradeoff for reducing the number of mid-stage WSSs may result in increased losses, as WSS 4×4 typically has lower connection loss than WSS 32×32.

Figure 40:
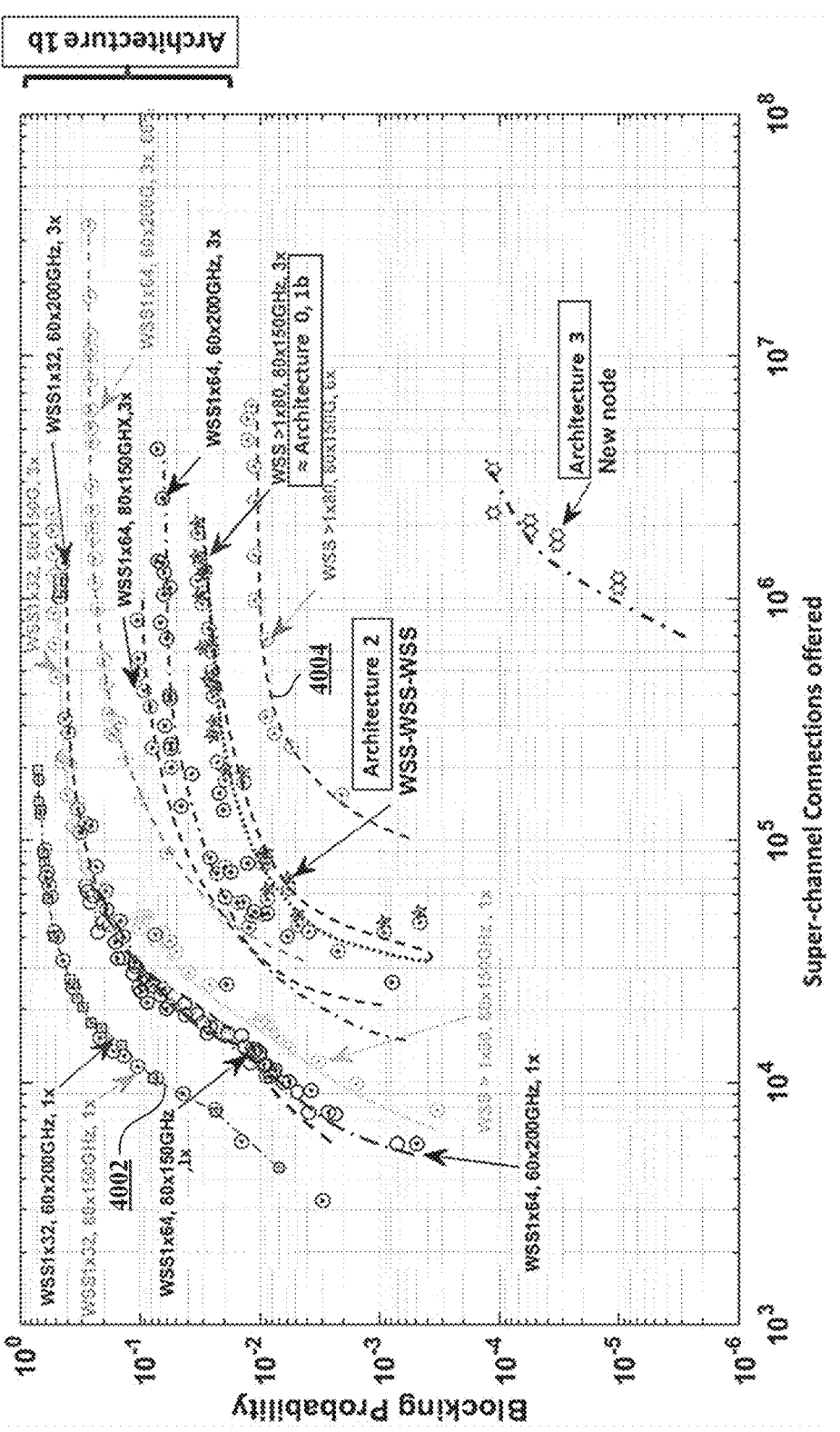
FIG. 40 illustrates blocking performance based on different architectures, according to an embodiment.

FIG. 40 illustrates blocking performance based on different architectures, according to an embodiment. The graph 4000 illustrates blocking performance of Architectures 0, 1b, 2 and 3 as described herein as a function of super-channel connections offered.

Referring to graph 4000, the blocking performance of Architecture 1b is dependent one or more of: the size of WSS used in constructing the node, the network dimension in terms of ROADM degree, and the number of fibers on the links of the network (referring to the reference network 200). Graph 4000 illustrates the blocking performance of Architecture 1b based on varying the size of WSS (from WSS 1×32 to WSS 1×80 as the maximum number of super-channels on a fiber is 80) and varying the network size from 1× (with average degree of 39.5 and maximum degree of 114) to 6× (with average node degree of 237 and maximum node degree of 684). The performance bound can be observed between two curves: one for WSS1×32 on 1× network 4002 and the other for WSS>1×80 on 6× network 4004.

Referring to graph 4000, the blocking performance for architectures 0 and 2 is similar. This similarity in blocking performance may be attributed to the architectures enabling a non-blocking behavior at the node level, and any observed blocking is likely attributed to network level blocking.

Further referring to graph 4000, Architecture 3 outperforms the other three architectures as it reduces or inhibits blocking due to segmentation. This improved performance may be attributed to the optimized allocation of fiber per section based on node traffic, resulting in an improved utilization of spectrum. This improved utilization performance is further described herein.

In graph 4000, it can be observed that for the same add/drop rate, as the network dimension increases from 1× to 6×, the blocking performance improves, but remains within the bounds indicated by curve 4002 (for WSS1×32, 1×) and curve 4004 (for WSS>1×80, 6×) as described herein. A comparison may be made between Architecture 3 and the other Architectures (e.g., Architectures 0, 1b, and 2) based on the degree of the network. For example, the network's degree under node Architecture 3, which provisions a specific number of fibers for each path, can be compared to a similar node degree using Architectures 0, 1b, or 2.

To explore this comparison, the average node degree of networks based on different architectures (Architectures 0, 1b, 2 and 3) is examined. In an embodiment, the network based on Architecture 3 has an average node degree of 174 and a maximum node degree of 404 (as described herein in reference to FIG. 17). In comparison, the 6× network based on Architecture 1b has an average node degree of 237.

Further, 4× network and 5× network, also based on Architecture 1b, have average node degrees 158 and 197, respectively. This illustrates that the average node degrees of the 4× and 5× networks, based on Architecture 1b, sandwich the average node degree of the network based on Architecture 3 (i.e., the average node degrees of the 4× and 5× networks are on either side of the average node degree of the Architecture 3 network, highlighting their relative positions in terms of node degree.)

Figure 41:
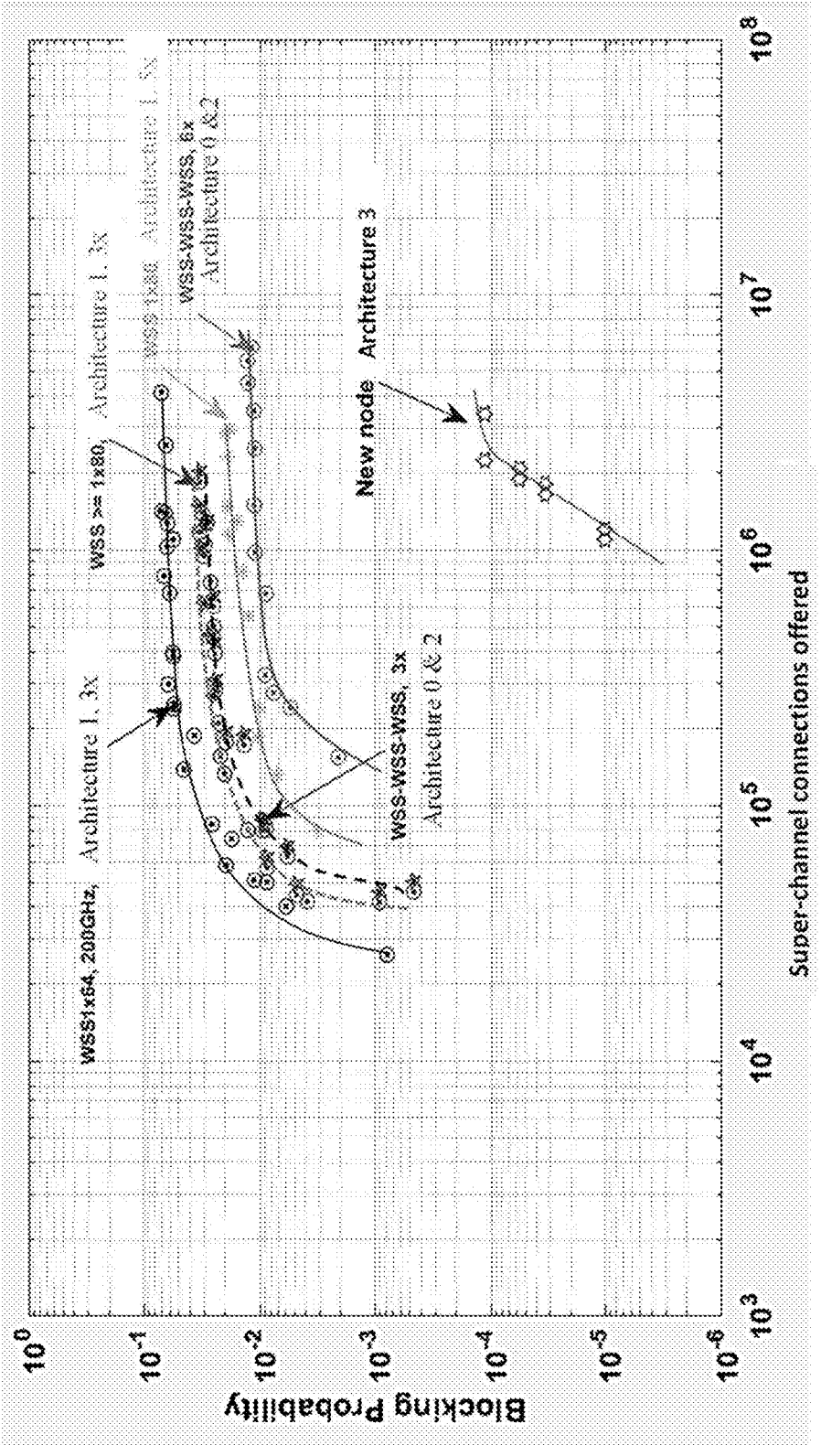
FIG. 41 illustrates plots of blocking probability of various networks including a network based on the network node architecture of FIG. 1 and those of other architecture networks, according to an embodiment.

FIG. 41 illustrates plots of blocking probability (blocking rate) of various networks including a network based on network node architecture of FIG. 1 (Architecture 3 network) and those of other architecture networks, according to an embodiment. Graph 4100 compares the blocking rate of Architecture 3 network with those of 3×, 5×, and 6× networks based on other architectures. As may be appreciated, if a network were constructed based on architectures 0, 1 or 2 with a similar network degree to that of architecture 3, its performance would be bounded between the curves of the 3× and 5× networks.

FIG. 42A and FIG. 42B illustrate a summary table of performance of various architectures, according to an embodiment. Table 4200 of FIG. 42A illustrates a summary table of performance of Architectures 0 and 1b. Table 4210 of FIG. 42B illustrates a summary table of performance of Architectures 2 and 3. Table 4200 and 4210 summarizes the performance of the four architectures (0, 1b, 2 and 3) in terms of blocking rate, loss (dB), and component cost and complexity to build high-degree ROADMs (e.g., 384-degrees with 33% add/drop and 192-degrees with 33% add/drop). Referring to tables 4200 and 4210, among the four architectures, Architecture 3 (i.e., case 3b) outperforms the others in terms of loss, cost and performance. The results may indicate advantages and benefits of Architecture 3 (e.g., case 3b) deployed in a mode where both the MEMS and WSS components of the node are used for traffic handling.

In addition to the three-performance metrics of loss, cost and blocking tabulated in FIG. 42A and FIG. 42B, the performance of Architecture 3 (e.g., case 3b) in terms of network utilization is further described herein.

Figure 43:
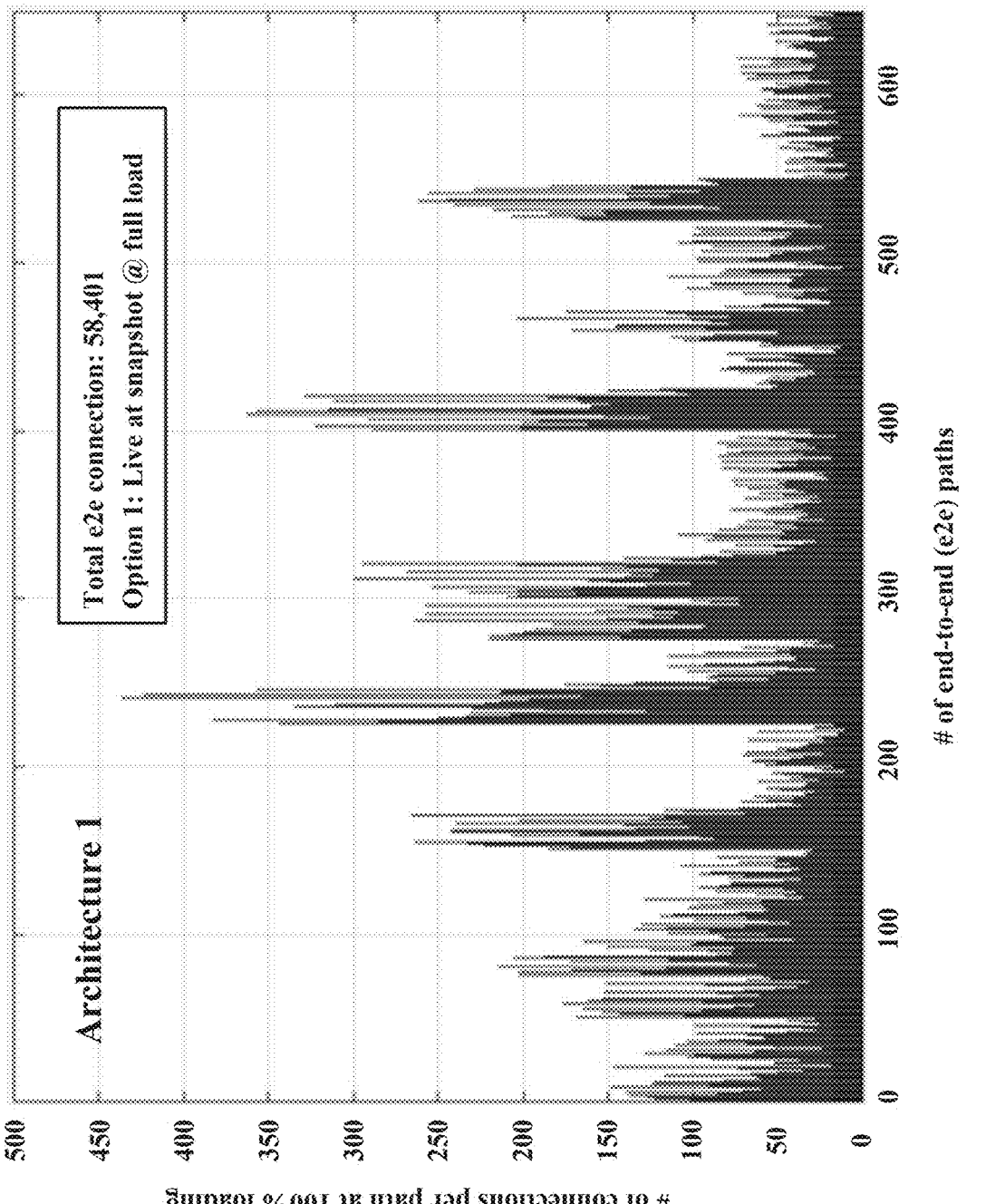
FIG. 43 illustrates a snapshot of the live number of end-to-end connections at full load over a network based on a first architecture using a 3-stage WSS-MEMS-WSS solution, according to an embodiment.

Embodiments further compare live network utilization of various architectures, which may involve analyzing how efficiently different network architectures are used in real-time operations. This comparison may be conducted through simulation modeling of the network 200 with 3× capacity and mean node degree of 118 and max node degree of 342. In this modeling, the large network with thousands of OMS sections generates super-channel connections using the Engset model, a Poisson process with a finite number of transponders representing the actual number at a node. Connections are generated, and the network attempts to provide connectivity through the OMS sections. If not blocked, the connection is routed and utilizes the allocated network resources, which may be returned upon completion of service. The network's dynamics may be random; hence, the simulation model may be paused to capture a snapshot of the number of live connections when the network is at full load. This snapshot may reveal the total number of connections at full loading, which may be similar for all architectures. It's noted that Architecture 0 and 2 are similar in terms of performance, although their implementations may differ, with one using a large theoretical WSS and the other a 3-stage WSS. FIG. 43 illustrates a snapshot of the live number of end-to-end connections at full load over a network based on a first architecture using a 3-stage WSS-MEMS-WSS solution (e.g., node architecture 1), according to an embodiment. The x-axis represents the ID for source/ destination pairs (a total of 650 pairs), and the y-axis shows the number of connections for each of the 650 source/destination pairs. The total number of super-channel connections for this snapshot is 58,401.

Figure 44:
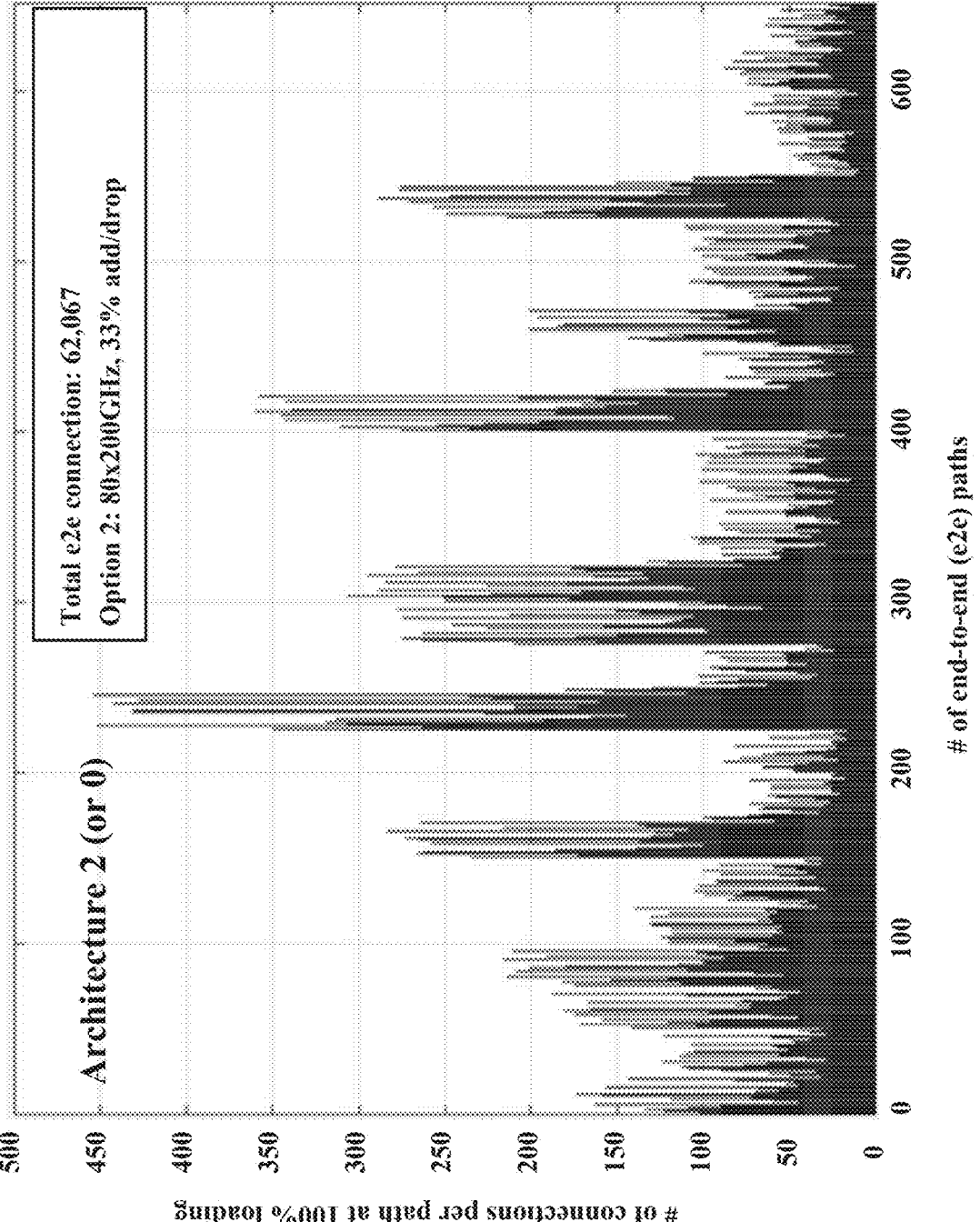
FIG. 44 illustrates a snapshot of the live number of end-to-end connections at full load over a network based on a second architecture using a 3-stage WSS-WSS-WSS solution (or a network based on a node architecture using a large WSS), according to an embodiment.

Architectures 0 and 2 exhibit similar performance levels, differing primarily in their implementation methods. To compare these architectures, a snapshot of live connections for architecture 2 at full load is taken, allowing for comparison with snapshots obtained using Architectures 1 and 3. FIG. 44 illustrates a snapshot of the live number of end-to-end connections at full load over a network based on a second architecture using a 3-stage WSS-WSS-WSS solution (e.g., node architecture 2) or based on a node architecture using a large WSS (e.g., node architecture 0), according to an embodiment. The total number of live network connections for Architecture 2 or 0 is 62,067 end-to-end super-channel connections.

Figure 45:
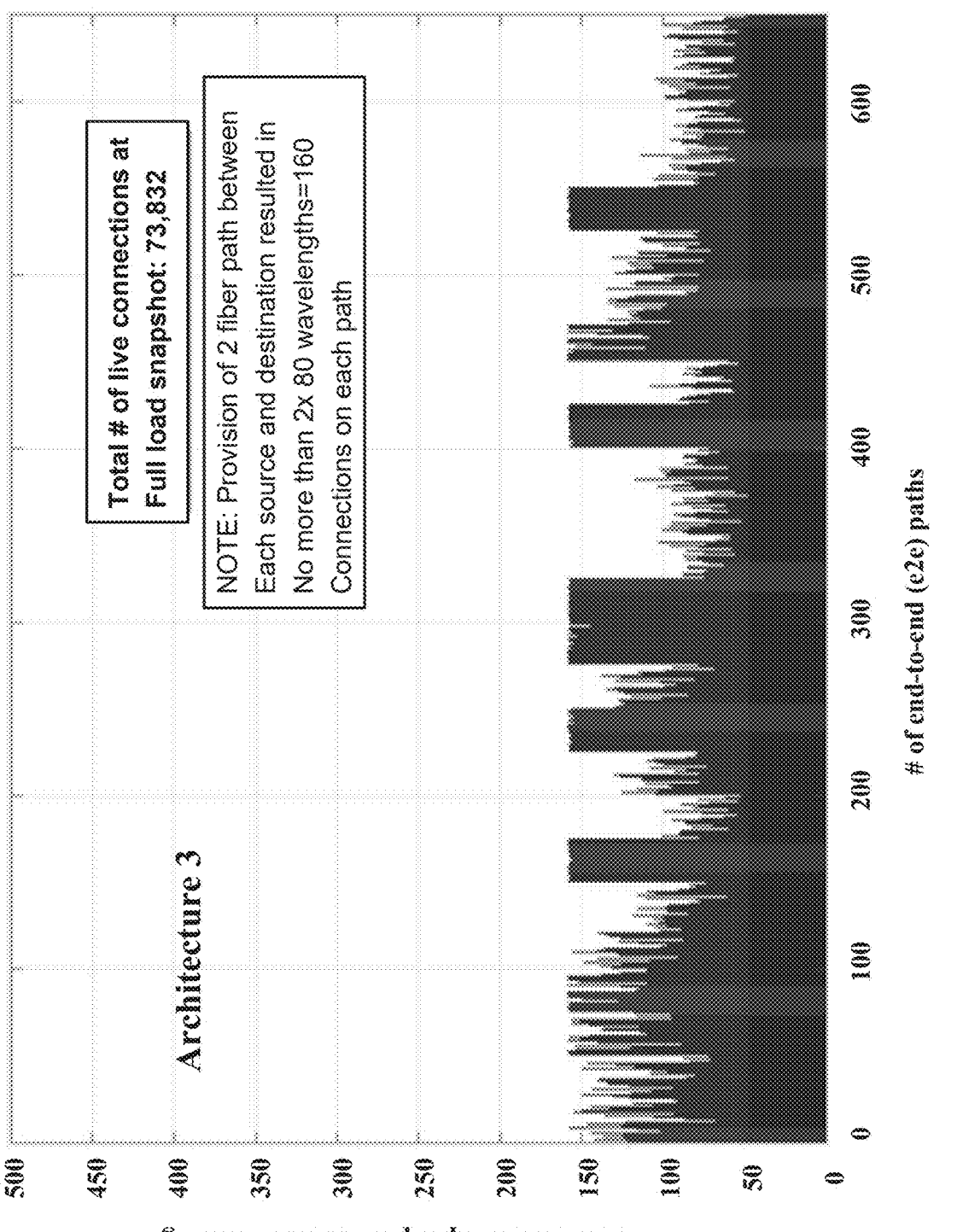
FIG. 45 illustrates a snapshot of the live number of end-to-end connections at full load over a network based on the node architecture of FIG. 1, according to an embodiment.

FIG. 45 illustrates a snapshot of the live number of end-to-end connections at full load over a network based on the node architecture of FIG. 1 (e.g., Architecture 3), according to an embodiment. The snapshot displays the live number of super-channel connections in the network at full load, revealing a total of 73,832 super-channel connections. As may be appreciated, each of the 650 paths is capped at 160 super-channels. This limitation arises from the consideration of two fibers provisioned between each source/destination pair, resulting in a maximum of 80 super-channels per fiber and thus capping the maximum super-channels per source/destination pair at 160.

In analyzing the handling of the number of super-channel connections at full load, several observations can be made. Architecture 3 supports the highest number of end-to-end connections at full network load compared to Architectures 0, 1, and 2. Architecture 2 (or 0) allows for more end-to-end connections than Architecture 1 but fewer than Architecture 3. Further, Architecture 1 allows for the fewest end-to-end connection among these architectures.

Comparing the number of connections for Architecture 2 to Architecture 1 may show that Architecture 2 outperforms Architecture 1 by 6.3%. Further, Architecture 3 may utilize the network by 26.4% more than Architecture 1. However, this comparison may not be fair as the number of OMS sections in architecture 3 is 3294, whereas in Architecture 1 and 2, the number of OMS sections is 3084 each. Therefore, the results may need to be normalized. As may be appreciated, with more sections or degrees, there are more transponders and traffic due to the 33% add/drop rate applying to 33% of the node capacity. Normalizing the results to the same number of sections, the improvement obtained by using architecture 3 (compared to architecture 1) may be adjusted to 24.7%. This adjustment may be calculated using the ratio of the number of sections to the improvement, i.e., 93.6%*26.4%=24.7%.

Comparing the number of connections of Architecture 3 at full load to that of architecture 2 may reveal that the improvement in network utilization may be 19% better. However, after normalizing to the same number of sections, this improvement may be adjusted to 17.5%.

Examining the source/destination paths being capped at 160 may indicate the potential for further improvement if more fiber(s) is provisioned for these source/destination pairs. In this simulation, a fixed number is assigned for all source/destination pairs. Architecture 3 may inhibit or alleviate the 'segmentation' challenges on the optical network, making it more efficient. Segmentation in optical networks involves dividing available bandwidth into smaller chunks along network links. This division results in bandwidth chunks, represented by wavelengths or channels, that may not align or be suitable for end-to-end connections requiring only a few links. Consequently, this segmentation can lead to connection blocking, where despite low link utilization, connections cannot be established due to the segmented distribution of bandwidth along the fiber. Embodiments may reduce or alleviate segmentation challenges as further described herein in embodiments relating to fiber utilization for each snapshot.

Figure 46A:
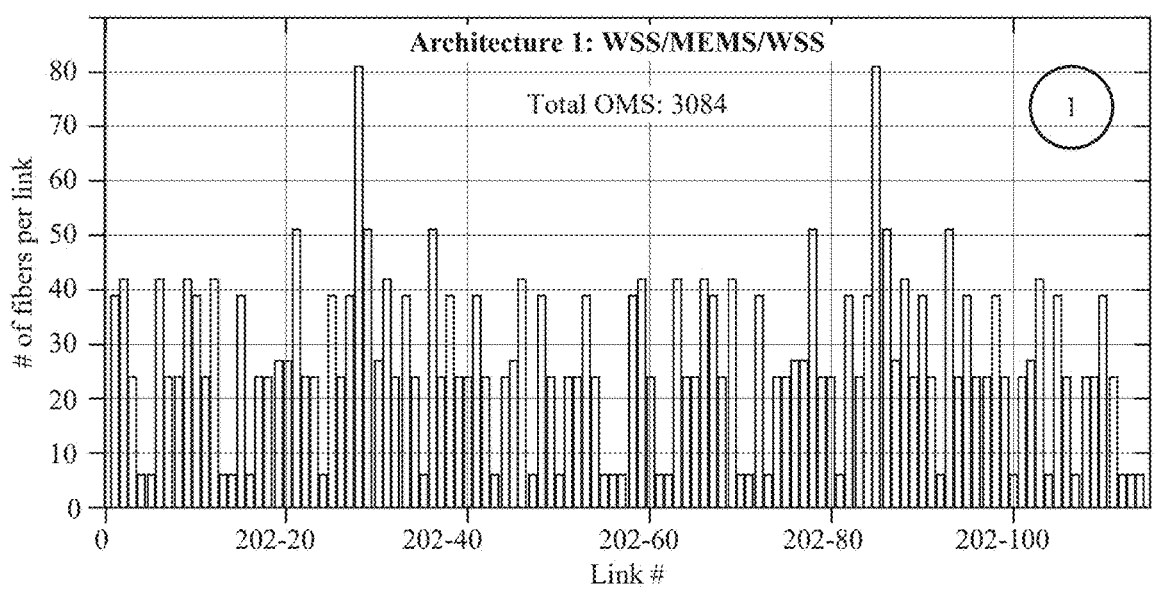
FIG. 46A illustrates the number of fibers for each link based on a first architecture using a 3-stage WSS-MEMS-WSS solution, according to an embodiment.
Figure 46B:
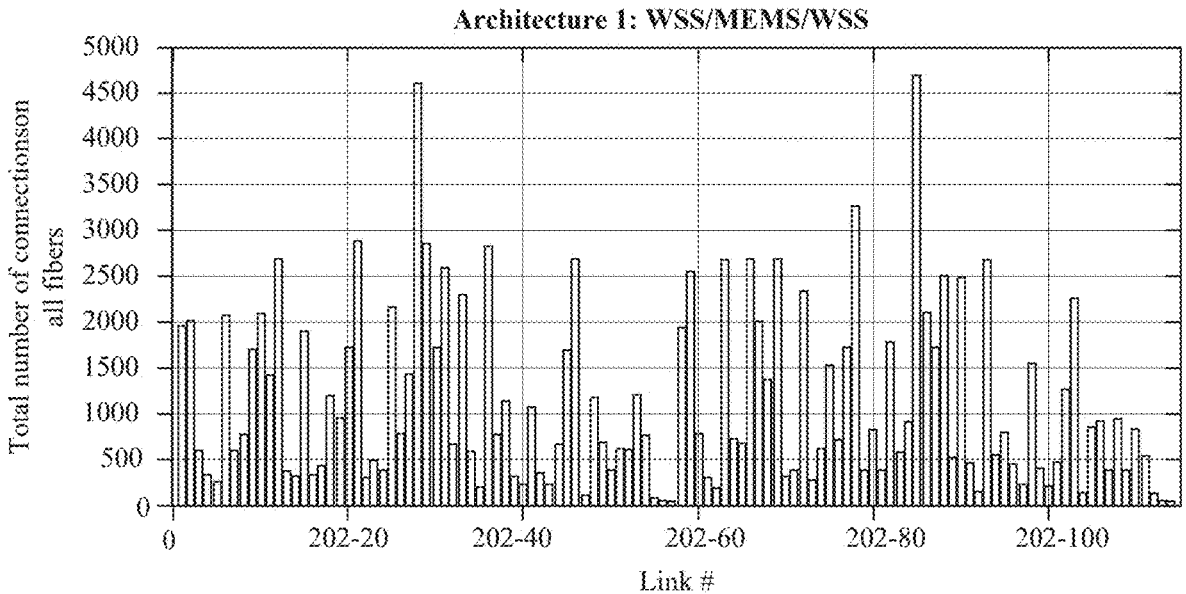
FIG. 46B illustrates the total number of connections on all fibers of each link based on a first architecture using a 3-stage WSS-MEMS-WSS solution, according to an embodiment.
Figure 46C:
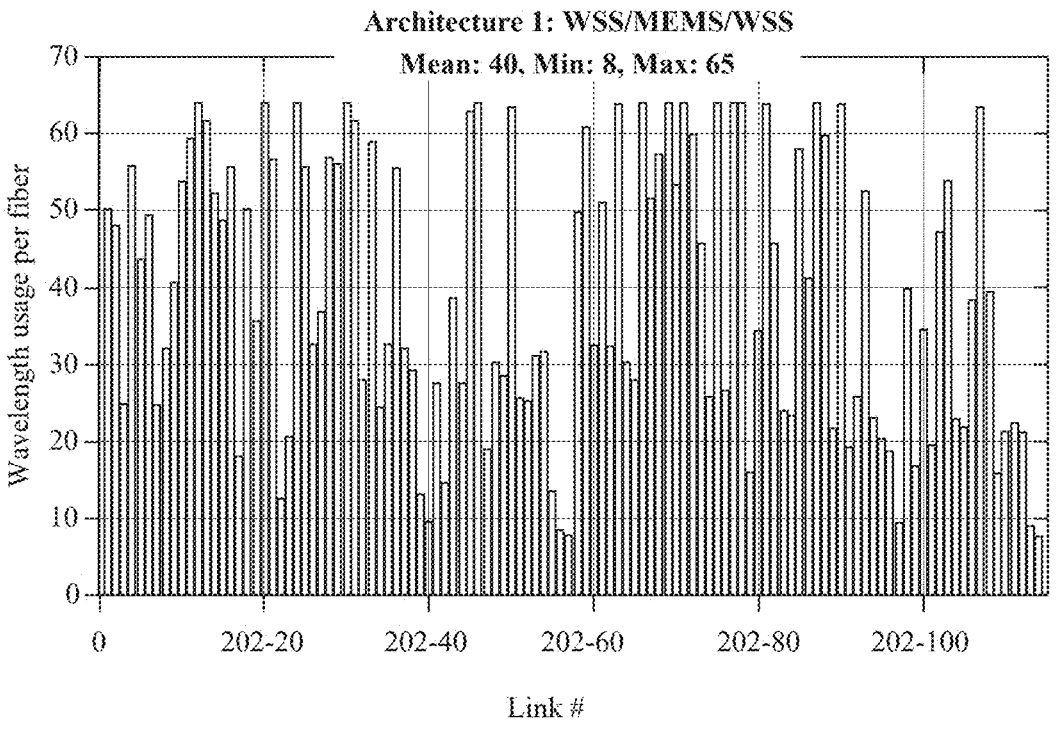
FIG. 46C illustrates wavelength usage per fiber based on a first architecture using a 3-stage WSS-MEMS-WSS solution, according to an embodiment.

Embodiments further discuss and compare fiber utilization based on snapshots of live connections. FIG. 46A, FIG. 46B, and FIG. 46C indicate fiber utilization for Architecture 1 and are based on the snapshot of live connections of Architecture 1 indicated by FIG. 43. FIG. 46A illustrates the number of fibers for each link based on a first architecture using a 3-stage WSS-MEMS-WSS solution (e.g., Architecture 1), according to an embodiment. The number of fibers on each link and the number of OMS per link are shown resulting in a total OMS of 3084. FIG. 46B illustrates the total number of connections on all fibers of each link based on a first architecture using a 3-stage WSS-MEMS-WSS solution (e.g., Architecture 1), according to an embodiment. The total number of connection on each link (the sum of connections on all the fibers associated with said each link) are shown. By normalizing the number of connections per fiber, the number of utilized super-channels on each fiber may be obtained. This is plotted in FIG. 46C. FIG. 46C illustrates wavelength usage per fiber based on a first architecture using a 3-stage WSS-MEMS-WSS solution (e.g., Architecture 1), according to an embodiment. It may be observed that at full load, the average number of utilized super-channels on each fiber is merely 40 (approximately 50% of the total number of super-channels).

Figure 47A:
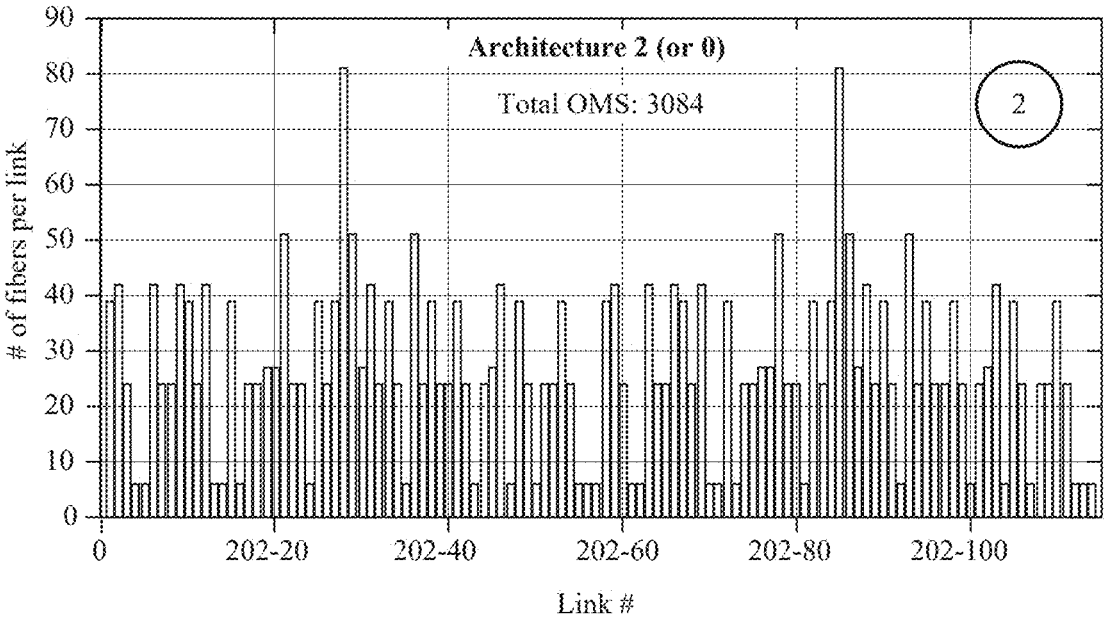
FIG. 47A illustrates the number of fibers for each link based on a second architecture using a 3-stage WSS-WSS-WSS solution (or a node architecture using a large WSS), according to an embodiment.
Figure 47B:
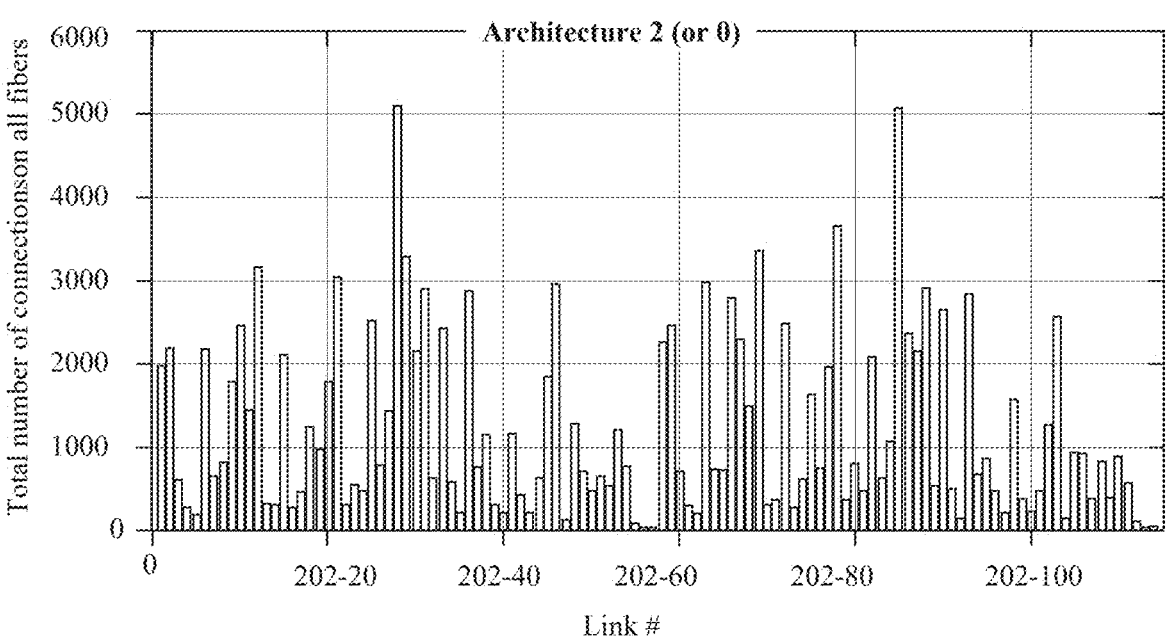
FIG. 47B illustrates the total number of connections on all fibers of each link based on a second architecture using a 3-stage WSS-WSS-WSS solution (or a node architecture using a large WSS), according to an embodiment.
Figure 47C:
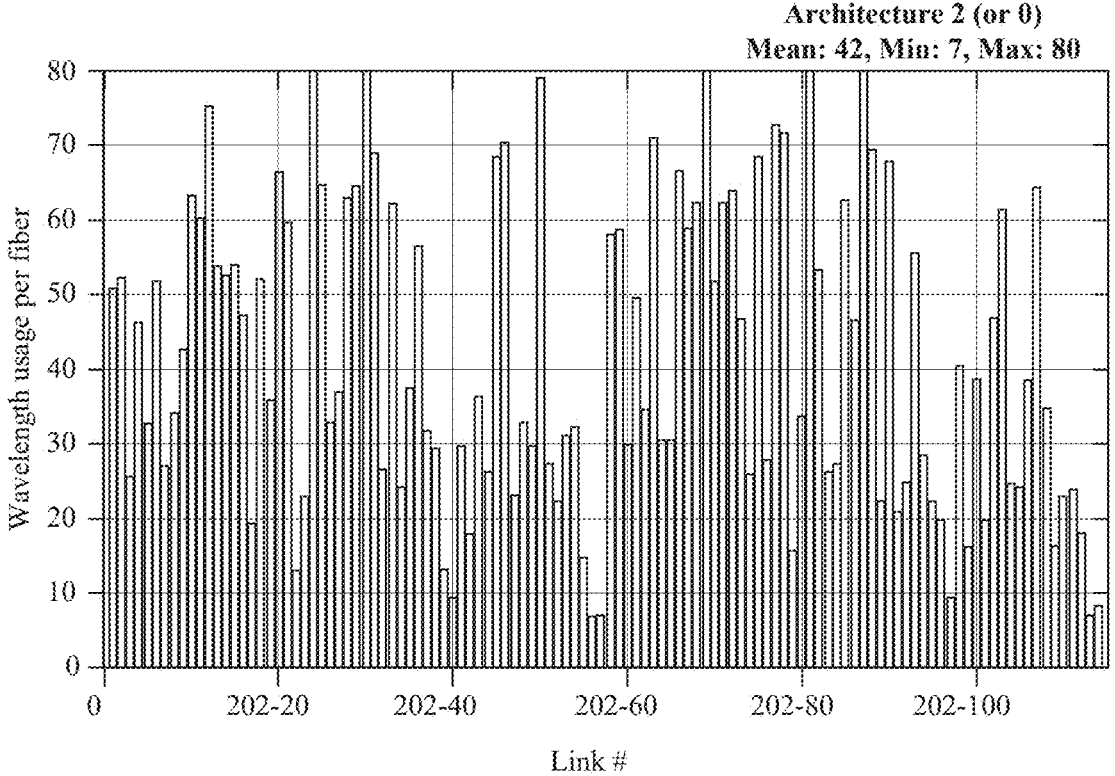
FIG. 47C illustrates wavelength usage per fiber based on a second architecture using a 3-stage WSS-WSS-WSS solution (or a node architecture using a large WSS), according to an embodiment.

FIG. 47A, FIG. 47B, and FIG. 47C indicate fiber utilization for Architecture 2 (or 0) and are based on the snapshot of live connections of Architecture 2 (or 0) indicated by FIG. 44. FIG. 47A illustrates the number of fibers for each link based on a second architecture using a 3-stage WSS-WSS-WSS solution (e.g., Architecture 2) or based a node architecture using a large WSS (e.g., Architecture 0), according to an embodiment. The number of fibers on each link and the number of OMS per link are shown resulting in a total OMS of 3084 for the network. FIG. 47B illustrates the total number of connections on all fibers of each link based on a second architecture using a 3-stage WSS-WSS-WSS solution (e.g., Architecture 2) or based a node architecture using a large WSS (e.g., Architecture 0), according to an embodiment. The total number of connection on each link (the sum of connections on all the fibers associated with said each link) are shown. By normalizing the number of connections per fiber, the number of utilized super-channels on each fiber may be obtained. FIG. 47C illustrates wavelength usage per fiber based on a second architecture using a 3-stage WSS-WSS-WSS solution (e.g., Architecture 2) or based a node architecture using a large WSS (e.g., Architecture 0), according to an embodiment. It can be observed that the average number of utilized super-channel per fiber is 42 (about 5% more than that of Architecture 1).

Figure 48A:
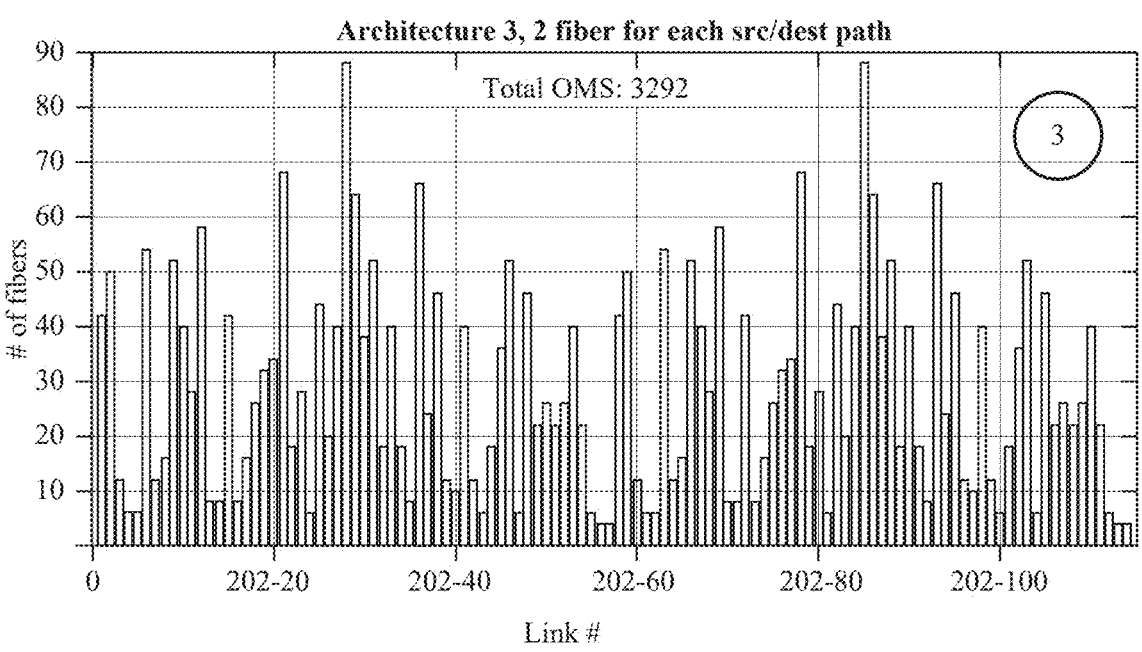
FIG. 48A illustrates the number of fibers for each link based on the node architecture of FIG. 1, according to an embodiment.
Figure 48B:
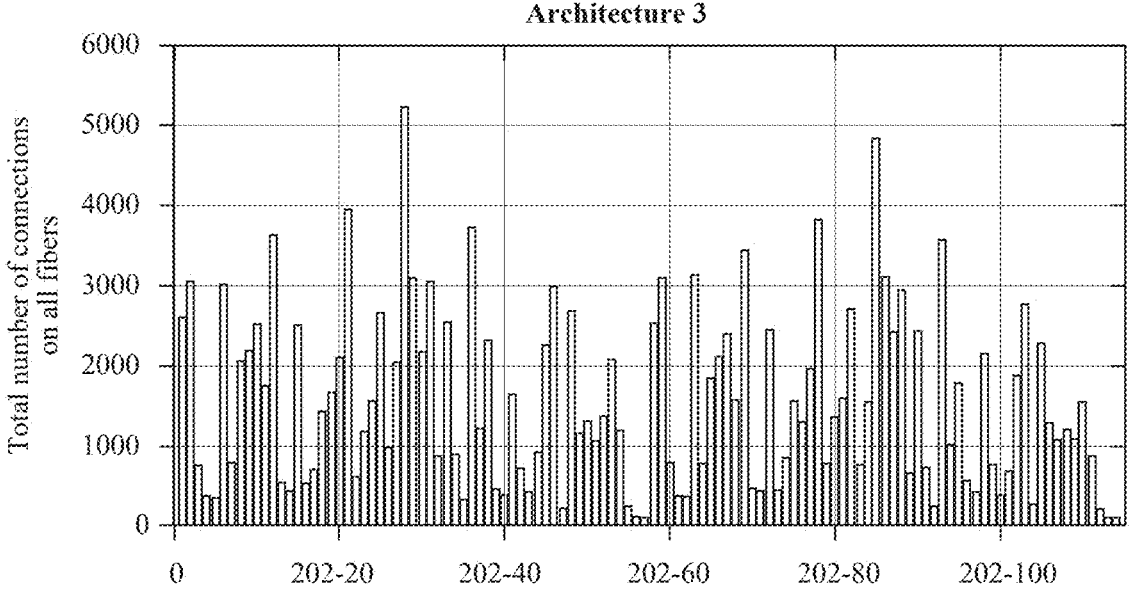
FIG. 48B illustrates the total number of connections on all fibers of each link based on the node architecture of FIG. 1, according to an embodiment.
Figure 48C:
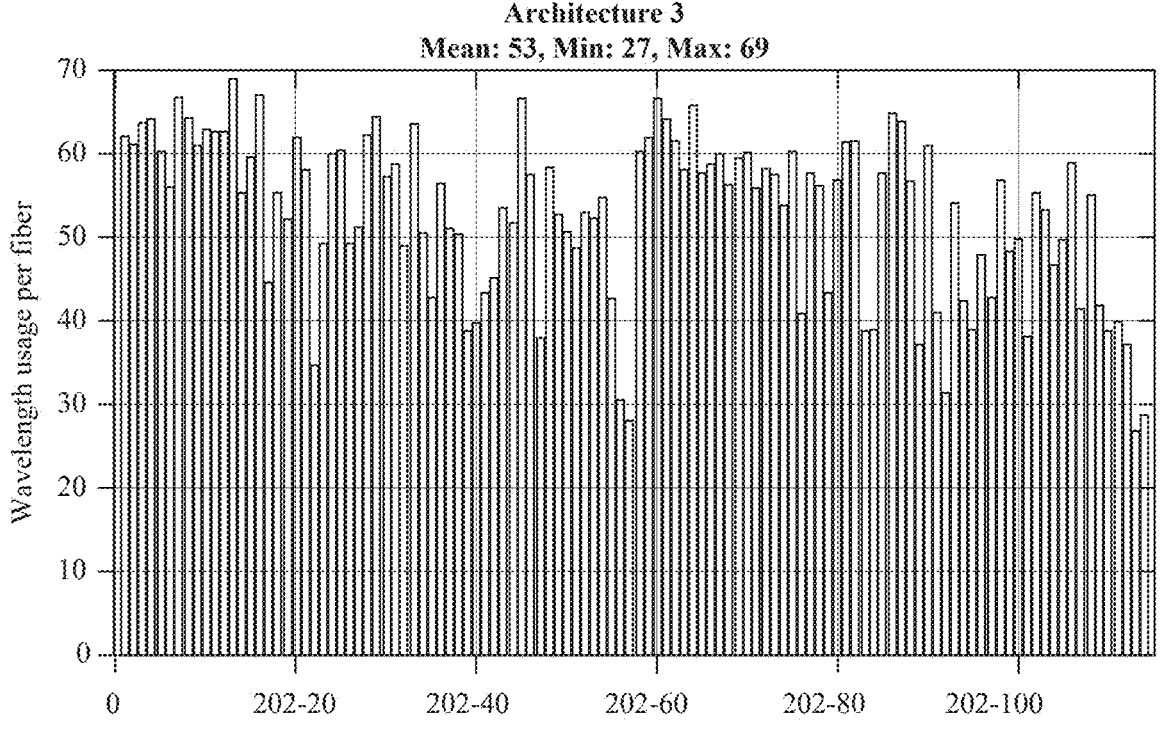
FIG. 48C illustrates wavelength usage per fiber based on the node architecture of FIG. 1, according to an embodiment.

FIG. 48A, FIG. 48B, and FIG. 48C indicate fiber utilization for Architecture 3 (e.g., case 3b) and are based on the snapshot of live connections of Architecture 3 indicated by FIG. 45. FIG. 48A illustrates the number of fibers for each link based on the node architecture of FIG. 1 (e.g., Architecture 3), according to an embodiment. The number of fibers on each link and the number of OMS per link are shown resulting in a total OMS of 3292 for the network. The number of OMS is slightly higher than that of Architecture 1. Hence, the normalized results of per fiber utilization may be considered. FIG. 48B illustrates the total number of connections on all fibers of each link based on the node architecture of FIG. 1 (e.g., Architecture 3), according to an embodiment. The total number of connection on each link (the sum of connections on all the fibers associated with said each link) are shown. By normalizing the number of connections per fiber, the number of utilized super-channels on each fiber may be obtained. FIG. 48C illustrates wavelength usage per fiber based on the node architecture of FIG. 1 (e.g., Architecture 3), according to an embodiment. As indicated, the normalized number of super-channels per fiber is 53 which is 32% better than utilization in architecture 1, i.e. 40 super-channels).

According to an embodiment, Architecture 3 may provide one or more advantages. In some embodiments, Architecture 3 may allow flexibility in design and in use-cases based on various modes of operations described herein. In some embodiments, Architecture 3 may further provide improved performance in terms of blocking, loss and cost. The blocking performance may translate to improved or increased fiber capacity utilization. In some embodiments, Architecture 3 may result in zero blocking at node level for all super-channel services. In some embodiments, Architecture 3 may allow for reduced or minimized blocking, e.g., 0.0001 blocking at network level at full load, which is 350 times better than Architecture 1, WSS/MEMS/WSS, or Architecture 0/2 that offer a blocking of 0.035 (the reported results being based one or more performed network simulations).

In some embodiments, Architecture 3 may allow for improved fiber capacity utilization. For example, Architecture 3 may provide at least 25% more fiber capacity utilization in comparison with similar size network using Architectures 0, 1 or 2. In some embodiments, Architecture 3 may allow for reduced connection loss. For example, Architecture 3 was shown to have the least average end-to-end loss of 36 dB (averaged for all one-hop to 5-hops) in comparison with average loss of 63 dB for architecture 1b, for 1-hop to 5-hops, which is 25 dB higher in connection loss compared to that of Architecture 3. Thus, Architecture 3 may provide for reduced connection loss (25 dB less loss) compared architecture 1b. Analysis of one-hop to 5-hop of various network connection may reveal dB improvement.

In some embodiments, Architecture 3 may allow for improved cost and complexity. For example, Architecture 3 was shown to have roughly less than 10% of the cost of Architecture 1 and 2. In some embodiments, Architecture 3 may provide for service distinction and flexibility with full wavelength switching anywhere within the network.

According to an embodiment, a network node may be provided that includes at least a MEMS component and a WSS component. In an embodiment, the MEMS component and WSS component are interconnected together offering various modes for deployments as described herein.

According to an embodiment, an optical switching node may be provided. The optical switching node may include at least two sets of switches, at least two sets of line fibers and one or more sets of add/drop fibers. The first set of line fibers may be connected to the first set of switches. The first of switches may be a set of OXC or OCS, where each of OXC or OCS is one of MEMS, LCOS, solid-state optical switch or any other suitable optical switch. The second set of line fibers may be connected to the second set of switches. The second set of switches may be a set of WSSs (e.g., WSS 16×16). The first set of add/drop fibers may be connected to the set of first switches. The second set of add/drop fibers may be connected to the second set of switches. The first and second set of switches may be partially interconnected with some output of the first set of switches connected to some input of the second set of switches, and conversely some output of the second set of switches connected to some inputs of the first set of switches.

In some embodiments, the first set of switches is a set of OXC or OCS. In some embodiments, the set of OXC or OCS is a set of one of: MEMS, LCOS, solid-state optical switch or any other suitable optical switch. In some embodiments, the second set of switches is a set of wavelength switches. In some embodiments, the set of wavelength switches is a set of WSS J×J, where J is an integer number. In some embodiments, the second set of wavelength switches is a smaller ROADM node capable of wavelength switching. In some embodiments, the add/drop is CD or CDC. In some embodiments, the add/drop is based on a design comprising one or more of MEMS and WSS.

According to an embodiment, an apparatus may be configured to allocate, at a node, a number of line fibers to a first switch. The apparatus may be further be configured to allocate, at the node, a number of line fibers to a second switch. The apparatus may be further configured to allocate, at the node, a number of add/drop fibers to both the first switch and the second switch. The apparatus may be further configured to set a level or an amount of interconnectivity between the first switch and the second switch. In an embodiment, the node is equipped with the first switch, where the first switch is an OXC or an OCS as described herein. In an embodiment, the node is equipped with the second switch, which is a WSS J×J.

According to an embodiment, an apparatus may be configured to allocate a number of line fibers to each node of a plurality of nodes of a network. The apparatus may further be configured to determine which nodes of the network is connected to one or more line fibers of a first switch of said each node. The apparatus may further be configured to determine which nodes of the plurality of nodes of the network is connected to one or more line fibers of a second switch of said each node.

As may be appreciated, in some embodiments described herein, reference to MEMS may refer to an OXC or an OCS, which may include any one of MEMS, LCOS, solid-state optical switch or any other suitable optical switch. For example, MEMS is referred to an optical switch which connects to line fibers (e.g., MEMS 102 or MEMS in other embodiments described herein) or is part of an add/drop design (e.g., in array 124 in add/drop 120 or other embodiments of add/drop designs described herein), and these references of MEMS may refer to an OXC or an OCS, which may include any one of MEMS, LCOS, solid-state optical switch or any other optical switch.

Figure 49:
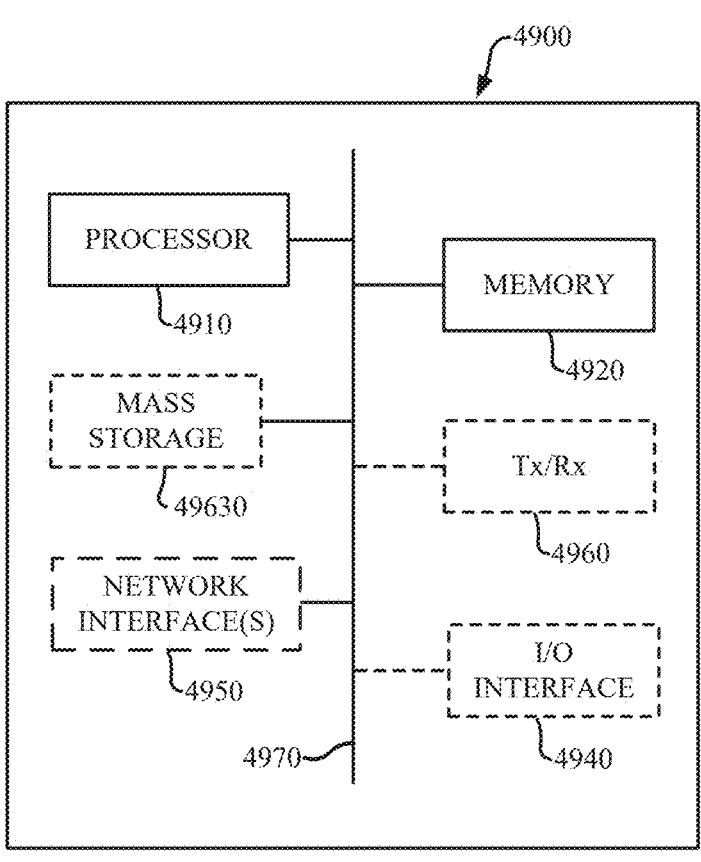
FIG. 49 illustrates an apparatus according to an embodiment of the present disclosure.

FIG. 49 illustrates an apparatus 4900 that may perform any or all of operations of the above methods and features explicitly or implicitly described herein, according to different aspects of the present disclosure. For example, a computer equipped with network function may be configured as the apparatus 4900. In some aspect, apparatus 4900 can be a device that connects to the network infrastructure over a radio interface, such as a mobile phone, smart phone or other such device that may be classified as user equipment (UE). In some aspects, the apparatus 4900 may be a Machine Type Communications (MTC) device (also referred to as a machine-to-machine (m2m) device), or another such device that may be categorized as a UE despite not providing a direct service to a user. In some aspects, apparatus 4900 may be used to implement one or more components, systems, mechanisms according to one or more aspects described herein. For example, apparatus 4900 may be a RAODM, a network node 100, 300, 400, 500, 600, 700 an optical node, or any other component, system, design, mechanism, feature and the like described herein.

As shown, the apparatus 4900 may include a processor 4910, such as a Central Processing Unit (CPU) or specialized processors such as a Graphics Processing Unit (GPU) or other such processor unit, memory 4920, non-transitory mass storage 4930, input-output interface 4940, network interface 4950, and a transceiver 4960, all of which are communicatively coupled via bi-directional bus 4970. Transceiver 4960 may include one or multiple antennas According to certain aspects, any or all of the depicted elements may be utilized, or only a subset of the elements. Further, apparatus 4900 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multichip modules, substrates or the like, or a combination thereof may be employed for performing the required logical operations.

The memory 4920 may include any type of non-transitory memory such as static random-access memory (SRAM), dynamic random-access memory (DRAM), synchronous DRAM (SDRAM), read-only memory (ROM), any combination of such, or the like. The mass storage element 4930 may include any type of non-transitory storage device, such as a solid-state drive, hard disk drive, a magnetic disk drive, an optical disk drive, USB drive, or any computer program product configured to store data and machine executable program code. According to certain aspects, the memory 4920 or mass storage 4930 may have recorded thereon statements and instructions executable by the processor 4910 for performing any method operations described herein.

The processor 4910 and memory 4920 may function together as a chipset which may be provided together for installation into wireless communication apparatus 4900 in order to implement WLAN functionality. The chipset may be configured to receive as input data including but not limited to PPDUs from the network interface 4950. The chipset may be configured to output data including but not limited to PPDUs to the network interface 4950.

Aspects of the present disclosure can be implemented using electronics hardware, software, or a combination thereof. In some aspects, this may be implemented by one or multiple computer processors executing program instructions stored in memory. In some aspects, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A network node comprising:

a plurality of optical input ports (OIPs) including a first set (1S) of OIPs and a second set (2S) of OIPs;

a plurality of optical output ports (OOPs) including a 1S of OOPs and a 2S of OOPs;

a reconfigurable optical add-drop multiplexer (ROADM) that includes:

an optical cross-connect (OXC) having:

a plurality of OXC inputs coupled to the 1S of OIPs;

a plurality of OXC outputs coupled to the 1S of OOPS;

one or more ancillary OXC optical inputs; and one or more ancillary OXC optical outputs;

a wavelength-selective switch (WSS) having:

a plurality of WSS inputs coupled directly to the 2S of OIPS;

a plurality of WSS outputs coupled directly to the 2S of OOPS;

one or more ancillary WSS optical inputs configured to couple to the one or more ancillary OXC optical outputs; and one or more ancillary WSS optical outputs configured to couple to the one or more ancillary OXC optical inputs;

one or more optical add inputs located on the OXC, on the WSS, or on both the OXC and the WSS, each optical add input of the one or more optical add inputs being configured to receive one optical add signal or multiple optical add signals; and one or more optical drop outputs located on the OXC, on the WSS, or on both the OXC and the WSS, each optical drop output of the one or more optical drop outputs being configured to output one optical drop signal or multiple optical drop signals.

2. The network node of claim 1, wherein the OXC includes at least one of a micro electromechanical system (MEMS) cross-connect, a liquid crystal optical switch, and a solid-state optical switch.

3. The network node of claim 1, wherein the WSS is a J×J WSS, J being a positive integer.

4. The network node of claim 1, wherein the WSS is a further ROADM configured for wavelength switching.

5. The network node of claim 1, wherein each of the one or more optical add inputs is one of: a colorless and directionless (CD) optical add input, or a colorless, directionless and contentionless (CDC) optical add input.

6. The network node of claim 1, wherein each of the one or more optical drop outputs is one of: a colorless and directionless (CD) optical drop output, or a colorless, directionless and contentionless (CDC) drop-WSS optical output.

7. The network node of claim 1, wherein the WSS is configured to aggregate multiple wavelengths received at multiple inputs of the WSS to an output of the WSS, wherein:

the multiple inputs include one or more of: a WSS input of the plurality of WSS inputs, an optical add input of the one or more optical add inputs located on the WSS, and an ancillary WSS optical input of the one or more ancillary WSS optical inputs; and the output of the WSS is one of: a WSS output of the plurality of WSS outputs, an optical drop output of the one or more optical drop outputs located on the WSS, and an ancillary WSS optical output of the one or more ancillary WSS optical outputs.

8. The network node of claim 1, wherein the WSS is configured to disaggregate multiple wavelengths received at an input of the WSS to multiple outputs of the WSS, wherein:

the input of the WSS is one of: a WSS input of the plurality of WSS inputs, an optical add input of the one or more optical add inputs located on the WSS, and an ancillary WSS optical input of the one or more ancillary WSS optical inputs; and the multiple outputs of the WSS include one or more of: a WSS output of the plurality of WSS outputs, an optical drop output of the one or more optical drop outputs located on the WSS, and an ancillary WSS optical output of the one or more ancillary WSS optical outputs.

9. The network node of claim 1, wherein the plurality of WSS inputs is one of: less than, more than or equal to the plurality of WSS outputs coupled.

10. The network node of claim 1, wherein the OXC is configured to route an optical signal received at any one of the plurality of OXC inputs to any one of the plurality of OXC outputs.

11. The network node of claim 1, wherein the WSS is configured to route one or more optical signals received at one or more inputs of the WSS to one or more output of the WSS, wherein:

the one or more inputs of the WSS includes one or more of: a WSS input of the plurality of WSS inputs, an optical add input of the one or more optical add inputs located on the WSS, and an ancillary WSS optical input of the one or more ancillary WSS optical inputs; and the one or more outputs of the WSS includes one or more of: a WSS output of the plurality of WSS outputs, an optical drop output of the one or more optical drop outputs located on the WSS, and an ancillary WSS optical output of the one or more ancillary WSS optical outputs.

12. The network node of claim 1, wherein each of the one or more optical add inputs or each of the one or more optical drop outputs is connected to a 1×N WSS, N being a positive integer, the WSS being coupled to an array of N OXCs, wherein each OXC of the array of N OXCs is sized M×M, M being a positive integer, and to one of: a micro electromechanical system (MEMS) cross connect, a liquid crystal optical switch, or a solid-state optical switch.

13. An apparatus for adding or dropping one or more optical signals at a network node, the apparatus comprising:

a first array of M wavelength-selective switches (WSSs), M being a positive integer, wherein each WSS of the first array of M WSSs is sized 1×N, N being a positive integer, and connected to an optical add input of M optical add inputs of the network node; and a first array of N optical cross-connects (OXCs), wherein each OXC of the first array of N OXCs is:

sized M×M;

connected to each WSS of the first array of M WSSs;

a micro electromechanical system (MEMS) cross-connect, a liquid crystal optical switch (LCOS), or a solid-state optical switch; and connected to a first set of transponders from which an optical signal is received for adding.

14. The apparatus of claim 13 further comprising:

a second array of B WSSs, B being a positive integer, wherein each WSS of the second array of B WSSs is sized 1×Y, Y being a positive integer, and connected to an optical drop input of B optical drop inputs of the network node, where B is equal to or different from M and Y is equal to or different from N; and a second array of Y OXCs, wherein each OXC of the second array of Y OXCs is:

sized B×B;

connected to each WSS of the second array of B WSSs;

a MEMS cross-connect, an LCOS, or a solid-state optical switch; and connected to a second set of transponders at which a second optical signal is dropped.

15. The apparatus of claim 13, wherein the M optical add inputs correspond to a primary OXC of the network node used for managing traffic flow at the network node, wherein the primary OXC is a MEMS cross-connect, an LCOS, or a solid-state optical switch.

16. The apparatus of claim 13, wherein the M optical add inputs correspond to a primary WSS of the network node used for managing traffic flow at the network node.

17. The apparatus of claim 13, wherein the M optical add inputs correspond to a primary OXC of the network node and a primary WSS of the network node, the primary OXC and the primary WSS used for managing traffic flow at the network node, wherein the primary OXC is a MEMS cross-connect, an LCOS, or a solid-state optical switch.

18. The apparatus of claim 17, wherein the M optical add inputs include $M_1$ optical add inputs and $M_2$ optical add inputs, wherein the $M_1$ optical add inputs correspond to the primary OXC and the $M_2$ optical add inputs correspond to the primary WSS.

19. The apparatus of claim 14, wherein the B optical drop inputs correspond to a primary OXC of the network node used for managing traffic flow at the network node, wherein the primary OXC is a MEMS cross-connect, an LCOS, or a solid-state optical switch.

20. The apparatus of claim 14, wherein the B optical drop inputs correspond to a primary WSS of the network node used for managing traffic flow at the network node.

21. The apparatus of claim 14, wherein the B optical drop inputs correspond to a primary OXC of the network node and a primary WSS of the network node, the primary MEMS cross-connect and the primary WSS being used for managing traffic flow at the network node, wherein the primary OXC is a MEMS cross-connect, an LCOS, or a solid-state optical switch.

22. The apparatus of claim 21, wherein the B optical drop inputs include $B_1$ optical drop inputs and $B_2$ optical drop inputs, wherein the $B_1$ optical drop inputs correspond to the primary OXC and the $B_2$ optical drop inputs correspond to the primary WSS.

23. An apparatus for dropping an optical signal received at a network node, the apparatus comprising:

a first array of B wavelength-selective switches (WSSs), B being a positive integer, wherein each WSS of the first array of B WSSs is sized 1×Y, Y being a positive integer, and connected to an optical drop input of B optical drop inputs of the network node; and a first array of Y optical cross-connects (OXCs), wherein each OXC of the first array of Y OXCs is:
sized B×B;
connected to each WSS of the first array of B WSSs;
connected to a first set of transponders at which the optical signal is dropped; and a micro electromechanical system (MEMS) cross-connect, a liquid crystal optical switch (LCOS), or a solid-state optical switch.

24. An apparatus for adding or dropping one or more optical signals at a network node, the apparatus comprising:

a first array of P optical cross-connects (OXCs), P being a positive integer, wherein each OXC of the first array:
is sized N×N, N being a positive integer;
is connected to a second array of N OXCs of the network node via P optical add inputs of each OXC of the second array;
supports N super-channels, each super-channel corresponding to a respective OXC of the second array; and
is a micro electromechanical system (MEMS) cross-connect, a liquid crystal optical switch (LCOS), or a solid-state optical switch;

a third array of P OXCs, wherein each OXC of the third array is:
sized N×N;
connected to each OXC of the first array;
connected to a first set of transponders from which an optical signal is received for adding; and
a MEMS cross-connect, an LCOS, or a solid-state optical switch.

25. The apparatus of claim 24 further comprising:

a fourth array of P OXCs, P being a positive integer, wherein each OXC of the fourth array:
is sized N×N;
is connected to the second array of N OXCs via P optical drop inputs of each OXC of the second array;
supports the N super-channels; and
is a MEMS cross-connect, an LCOS, or a solid-state optical switch;

a fifth array of P OXCs, wherein each OXC of the fifth array is:
sized N×N;
connected to each OXC of the fourth array;
connected to a second set of transponders at which a second optical signal is dropped; and
a MEMS cross-connect, an LCOS, or a solid-state optical switch.

* * * * *